US011006098B2

(12) United States Patent
Akao et al.

(10) Patent No.: US 11,006,098 B2
(45) Date of Patent: May 11, 2021

(54) INFORMATION PROCESSING APPARATUS, INFORMATION PROCESSING SYSTEM, AND INFORMATION PROCESSING METHOD

(71) Applicant: SONY CORPORATION, Tokyo (JP)

(72) Inventors: Masato Akao, Kanagawa (JP); Kazuhiko Nishibori, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 59 days.

(21) Appl. No.: 16/097,943

(22) PCT Filed: Apr. 7, 2017

(86) PCT No.: PCT/JP2017/014549
§ 371 (c)(1),
(2) Date: Oct. 31, 2018

(87) PCT Pub. No.: WO2017/195513
PCT Pub. Date: Nov. 16, 2017

(65) Prior Publication Data
US 2019/0149807 A1 May 16, 2019

(30) Foreign Application Priority Data

May 10, 2016 (JP) .............................. JP2016-094335

(51) Int. Cl.
*H04N 13/31* (2018.01)
*H04N 13/128* (2018.01)
(Continued)

(52) U.S. Cl.
CPC ........... *H04N 13/31* (2018.05); *G06T 15/205* (2013.01); *H04N 7/147* (2013.01); *H04N 7/157* (2013.01);
(Continued)

(58) Field of Classification Search
CPC ........ H04N 13/31; H04N 7/147; H04N 7/157; H04N 13/128; H04N 13/368; H04N 7/15;
(Continued)

(56) References Cited

U.S. PATENT DOCUMENTS

2005/0129325 A1* 6/2005 Wu ........................ H04N 7/144
382/254
2011/0102596 A1* 5/2011 Kotani ............. G08B 13/19645
348/159
(Continued)

FOREIGN PATENT DOCUMENTS

CN 1678084 A 10/2005
CN 103595987 A 2/2014
(Continued)

OTHER PUBLICATIONS

International Search Report and Written Opinion of PCT Application No. PCT/JP2017/014549, dated Jul. 4, 2017, 12 pages of ISRWO.

*Primary Examiner* — Mulugeta Mengesha
*Assistant Examiner* — Alazar Tilahun
(74) *Attorney, Agent, or Firm* — Chip Law Group

(57) ABSTRACT

Provided is a configuration to make a virtual viewpoint image be a more natural stereoscopic image. The virtual viewpoint image is transmitted/received between information processing apparatuses that execute bidirectional communication. A processor calculates a virtual viewpoint position corresponding to a position of a virtual camera that captures a virtual viewpoint image on the basis of viewing position information of a viewing user of the virtual viewpoint image, and generates the virtual viewpoint image corresponding to a captured image from the virtual viewpoint position. The virtual viewpoint image is generated based on the captured image of a real camera that captures an object user, and the virtual viewpoint image is generated (Continued)

by setting a capture direction of a virtual camera to a point C, wherein the point C is in a position different from the object user.

15 Claims, 37 Drawing Sheets

(51) Int. Cl.
*H04N 13/368* (2018.01)
*H04N 7/14* (2006.01)
*G06T 15/20* (2011.01)
*H04N 7/15* (2006.01)

(52) U.S. Cl.
CPC ......... *H04N 13/128* (2018.05); *H04N 13/368* (2018.05)

(58) Field of Classification Search
CPC ... H04N 13/117; H04N 13/279; G06T 15/205
See application file for complete search history.

(56) References Cited

U.S. PATENT DOCUMENTS

| | | |
|---|---|---|
| 2014/0036046 A1 | 2/2014 | Hasegawa et al. |
| 2016/0059128 A1 | 3/2016 | Ito et al. |
| 2016/0114243 A1* | 4/2016 | Matsuura ............... A63F 13/35 463/31 |

FOREIGN PATENT DOCUMENTS

| | | |
|---|---|---|
| EP | 2693758 A2 | 2/2014 |
| JP | 11-355804 A | 12/1999 |
| JP | 2005-157921 A | 6/2005 |
| JP | 2013-055402 A | 3/2013 |
| JP | 2014-045474 A | 3/2014 |
| JP | 2014-086775 A | 5/2014 |
| JP | 2015-114716 A | 6/2015 |
| JP | 2016-051918 A | 4/2016 |

* cited by examiner

FIG. 12
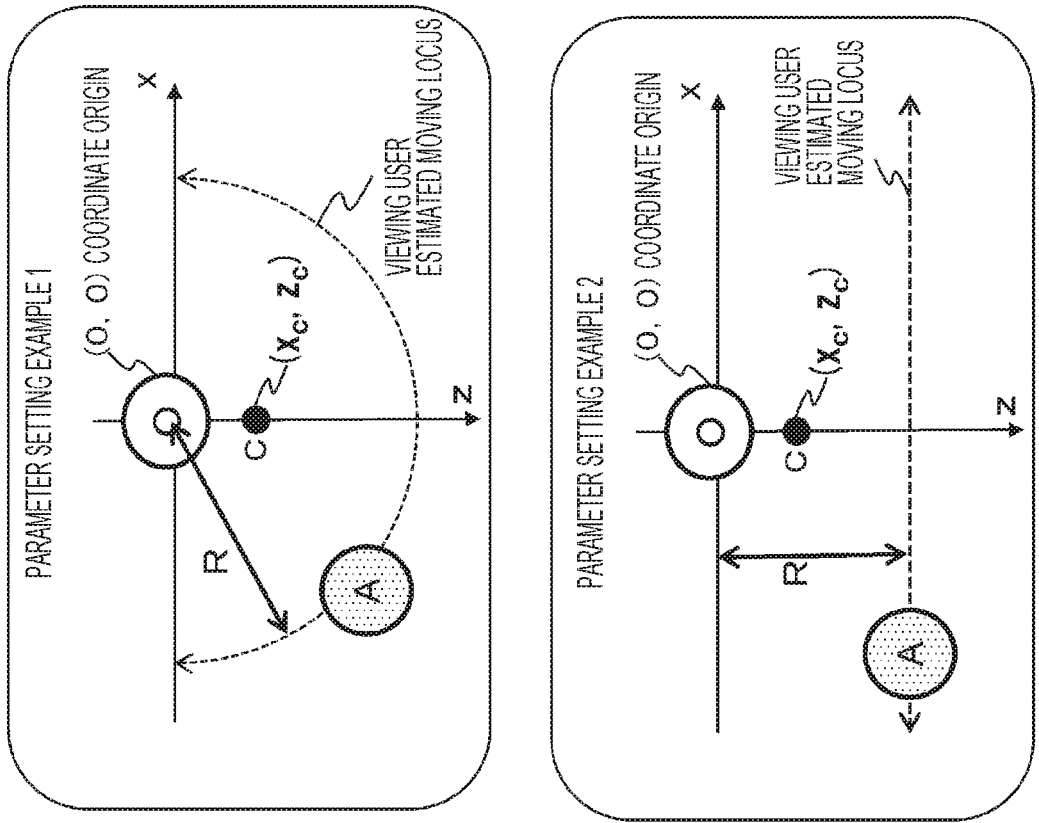
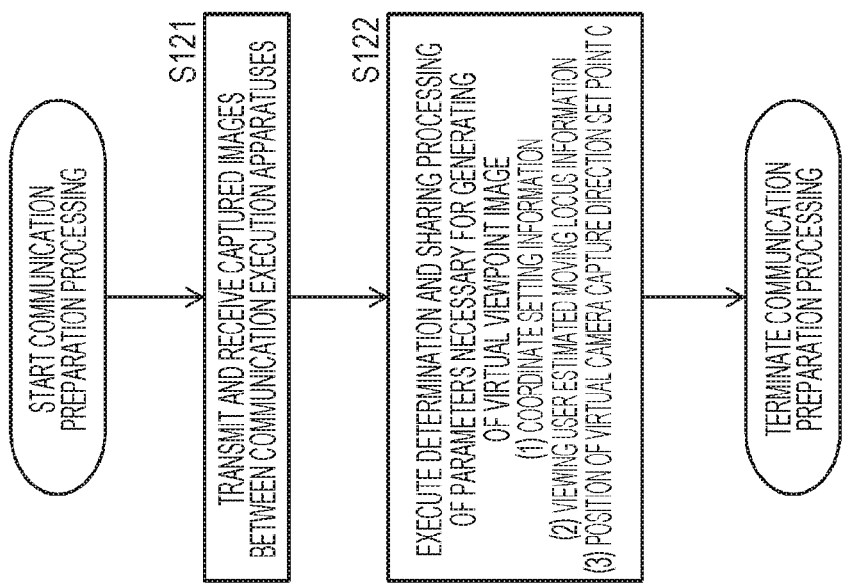

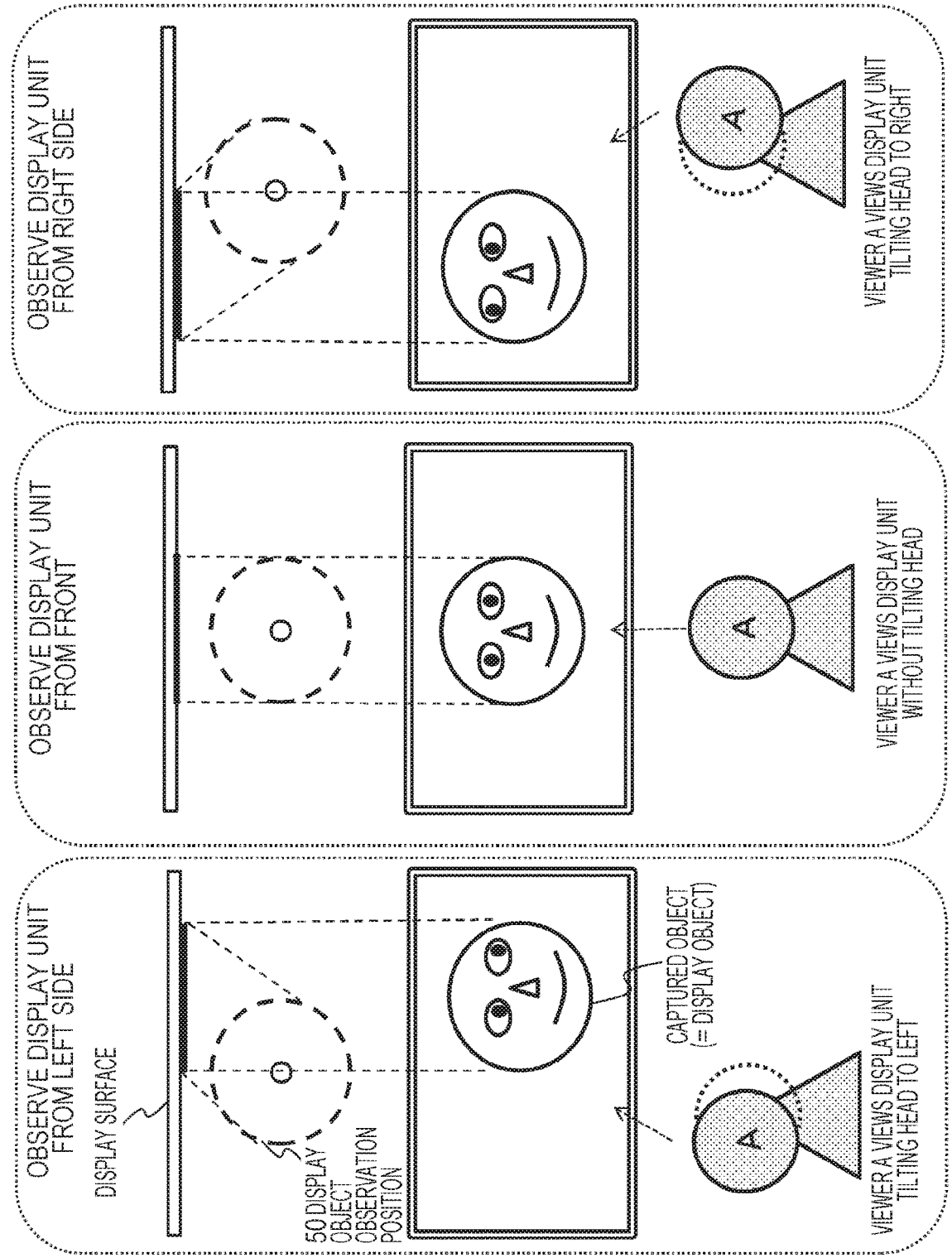

FIG. 19

(MODIFICATION OF FIRST EMBODIMENT)
EXAMPLE IN WHICH VIRTUAL CAMERA IS LOCATED ON CIRCLE WITH RADIUS R CENTERED ON VIRTUAL CAMERA CAPTURE DIRECTION SET POINT C

(a) LOCUS AND DIRECTION OF VIRTUAL CAMERA

WHEN DISTANCE BETWEEN OC IS c AND COORDINATES OF VIEWING USER A ARE $(x_0, z_0)$, CAMERA COORDINATES ARE $(x_1, z_1)$, CAMERA LOCUS IS $x^2 + (z-c)^2 = R^2$, AND DIRECTION OF CAMERA OPTICAL AXIS IS IN FRONT ($c > 0$) OF OBJECT O AND BEHIND ($c < 0$) OF OBJECT O.

(b) VIRTUAL CAMERA POSITION CALCULATION EXAMPLE

VIRTUAL CAMERA POSITION $(x_1, z_1)$ IS OBTAINED FROM FACE POSITION $(x_0, z_0)$ OF VIEWING USER A BY FOLLOWING PROCEDURE.

(NOTE THAT VIRTUAL CAMERA IS APPROXIMATED TO FOLLOW LOCUS OF CIRCLE WITH RADIUS R CENTERED ON VIRTUAL CAMERA CAPTURE DIRECTION SET POINT C) WHEN CENTER COORDINATES OF A ARE $(x_0, z_0)$, INTERSECTION COORDINATES $(x_1, z_1)$ OF STRAIGHT LINE OA AND LOCUS OF CIRCLE WITH RADIUS R HAVING DISTANCE (R) BETWEEN VIRTUAL CAMERA CAPTURE DIRECTION SET POINT C AND VIRTUAL CAMERA AS RADIUS SERVE AS CENTER COORDINATE POSITION OF VIRTUAL CAMERA.

WHEN SOLVING SIMULTANEOUS EQUATIONS BELOW:
$z_1 = (z_0/x_0)x_1$
$x_1^2 + (z_1-c)^2 = R^2$
VIRTUAL CAMERA POSITION $(x_1, z_1)$ IS OBTAINED.

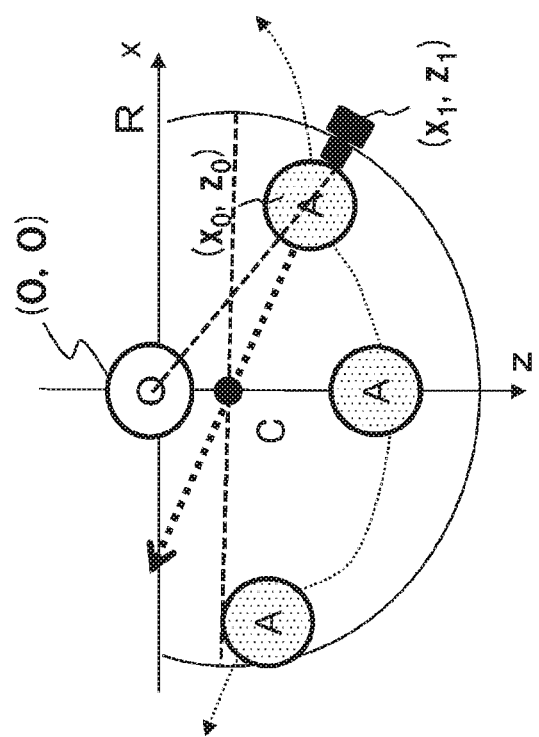

- ○ CAPTURED OBJECT (= DISPLAY OBJECT)
- Ⓐ VIEWER
- ■ VIRTUAL VIEWPOINT IMAGE CAPTURE CAMERA
- C VIRTUAL CAMERA CAPTURE DIRECTION SET POINT

FIG. 20

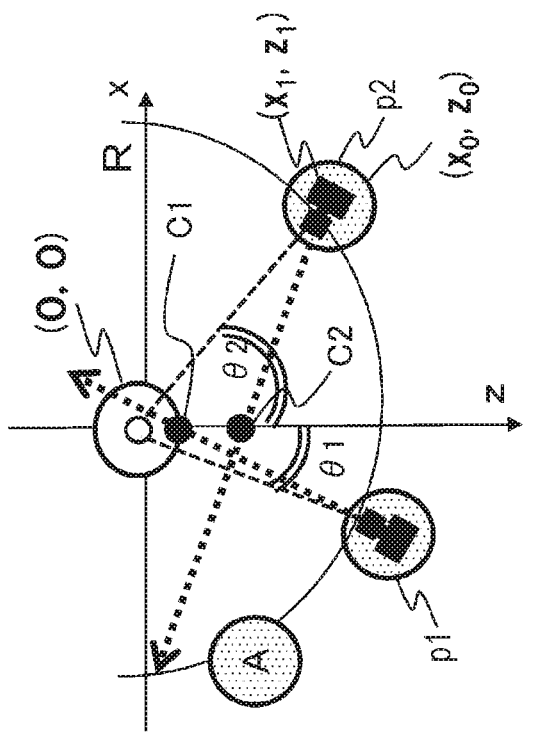

(MODIFICATION OF FIRST EMBODIMENT)
EXAMPLE OF MOVING POSITION OF VIRTUAL CAMERA CAPTURE DIRECTION SET POINT C ACCORDING TO VIEWING USER POSITION

(a) LOCUS AND DIRECTION OF VIRTUAL CAMERA

WHEN DISTANCE BETWEEN OC IS c, AND COORDINATES OF VIEWING USER A ARE $(x_0, z_0)$, CAMERA COORDINATES ARE $(x_1, z_1)$, CAMERA LOCUS IS $x^2 + z^2 = R^2$, AND DIRECTION OF CAMERA OPTICAL AXIS IS IN FRONT $(c > 0)$ OF OBJECT O AND BEHIND $(c < 0)$ OF OBJECT O.

(b) SETTING EXAMPLE OF VIRTUAL CAMERA CAPTURE DIRECTION SET POINT C

DISTANCE BETWEEN OBJECT O AND VIRTUAL CAMERA CAPTURE DIRECTION SET POINT C IS c.
WHEN COORDINATES OF VIEWING USER A ARE $(x_0, z_0)$,
CAMERA COORDINATES ARE $(x_1, z_1)$,
CAMERA LOCUS IS $x^2 + z^2 = R^2$, AND
VIRTUAL CAMERA CAPTURE DIRECTION SET POINT C THAT DETERMINES DIRECTION OF VIRTUAL CAMERA OPTICAL AXIS IS SET TO EITHER (a) OR (b) BELOW.
(a) IN FRONT $(c > 0)$ OF OBJECT O, OR
(b) BEHIND $(c < 0)$ OF OBJECT O

FURTHER, DISTANCE BETWEEN OC c IS VARIED ACCORDING TO POSITION OF VIEWING USER A.
FOR EXAMPLE, WHEN A IS AT POSITION SHIFTED FROM FRONT BY ANGLE $\theta$,
$c = c_0 \times \theta$
IS OBTAINED ($c_0$ IS COEFFICIENT).

○ CAPTURED OBJECT (= DISPLAY OBJECT)
Ⓐ VIEWER
■ VIRTUAL VIEWPOINT IMAGE CAPTURE CAMERA
C VIRTUAL CAMERA CAPTURE DIRECTION SET POINT

FIG. 21

(SECOND EMBODIMENT) EXAMPLE OF LINEARLY MOVING VIRTUAL CAMERA THAT CAPTURES VIRTUAL VIEWPOINT IMAGE

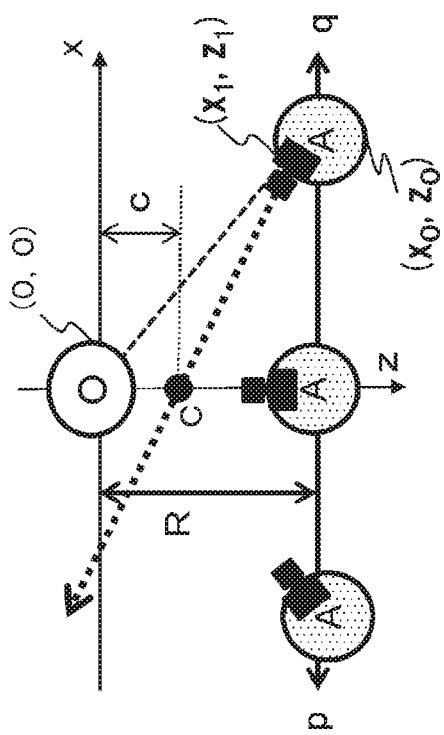

- ○ CAPTURED OBJECT (= DISPLAY OBJECT)
- Ⓐ VIEWER
- ■ VIRTUAL VIEWPOINT IMAGE CAPTURE CAMERA
- c VIRTUAL CAMERA CAPTURE DIRECTION SET POINT (a) LOCUS AND DIRECTION OF VIRTUAL CAMERA

WHEN DISTANCE BETWEEN OC IS c AND COORDINATES OF VIEWING USER A ARE $(x_0, z_0)$, CAMERA COORDINATES ARE $(x_1, z_1)$, CAMERA LOCUS IS $z=R$, AND DIRECTION OF CAMERA OPTICAL AXIS IS IN FRONT ($c>0$) OF OBJECT O AND BEHIND ($c<0$) OF OBJECT O.

(b) VIRTUAL CAMERA POSITION CALCULATION EXAMPLE

VIRTUAL CAMERA POSITION $(x_1, z_1)$ IS OBTAINED FROM FACE POSITION $(x_0, z_0)$ OF VIEWING USER A BY FOLLOWING PROCEDURE.

(NOTE THAT FACE POSITION OF A DOES NOT NECESSARILY FOLLOW LOCUS OF STRAIGHT LINE pq BUT VIRTUAL CAMERA IS APPROXIMATED TO FOLLOW LOCUS OF STRAIGHT LINE pq)

WHEN CENTER COORDINATES OF A ARE $(x_0, z_0)$, INTERSECTION COORDINATES $(x_1, z_1)$ OF STRAIGHT LINE OA AND LOCUS OF STRAIGHT LINE pq SERVE AS CENTER COORDINATE POSITION OF VIRTUAL CAMERA.

WHEN SOLVING SIMULTANEOUS EQUATIONS BELOW:
$z_1 = (z_0/x_0)x_1$
$z_1 = R$ $x_1 = Rx_0/z_0$
$z_1 = R$
ARE OBTAINED
AND VIRTUAL CAMERA POSITION $(x_1, z_1)$ IS OBTAINED.

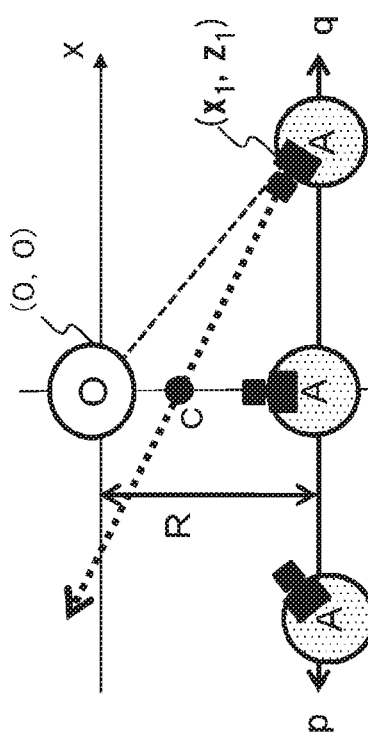

(THIRD EMBODIMENT) EXAMPLE IN WHICH VIRTUAL CAMERA THAT CAPTURES VIRTUAL VIEWPOINT IMAGE IS VERTICALLY AND CIRCULARLY MOVED WITH RADIUS R

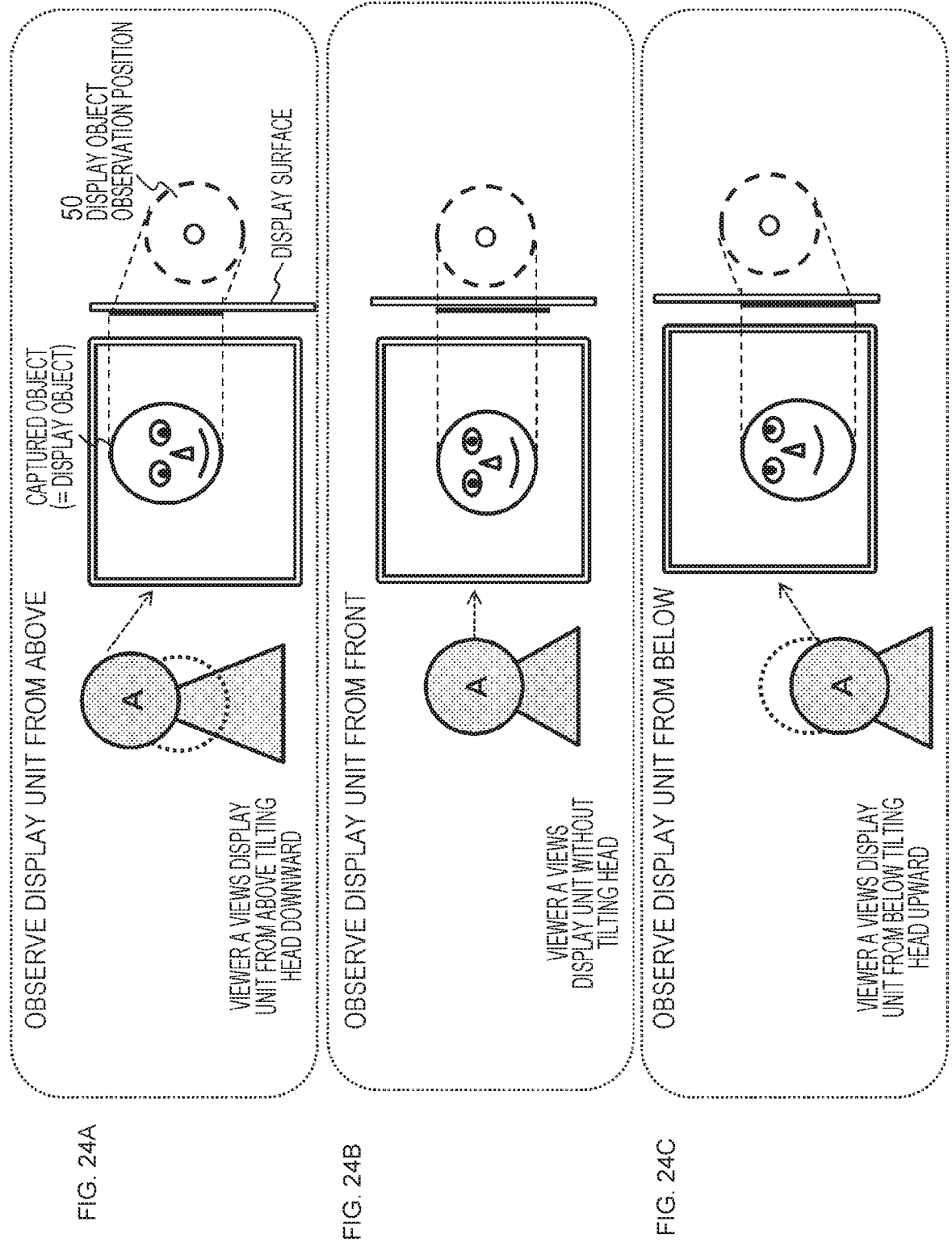

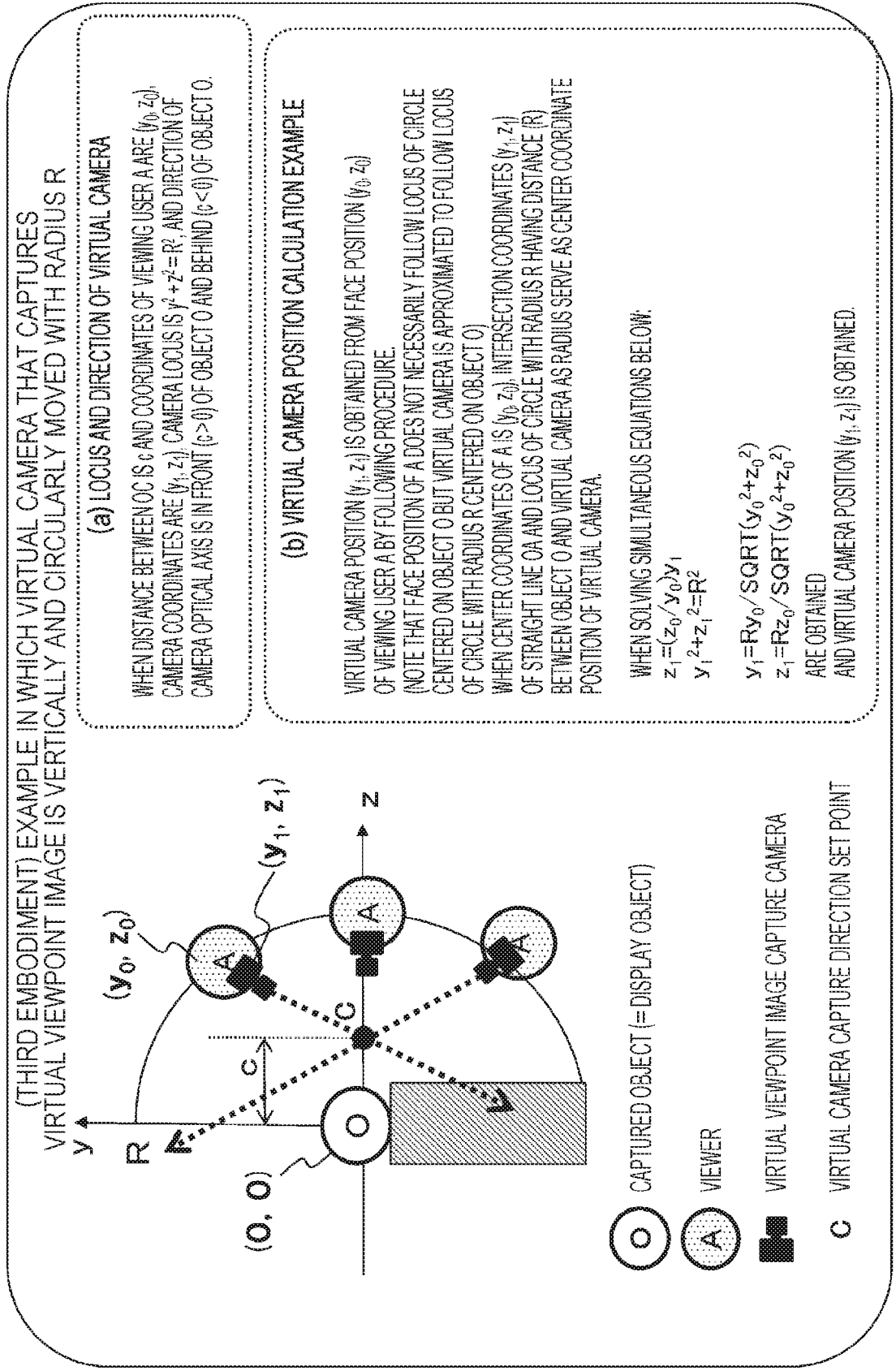

FIG. 26

(FOURTH EMBODIMENT) EXAMPLE IN WHICH VIRTUAL CAMERA
THAT CAPTURES VIRTUAL VIEWPOINT IMAGE IS VERTICALLY AND LINEARLY MOVED (a) LOCUS AND DIRECTION OF VIRTUAL CAMERA

WHEN DISTANCE BETWEEN OC IS c AND COORDINATES OF VIEWING USER A ARE $(y_0, z_0)$, CAMERA COORDINATES ARE $(y_1, z_1)$, CAMERA LOCUS IS $z=R$, AND DIRECTION OF CAMERA OPTICAL AXIS IS IN FRONT ($c>0$) OF OBJECT O AND BEHIND ($c<0$) OF OBJECT O.

(b) VIRTUAL CAMERA POSITION CALCULATION EXAMPLE

VIRTUAL CAMERA POSITION $(y_1, z_1)$ IS OBTAINED FROM FACE POSITION $(y_0, z_0)$ OF VIEWING USER A BY FOLLOWING PROCEDURE.

(NOTE THAT FACE POSITION OF A DOES NOT NECESSARILY FOLLOW LOCUS OF STRAIGHT LINE pq BUT VIRTUAL CAMERA IS APPROXIMATED TO FOLLOW LOCUS OF STRAIGHT LINE pq.) WHEN CENTER COORDINATES OF A ARE $(y_0, z_0)$, INTERSECTION COORDINATES $(y_1, z_1)$ OF STRAIGHT LINE OA AND LOCUS OF STRAIGHT LINE pq SERVE AS CENTER COORDINATE POSITION OF VIRTUAL CAMERA.

WHEN SOLVING SIMULTANEOUS EQUATIONS BELOW:
$z_1 = (z_0/y_0)y_1$
$z_1 = R$ $y_1 = Ry_0/z_0$
$z_1 = R$
ARE OBTAINED
AND VIRTUAL CAMERA POSITION $(k_1, z_1)$ IS OBTAINED.

○ CAPTURED OBJECT (= DISPLAY OBJECT)
Ⓐ VIEWER
▪ VIRTUAL VIEWPOINT IMAGE CAPTURE CAMERA
c VIRTUAL CAMERA CAPTURE DIRECTION SET POINT

FIG. 27

(FIFTH EMBODIMENT) SETTING EXAMPLE IN WHICH POSITION OF VIRTUAL CAMERA IS SET TO POSITION WHERE LINES OF SIGHT OF OBJECT AND VIEWER COINCIDE WITH EACH OTHER (a) LOCUS AND DIRECTION OF VIRTUAL CAMERA AND POSITION OF VIRTUAL CAMERA

WHEN DISTANCE BETWEEN OC IS c, AND COORDINATES OF VIEWING USER A ARE $(x_0, z_0)$.
CAMERA COORDINATES ARE $(x_2, z_2)$.
$x_2 = R\sin\theta, z_2 = R\cos\theta$
CAMERA LOCUS IS $x^2 + z^2 = R^2$, AND DIRECTION OF CAMERA OPTICAL AXIS
IS IN FRONT $(c > 0)$ OF OBJECT O AND BEHIND $(c < 0)$ OF OBJECT O.

VIRTUAL CAMERA ANGLE $\theta$ TO OBJECT O IS CHANGED ACCORDING TO VIEWER ANGLE $\phi$.
SPECIFICALLY, VIRTUAL CAMERA POSITION IS SET TO POSITION WHERE LINES OF SIGHT OF OBJECT AND VIEWER COINCIDE WITH EACH OTHER.
FOR EXAMPLE, WHEN VIEWING USER A IS AT POSITION SHIFTED FROM FRONT BY ANGLE $\phi$, POSITION OF VIRTUAL CAMERA IS SET TO POSITION SHIFTED FROM FRONT BY ANGLE $\theta$.
WHEN
$\theta = f(\phi)$,
FUNCTION EXPRESSING RELATIONSHIP BETWEEN $\theta$ AND $\phi$ IS HELD IN DATABASE IN ADVANCE.

(b) DATABASE EXAMPLE (CORRESPONDENCE RELATIONSHIP DATABASE EXAMPLE BETWEEN VIEWER ANGLE $\phi$ TO OBJECT O AND VIRTUAL CAMERA ANGLE $\theta$)

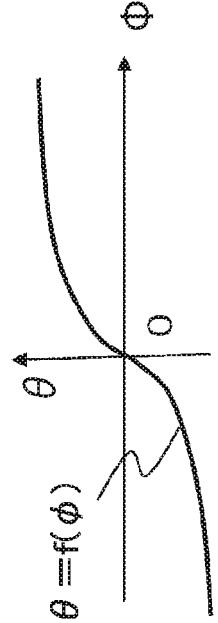

$\theta = f(\phi)$

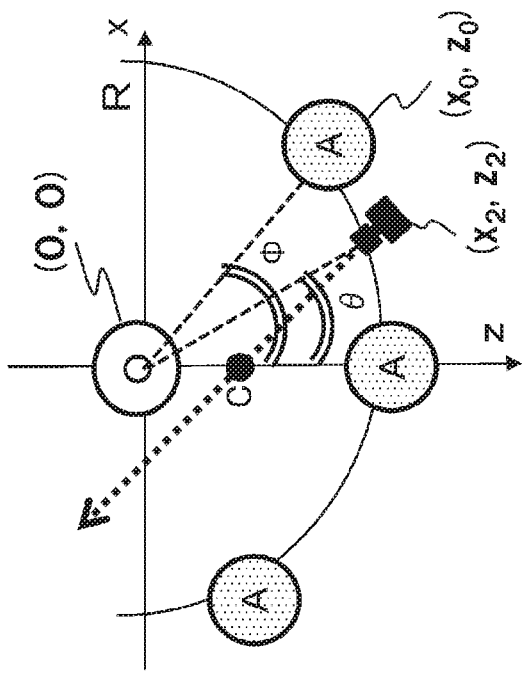

○ CAPTURED OBJECT (= DISPLAY OBJECT)
Ⓐ VIEWER
■ VIRTUAL VIEWPOINT IMAGE CAPTURE CAMERA
C  VIRTUAL CAMERA CAPTURE DIRECTION SET POINT

FIG. 28

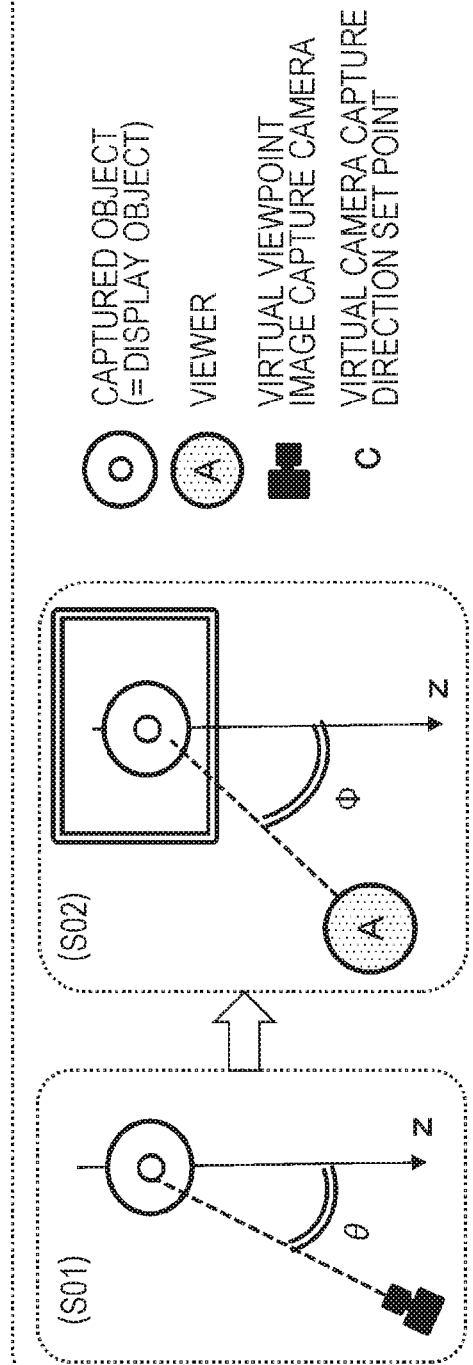

(FIFTH EMBODIMENT) SETTING EXAMPLE IN WHICH POSITION OF VIRTUAL CAMERA IS SET TO POSITION WHERE LINES OF SIGHT OF OBJECT AND VIEWER COINCIDE WITH EACH OTHER

○ CAPTURED OBJECT (=DISPLAY OBJECT)
Ⓐ VIEWER
▪ VIRTUAL VIEWPOINT IMAGE CAPTURE CAMERA
c VIRTUAL CAMERA CAPTURE DIRECTION SET POINT (S01) OBJECT O IS CAPTURED FROM POSITION AT ANGLE $\theta$ FROM FRONT
(S02) WHEN VIEWER A IS AT POSITION OF ANGLE $\phi$ FROM FRONT OF DISPLAY, OBJECT O OF (S01) IS DISPLAYED ON DISPLAY, AND ANGLE $\phi$ AT WHICH LINES OF SIGHT COINCIDE WITH EACH OTHER IS OBTAINED.
(S01) AND (S02) ARE REPEATED, AND CAPTURE ANGLE $\theta$ OF OBJECT AT WHICH LINES OF SIGHT COINCIDE WITH EACH OTHER AS VIEWED FROM POSITION OF ANGLE $\phi$ IS OBTAINED, RELATIONSHIP OF $\theta = f(\phi)$ IS OBTAINED AND STORED IN DATABASE.

FIG. 30

(SIXTH EMBODIMENT) EXAMPLE IN WHICH POSITION OF VIRTUAL CAMERA IS SET TO POSITION WHERE LINES OF SIGHT OF OBJECT AND VIEWER COINCIDE WITH EACH OTHER, AND MOVEMENT OF VIRTUAL CAMERA IS LINEARLY SET (a) LOCUS AND DIRECTION OF VIRTUAL CAMERA AND POSITION OF VIRTUAL CAMERA

WHEN DISTANCE BETWEEN OC IS c AND COORDINATES OF VIEWING USER A ARE $(x_0, z_0)$, CAMERA COORDINATES ARE $(x_2, z_2)$.
$x_2 = R \tan\theta, z_2 = R$
CAMERA LOCUS IS $z = R$,
AND DIRECTION OF CAMERA OPTICAL AXIS IS IN FRONT ($c > 0$) OF OBJECT O AND BEHIND ($c < 0$) OF OBJECT O.

VIRTUAL CAMERA ANGLE $\theta$ TO OBJECT O IS CHANGED ACCORDING TO VIEWER ANGLE $\phi$. SPECIFICALLY, VIRTUAL CAMERA POSITION IS SET TO POSITION WHERE LINES OF SIGHT OF OBJECT AND VIEWER COINCIDE WITH EACH OTHER.
FOR EXAMPLE, WHEN VIEWING USER A IS AT POSITION SHIFTED FROM FRONT BY ANGLE $\phi$, POSITION OF VIRTUAL CAMERA IS SET TO POSITION SHIFTED FROM FRONT BY ANGLE $\theta$.
WHEN
$\theta = f(\phi)$,
FUNCTION EXPRESSING RELATIONSHIP BETWEEN $\theta$ AND $\phi$ IS HELD IN DATABASE IN ADVANCE.

(b) DATABASE EXAMPLE (CORRESPONDENCE RELATIONSHIP DATABASE EXAMPLE BETWEEN VIEWER ANGLE $\phi$ TO OBJECT O AND VIRTUAL CAMERA ANGLE $\theta$)

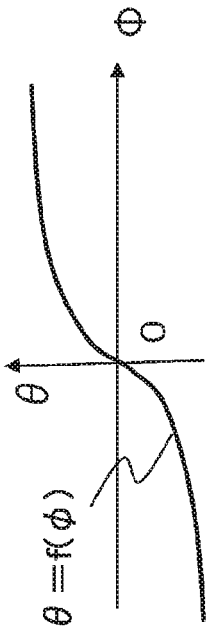

$\theta = f(\phi)$

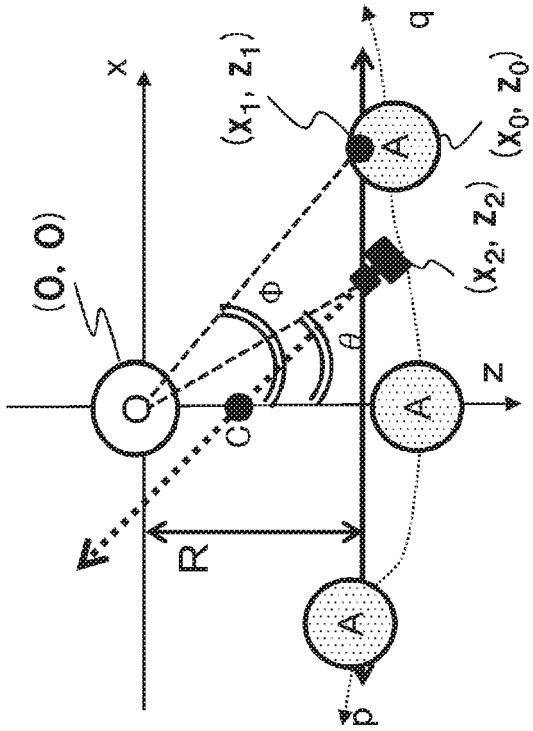

○ CAPTURED OBJECT (= DISPLAY OBJECT)
Ⓐ VIEWER
▪ VIRTUAL VIEWPOINT IMAGE CAPTURE CAMERA
c  VIRTUAL CAMERA CAPTURE DIRECTION SET POINT

FIG. 31

(SIXTH EMBODIMENT) EXAMPLE IN WHICH POSITION OF VIRTUAL CAMERA IS SET TO POSITION WHERE LINES OF SIGHT OF OBJECT AND VIEWER COINCIDE WITH EACH OTHER, AND MOVEMENT OF VIRTUAL CAMERA IS LINEARLY SET

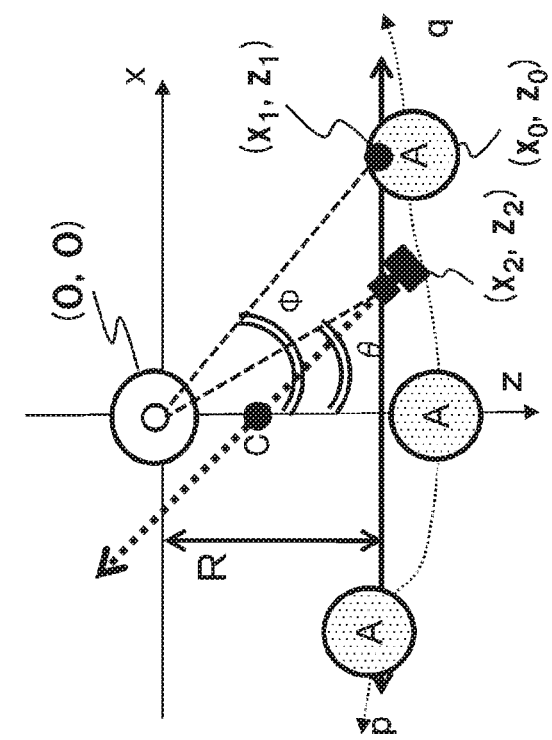

VIRTUAL CAMERA POSITION CALCULATION EXAMPLE

VIRTUAL CAMERA POSITION $(x_2, z_2)$ IS OBTAINED FROM FACE POSITION $(x_0, z_0)$ OF VIEWING USER A BY FOLLOWING PROCEDURE.
(NOTE THAT FACE POSITION OF A DOES NOT NECESSARILY FOLLOW LOCUS OF STRAIGHT LINE AT DISTANCE R FROM OBJECT O BUT VIRTUAL CAMERA IS APPROXIMATED TO FOLLOW LOCUS OF STRAIGHT LINE AT DISTANCE R FROM OBJECT O.)
WHEN CENTER COORDINATES OF A ARE $(x_0, z_0)$, INTERSECTION COORDINATES $(x_1, z_1)$ OF STRAIGHT LINE OA AND LOCUS OF STRAIGHT LINE pq AT DISTANCE R FROM OBJECT O SERVE AS REFERENCE FOR OBTAINING POSITION OF VIRTUAL CAMERA $(x_2, z_2)$.

WHEN SOLVING SIMULTANEOUS EQUATIONS BELOW:
$z_1 = (z_0/x_0)x_1$
$z_1 = R$ $x_1 = Rx_0/z_0$
$z_1 = R$
ARE OBTAINED AND
ANGLE $\phi$ IS CALCULATED FROM $(x_1, z_1)$,
$\theta$ IS CALCULATED ACCORDING TO $\theta = f(\phi)$, AND
VIRTUAL CAMERA POSITION $(x_2, z_2)$ IS OBTAINED FROM $\theta$.

○ CAPTURED OBJECT (= DISPLAY OBJECT)
Ⓐ VIEWER
■ VIRTUAL VIEWPOINT IMAGE CAPTURE CAMERA
C VIRTUAL CAMERA CAPTURE DIRECTION SET POINT

FIG. 32

(MODIFICATION OF SIXTH EMBODIMENT) EXAMPLE IN WHICH POSITION OF VIRTUAL CAMERA IS SET TO POSITION WHERE LINES OF SIGHT OF OBJECT AND VIEWER COINCIDE WITH EACH OTHER, AND LOCUS OF VIRTUAL CAMERA IS SET TO MAINTAIN DISTANCE BETWEEN VIRTUAL CAMERA AND OBJECT CONSTANT (a) LOCUS AND DIRECTION OF VIRTUAL CAMERA AND POSITION OF VIRTUAL CAMERA

WHEN DISTANCE BETWEEN OC IS c, AND COORDINATES OF VIEWING USER A ARE $(x_0, z_0)$, CAMERA COORDINATES ARE $(x_2, z_2)$,
$x_2 = D\sin\theta$, $z_2 = D\cos\theta$,
$D = SQRT(x_1^2 + z_1^2)$
D IS DISTANCE BETWEEN OBJECT O AND VIEWING USER A DIRECTION OF OPTICAL AXIS IS IN FRONT (c>0) OF OBJECT O AND BEHIND (c<0) OF OBJECT O.
VIRTUAL CAMERA ANGLE $\theta$ TO OBJECT O IS CHANGED ACCORDING TO VIEWER ANGLE $\phi$. SPECIFICALLY, VIRTUAL CAMERA POSITION IS SET TO POSITION WHERE LINES OF SIGHT OF OBJECT AND VIEWER COINCIDE WITH EACH OTHER.
FOR EXAMPLE, WHEN VIEWING USER A IS AT POSITION SHIFTED FROM FRONT BY ANGLE $\phi$, POSITION OF VIRTUAL CAMERA IS SET TO POSITION SHIFTED FROM FRONT BY ANGLE $\theta$. WHEN $\theta = f(\phi)$, FUNCTION EXPRESSING RELATIONSHIP BETWEEN $\theta$ AND $\phi$ IS HELD IN DATABASE IN ADVANCE.

(b) DATABASE EXAMPLE (CORRESPONDENCE RELATIONSHIP DATABASE EXAMPLE BETWEEN VIEWER ANGLE $\phi$ TO OBJECT O AND VIRTUAL CAMERA ANGLE $\theta$)

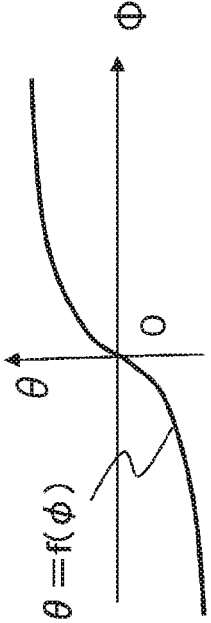

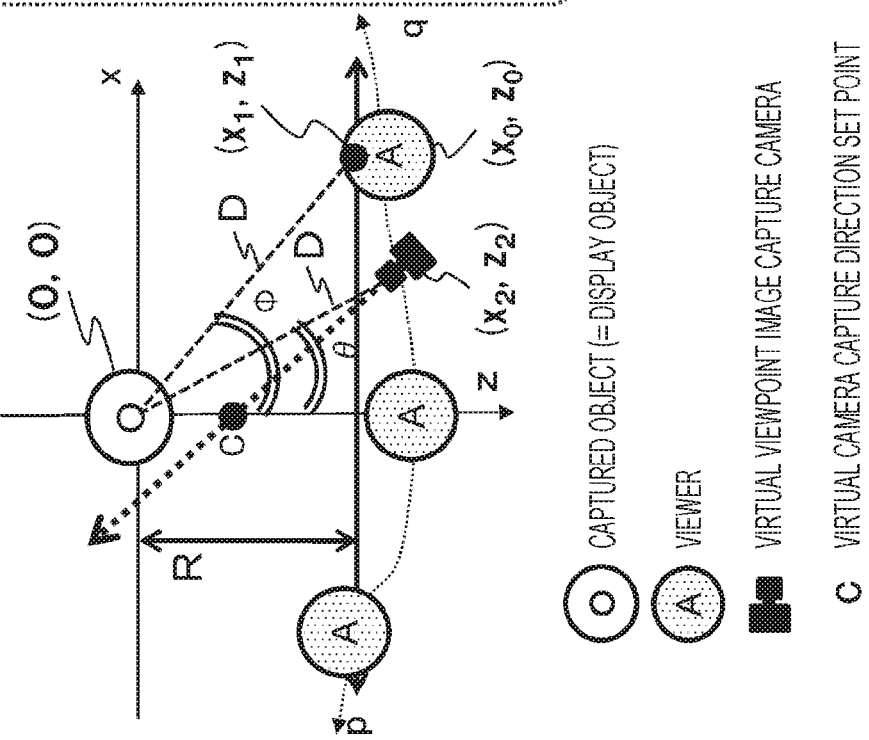

○ CAPTURED OBJECT (=DISPLAY OBJECT)
Ⓐ VIEWER
▪ VIRTUAL VIEWPOINT IMAGE CAPTURE CAMERA
C VIRTUAL CAMERA CAPTURE DIRECTION SET POINT

FIG. 33

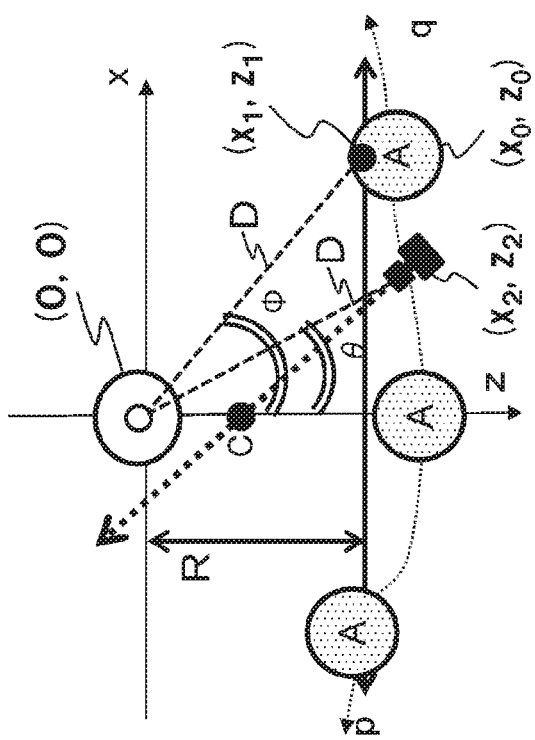

(MODIFICATION OF SIXTH EMBODIMENT) EXAMPLE IN WHICH POSITION OF VIRTUAL CAMERA IS SET TO POSITION WHERE LINES OF SIGHT OF OBJECT AND VIEWER COINCIDE WITH EACH OTHER, AND LOCUS OF VIRTUAL CAMERA IS SET TO MAINTAIN DISTANCE BETWEEN VIRTUAL CAMERA AND OBJECT CONSTANT (c) VIRTUAL CAMERA POSITION CALCULATION EXAMPLE

VIRTUAL CAMERA POSITION $(x_2, z_2)$ IS OBTAINED FROM FACE POSITION $(x_0, z_0)$ OF VIEWING USER A BY FOLLOWING PROCEDURE.
(NOTE THAT FACE POSITION OF A DOES NOT NECESSARILY FOLLOW LOCUS OF STRAIGHT LINE AT DISTANCE R FROM OBJECT O BUT VIRTUAL CAMERA IS APPROXIMATED TO FOLLOW LOCUS OF STRAIGHT LINE AT DISTANCE R FROM OBJECT O)
WHEN CENTER COORDINATES OF A ARE $(x_0, z_0)$, INTERSECTION COORDINATES $(x_1, z_1)$ OF STRAIGHT LINE OA AND LOCUS OF STRAIGHT LINE pq AT DISTANCE R FROM OBJECT O SERVE AS REFERENCE FOR OBTAINING POSITION OF VIRTUAL CAMERA.

WHEN SOLVING SIMULTANEOUS EQUATIONS BELOW:
$z_1 = (z_0 / x_0) x_1$
$z_1 = R$ $x_1 = R x_0 / z_0$
$z_1 = R$
ARE OBTAINED AND
ANGLE $\phi$ IS CALCULATED FROM $(x_1, z_1)$,
$\theta$ IS CALCULATED ACCORDING TO $\theta = f(\phi)$, AND
VIRTUAL CAMERA POSITION $(x_2, z_2)$ IS FURTHER OBTAINED ACCORDING TO RELATIONAL EQUATIONS DESCRIBED WITH REFERENCE TO FIG. 32, THAT IS,
$x_2 = D \sin \theta$, $z_2 = D \cos \theta$.

 CAPTURED OBJECT (= DISPLAY OBJECT)

 VIEWER

 VIRTUAL VIEWPOINT IMAGE CAPTURE CAMERA

C    VIRTUAL CAMERA CAPTURE DIRECTION SET POINT

FIG. 34

(SEVENTH EMBODIMENT) EXAMPLE IN WHICH POSITION OF VIRTUAL CAMERA IS SET TO POSITION (BEHIND VIEWER OR THE LIKE) ON STRAIGHT LINE CONNECTING OBJECT AND VIEWER (a) LOCUS AND DIRECTION OF VIRTUAL CAMERA

WHEN DISTANCE BETWEEN OC IS c AND COORDINATES OF VIEWING USER A ARE $(x_0, z_0)$, CAMERA COORDINATES ARE $(x_2, z_2)$.

$x_2 = (R+r) \sin \Phi$,
$z_2 = (R+r) \cos \Phi$.

LOCUS OF CAMERA IS
$x^2 + z^2 = (R+r)^2$,
DIRECTION OF OPTICAL AXIS IS IN FRONT (c>0) OF OBJECT O AND BEHIND (c<0) OF OBJECT O

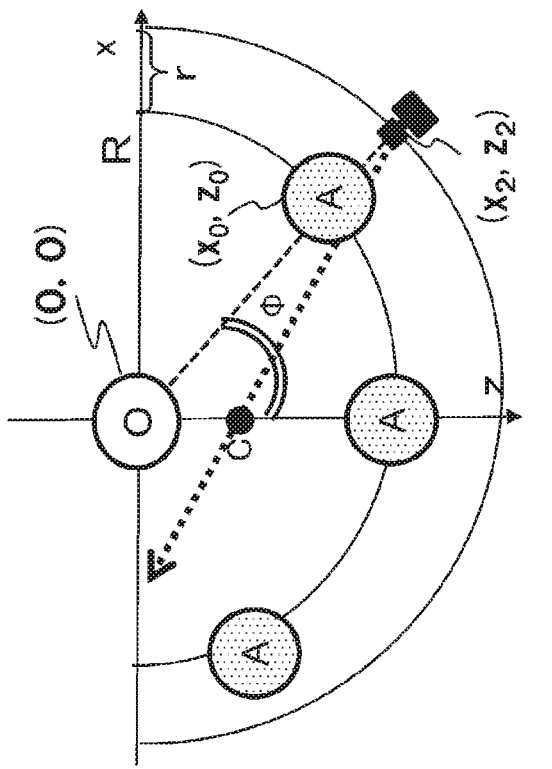

○ CAPTURED OBJECT (= DISPLAY OBJECT)
Ⓐ VIEWER
▪ VIRTUAL VIEWPOINT IMAGE CAPTURE CAMERA
C  VIRTUAL CAMERA CAPTURE DIRECTION SET POINT

FIG. 35

(SEVENTH EMBODIMENT) EXAMPLE IN WHICH POSITION OF VIRTUAL CAMERA IS SET TO POSITION (BEHIND VIEWER OR THE LIKE) ON STRAIGHT LINE CONNECTING OBJECT AND VIEWER

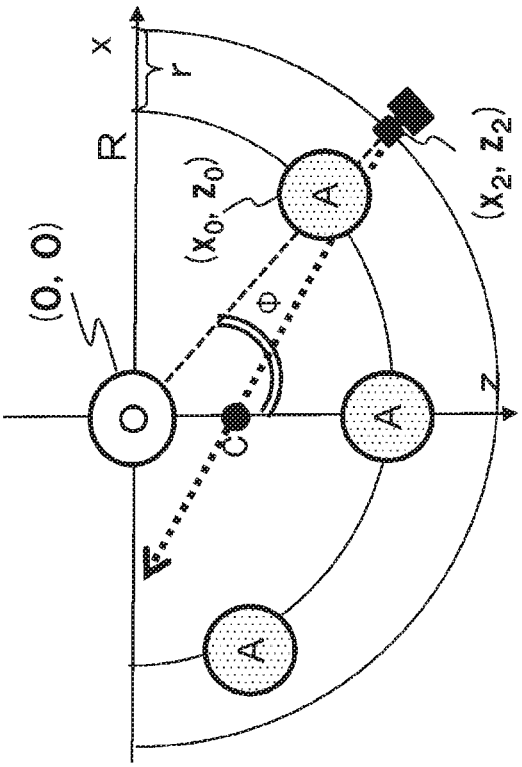

(b) VIRTUAL CAMERA POSITION CALCULATION EXAMPLE

VIRTUAL CAMERA POSITION $(x_2, z_2)$ IS OBTAINED FROM FACE POSITION $(x_0, z_0)$ OF VIEWING USER A BY FOLLOWING PROCEDURE.
(NOTE THAT FACE POSITION OF A DOES NOT NECESSARILY FOLLOW LOCUS OF CIRCLE CENTERED ON OBJECT O BUT VIRTUAL CAMERA IS APPROXIMATED TO FOLLOW LOCUS OF CIRCLE WITH RADIUS R + r CENTERED ON OBJECT O.)
WHEN CENTER COORDINATES OF A ARE $(x_0, z_0)$, INTERSECTION COORDINATES $(x_1, z_1)$ OF STRAIGHT LINE OA AND LOCUS OF CIRCLE WITH RADIUS R HAVING DISTANCE (R) BETWEEN OBJECT O AND VIRTUAL CAMERA AS RADIUS SERVE AS REFERENCE FOR OBTAINING POSITION OF VIRTUAL CAMERA $(x_2, z_2)$.

WHEN SOLVING SIMULTANEOUS EQUATIONS BELOW:
$z_1 = (z_0/x_0)x_1$
$x_1^2 + z_1^2 = R^2$ $x_1 = Rx_0/\sqrt{x_0^2 + z_0^2}$
$z_1 = Rz_0/\sqrt{x_0^2 + z_0^2}$ ARE OBTAINED AND
ANGLE $\phi$ IS CALCULATED FROM $(x_1, z_1)$, AND
VIRTUAL CAMERA POSITION $(x_2, z_2)$ IS OBTAINED ACCORDING TO CORRESPONDENCE RELATIONSHIP BETWEEN R AND r.

○ CAPTURED OBJECT (= DISPLAY OBJECT)
Ⓐ VIEWER
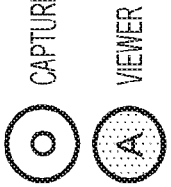 VIRTUAL VIEWPOINT IMAGE CAPTURE CAMERA
C VIRTUAL CAMERA CAPTURE DIRECTION SET POINT (SEVENTH EMBODIMENT) EXAMPLE IN WHICH POSITION OF VIRTUAL CAMERA IS SET TO POSITION (BEHIND VIEWER OR THE LIKE) ON STRAIGHT LINE CONNECTING OBJECT AND VIEWER

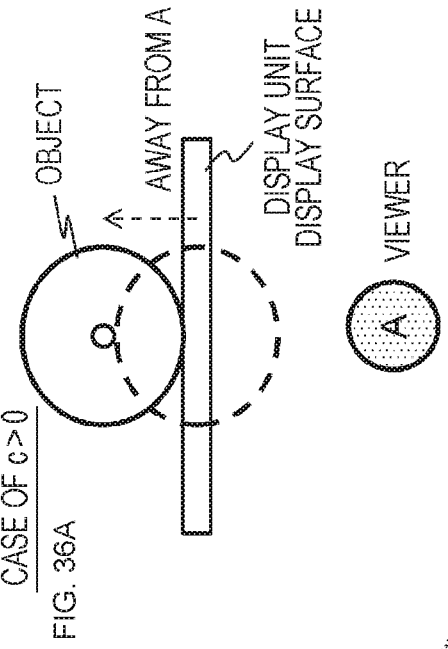

CASE OF $c > 0$
FIG. 36A

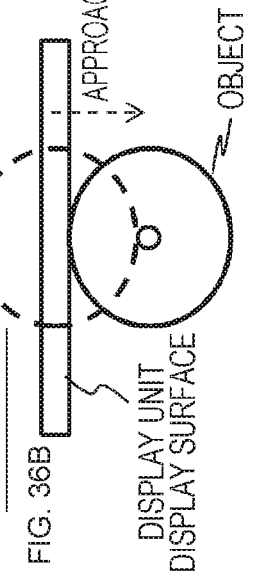

CASE OF $c < 0$
FIG. 36B

FIG. 36C  DISTANCE FROM OBJECT TO VIEWER AND EFFECT TO CHANGE DISTANCE TO VIRTUAL CAMERA

REGARDING DISTANCE $c$ FROM OBJECT O TO VIRTUAL CAMERA CAPTURE DIRECTION SET POINT C,

WHEN $c > 0$,
FACE OF OBJECT TO BE CAPTURED IS DISPLAYED TO BE LOCALIZED AT DEPTH SIDE OF DISPLAY UNIT DISPLAY SURFACE (DISPLAY), WHICH MEANS DISTANCE BETWEEN VIEWER AND OBJECT TO BE CAPTURED IS INCREASED.
TO FURTHER EMPHASIZE EFFECT TO INCREASE DISTANCE, VIRTUAL CAMERA IS SEPARATED FROM OBJECT TO BE CAPTURED ($r > 0$).
THEN FACE OF OBJECT TO BE CAPTURED IS DISPLAYED SMALL.

WHEN $c < 0$,
FACE OF OBJECT TO BE CAPTURED IS DISPLAYED TO BE LOCALIZED IN FRONT OF DISPLAY UNIT DISPLAY SURFACE (DISPLAY), WHICH MEANS DISTANCE BETWEEN VIEWER AND OBJECT TO BE CAPTURED IS DECREASED.
TO FURTHER EMPHASIZE EFFECT TO DECREASE DISTANCE, VIRTUAL CAMERA IS BROUGHT TO APPROACH OBJECT TO BE CAPTURED ($r < 0$).
THEN FACE OF OBJECT TO BE CAPTURED IS DISPLAYED LARGE.

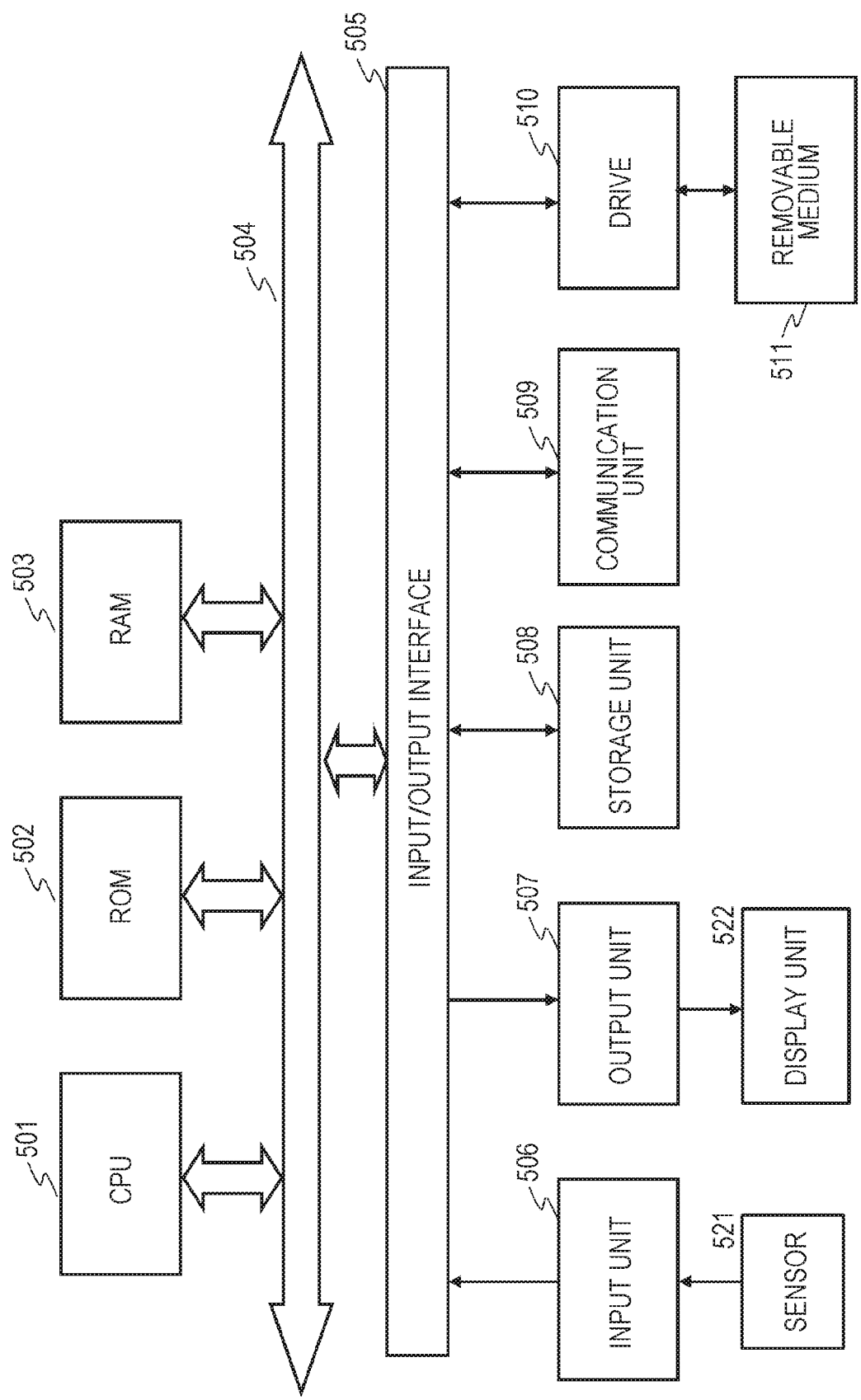

INFORMATION PROCESSING APPARATUS, INFORMATION PROCESSING SYSTEM, AND INFORMATION PROCESSING METHOD

CROSS REFERENCE TO RELATED APPLICATIONS

This application is a U.S. National Phase of International Patent Application No. PCT/JP2017/014549 filed on Apr. 7, 2017, which claims priority benefit of Japanese Patent Application No. JP 2016-094335 filed in the Japan Patent Office on May 10, 2016. Each of the above-referenced applications is hereby incorporated herein by reference in its entirety.

TECHNICAL FIELD

The present disclosure relates to an information processing apparatus, an information processing system, and an information processing method, and a program. More specifically, for example, the present disclosure relates to an information processing apparatus, an information processing system, and an information processing method, and a program for transmitting images and sounds by way of bidirectional communication via a network to execute bidirectional communication.

BACKGROUND ART

Bidirectional communication systems such as video conference systems, which transmit and receive images and sounds by way of bidirectional communication via a network, are used in various fields.

In recent years, a large number of high definition large displays have been used. The quality of images and sounds communicated via the network has been improved, and communication with remote users displayed on a display can be performed with a feeling as if the users were in the same conference room.

However, in such a bidirectional communication system, in many cases, a user such as a conference participant displayed on a display unit (display) is a two-dimensional planar image, and thus there is a problem that the atmosphere as if the other party was on the spot is lost, which lacks realistic feeling.

For example, Patent Document 1 (Japanese Patent Application Laid-Open No. 2014-86775) is a conventional technology that solves the problem.

Patent Document 1 discloses a configuration in which a display image of a display unit is displayed as a three-dimensional model, and the direction of a display person is changed according to movement of a viewer, for example.

In the configuration disclosed in Patent Document 1, an image with stereoscopic effect can be observed by changing the display image according to the movement of the viewer. However, for example, there is a problem that a person position displayed on the display unit is fixed at one position on the display and is observed as a three-dimensional image showing unnatural movement.

CITATION LIST

Patent Document

Patent Document 1: Japanese Patent Application Laid-Open No. 2014-86775

SUMMARY OF THE INVENTION

Problems to be Solved by the Invention

The present disclosure has been made in view of the above-described problems, for example, and an object of the present disclosure is to provide an information processing apparatus, an information processing system, and an information processing method, and a program for enabling display of an image to be displayed on a display unit (display) used in a bidirectional communication system as a display image for enabling a user to feel as if he/she is on the spot, for example.

Solutions to Problems

A first aspect of the present disclosure is
an information processing apparatus including:
a virtual viewpoint position calculation unit configured to calculate a virtual viewpoint position corresponding to a position of a virtual camera that captures a virtual viewpoint image on the basis of viewing position information of a viewing user of the virtual viewpoint image; and
a virtual viewpoint image generation unit configured to generate the virtual viewpoint image corresponding to a captured image from the virtual viewpoint position, in which
the virtual viewpoint image generation unit
is configured to generate the virtual viewpoint image on the basis of a captured image of a real camera that captures an object user, and
generates the virtual viewpoint image, setting a capture direction to a virtual camera capture direction set point C set to a different position from the object user.

Further, a second aspect of the present disclosure is
an information processing apparatus including:
a reception unit configured to receive viewing position information of a viewing user of a virtual viewpoint image;
a virtual viewpoint position calculation unit configured to calculate a virtual viewpoint position corresponding to a position of a virtual camera that captures the virtual viewpoint image on the basis of the viewing position information;
a virtual viewpoint image generation unit configured to generate the virtual viewpoint image corresponding to a captured image from the virtual viewpoint position; and
a transmission unit configured to transmit the virtual viewpoint image generated by the virtual viewpoint image generation unit to an apparatus on a side of the viewing user, in which
the virtual viewpoint image generation unit
is configured to generate the virtual viewpoint image on the basis of a captured image of a real camera that captures an object user, and
generates the virtual viewpoint image, setting a capture direction to a virtual camera capture direction set point C set to a different position from the object user.

Further, a third aspect of the present disclosure is
an information processing apparatus including:
a viewing position detection unit configured to detect viewing position information of a viewing user of a virtual viewpoint image;
a virtual viewpoint position calculation unit configured to calculate a virtual viewpoint position corresponding to a position of a virtual camera that captures the virtual viewpoint image on the basis of the viewing position information; and a virtual viewpoint image generation unit configured to generate the virtual viewpoint image corresponding to a captured image from the virtual viewpoint position, in which the virtual viewpoint image generation unit is configured to generate the virtual viewpoint image on the basis of a captured image of a real camera that captures an object user, and generates the virtual viewpoint image, setting a capture direction to a virtual camera capture direction set point C set to a different position from the object user.

Further, a fourth aspect of the present disclosure is an information processing system including a first information processing apparatus and a second information processing apparatus that execute bidirectional communication, each of the first information processing apparatus and the second information processing apparatus including:

a reception unit configured to receive viewing position information of a viewing user of a virtual viewpoint image from a communication partner apparatus;

a virtual viewpoint position calculation unit configured to calculate a virtual viewpoint position corresponding to a position of a virtual camera that captures the virtual viewpoint image to be displayed on a display unit of the communication partner apparatus on the basis of the viewing position information;

a virtual viewpoint image generation unit configured to generate the virtual viewpoint image corresponding to a captured image from the virtual viewpoint position; and a transmission unit configured to transmit the virtual viewpoint image to the communication partner apparatus, in which the virtual viewpoint image generation unit is configured to generate the virtual viewpoint image on the basis of a captured image of a real camera that captures an object user, and generates the virtual viewpoint image, setting a capture direction to a virtual camera capture direction set point C set to a different position from the object user.

Further, a fifth aspect of the present disclosure is an information processing method executed in an information processing apparatus, the information processing method including:

calculating, by a virtual viewpoint position calculation unit, a virtual viewpoint position corresponding to a position of a virtual camera that captures a virtual viewpoint image on the basis of viewing position information of a viewing user of the virtual viewpoint image; and executing, by a virtual viewpoint image generation unit, virtual viewpoint image generation processing of generating the virtual viewpoint image corresponding to a captured image from the virtual viewpoint position, in which the virtual viewpoint image generation unit generates the virtual viewpoint image on the basis of a captured image of a real camera that captures an object user, and generates the virtual viewpoint image, setting a capture direction to a virtual camera capture direction set point C set to a different position from the object user.

Further, a sixth aspect of the present disclosure is a program for causing an information processing apparatus to execute information processing, the program for causing:

a virtual viewpoint position calculation unit to calculate a virtual viewpoint position corresponding to a position of a virtual camera that captures a virtual viewpoint image on the basis of viewing position information of a viewing user of the virtual viewpoint image; and a virtual viewpoint image generation unit to execute virtual viewpoint image generation processing of generating the virtual viewpoint image corresponding to a captured image from the virtual viewpoint position, in which, in the virtual viewpoint image generation processing, the program causes the virtual viewpoint image to be generated on the basis of a captured image of a real camera that captures an object user, and causes the virtual viewpoint image to be generated, setting a capture direction to a virtual camera capture direction set point C set to a different position from the object user.

Note that the program of the present disclosure is, for example, a program that can be provided by a storage medium or a communication medium provided in a computer readable format to an information processing apparatus or a computer system that can execute various program codes. By providing such a program in the computer readable format, processing according to the program is realized on the information processing apparatus or the computer system.

Still other objects, features, and advantages of the present disclosure will become clear from more detailed description based on embodiments and attached drawings of the present disclosure described below. Note that the system in the present specification is a logical aggregate configuration of a plurality of devices, and is not limited to devices having respective configurations within the same housing.

Effects of the Invention

According to the configuration of an embodiment of the present disclosure, the configuration to make a virtual viewpoint image be a more natural stereoscopic image is realized, the virtual viewpoint image being transmitted/received between information processing apparatuses that execute bidirectional communication.

Specifically, a virtual viewpoint position calculation unit configured to calculate a virtual viewpoint position corresponding to a position of a virtual camera that captures a virtual viewpoint image on the basis of viewing position information of a viewing user of the virtual viewpoint image, and a virtual viewpoint image generation unit configured to generate the virtual viewpoint image corresponding to a captured image from the virtual viewpoint position are included. The virtual viewpoint image generation unit is configured to generate the virtual viewpoint image on the basis of a captured image of a real camera that captures an object user, and generates the virtual viewpoint image, setting a capture direction to a virtual camera capture direction set point C set to a position different from the object user. For example, the virtual viewpoint image generation unit generates the virtual viewpoint image assumed to be captured, pointing the capture direction to the virtual camera capture direction set point C set to a front position of the object user.

With the present configuration, the configuration to make the virtual viewpoint image be a more natural stereoscopic image is realized, the virtual viewpoint image being transmitted/received between information processing apparatuses that execute bidirectional communication.

Note that the effects described in the present specification are merely examples and are not limited, and additional effects may be exhibited.

BRIEF DESCRIPTION OF DRAWINGS

FIG. 12 is a flowchart for describing a processing sequence executed by the information processing apparatus of the present disclosure.

FIGS. 18A, 18B, and 18C are diagrams for describing an example of a display image according to the setting of the virtual camera in the modification of the first embodiment of the present disclosure.

FIG. 19 is a diagram for describing an example of a visual sensation of a display image according to the setting of the virtual camera in the modification of the first embodiment of the present disclosure.

FIG. 20 is a diagram for describing setting and a position calculation example of the virtual camera in the modification of the first embodiment of the present disclosure.

FIG. 21 is a diagram for describing setting and a position calculation example of a virtual camera according to a second embodiment of the present disclosure.

FIG. 22 is a diagram for describing setting and a position calculation example of a virtual camera in a modification of the second embodiment of the present disclosure.

FIGS. 24A, 24B, and 24C are diagrams for describing an example of a display image according to the setting of the virtual camera in the third embodiment of the present disclosure.

FIG. 25 is a diagram for describing setting and a position calculation example of the virtual camera according to the third embodiment of the present disclosure.

FIG. 26 is a diagram for describing setting and a position calculation example of a virtual camera according to a fourth embodiment of the present disclosure.

FIG. 27 is a diagram for describing a setting example of a virtual camera in a fifth embodiment of the present disclosure.

FIG. 28 is a diagram for describing a setting example of the virtual camera in the fifth embodiment of the present disclosure.

FIG. 30 is a diagram for describing a setting example of a virtual camera in a sixth embodiment of the present disclosure.

FIG. 31 is a diagram for describing setting and a position calculation example of the virtual camera according to the sixth embodiment of the present disclosure.

FIG. 32 is a diagram for describing a setting example of a virtual camera in a modification of the sixth embodiment of the present disclosure.

FIG. 33 is a diagram for describing setting and a position calculation example of the virtual camera in the modification of the sixth embodiment of the present disclosure.

FIG. 34 is a diagram for describing a setting example of a virtual camera in a seventh embodiment of the present disclosure.

FIG. 35 is a diagram for describing setting and a position calculation example of the virtual camera according to the seventh embodiment of the present disclosure.

FIGS. 36A, 36B, and 36C are diagrams for describing how an object looks according to the setting of the virtual camera in the seventh embodiment of the present disclosure.

FIG. 37 is a diagram for describing a configuration example of hardware of an information processing apparatus.

MODE FOR CARRYING OUT THE INVENTION

Figure 1:
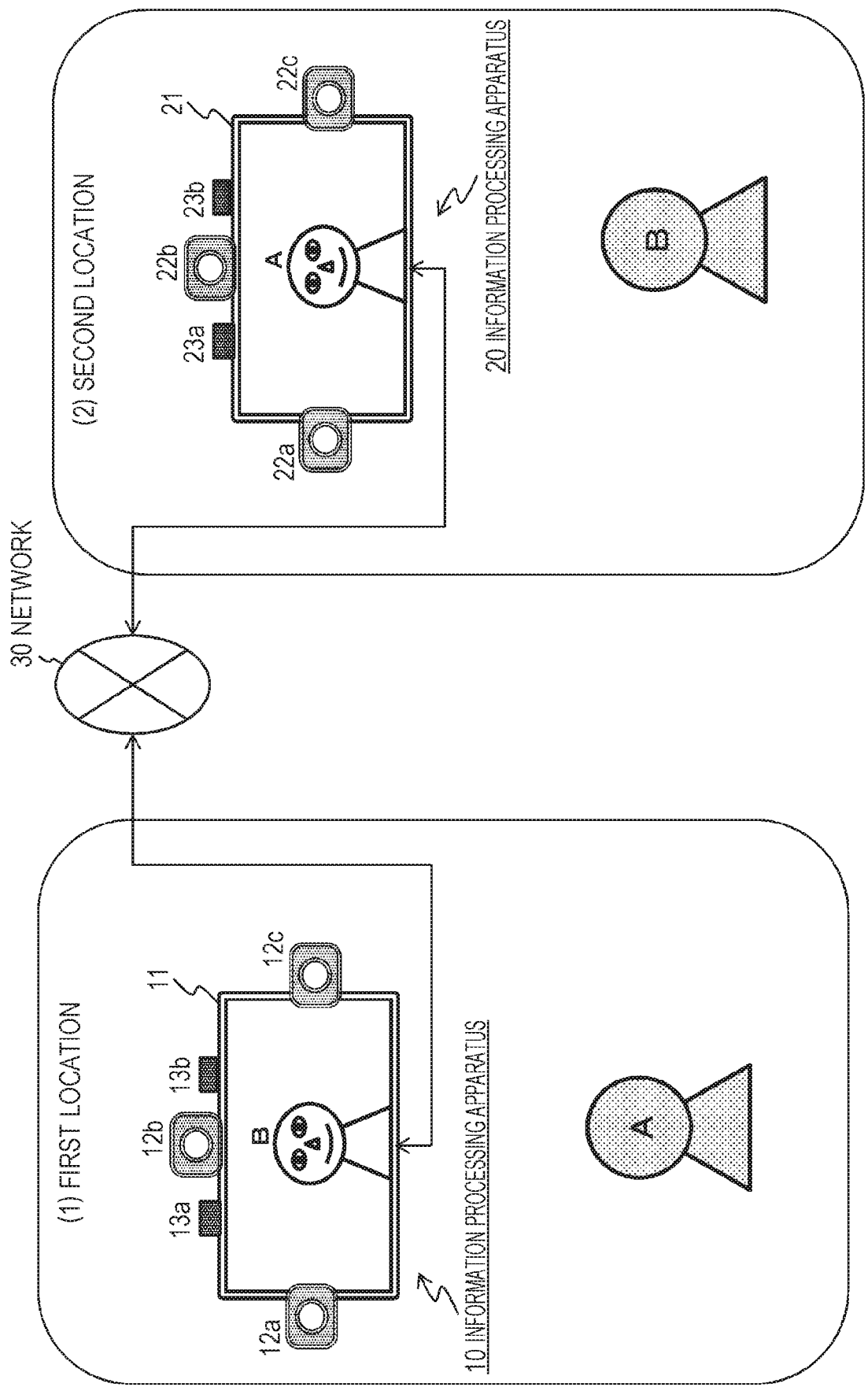
FIG. 1 is a diagram for describing a bidirectional communication system.

Hereinafter, an information processing apparatus, an information processing system, and an information processing method, and a program of the present disclosure will be described in detail with reference to the drawings. Note that the description will be given according to the following items.

1. Outline of bidirectional communication processing and stereoscopic effect presentation effect based on motion parallax 2. Configuration to display object on display unit as stereoscopic image with natural sense of depth 3. Configuration and processing of information processing apparatus of present disclosure 4. (First Embodiment) Embodiment in which virtual camera is moved in circular manner with radius R 5. Processing sequence executed by information processing apparatus 6. Embodiment in which processing of generating display virtual viewpoint image to be displayed on display unit of local apparatus is performed on local apparatus side 7. (First Modification of First Embodiment) Example in which calculation of virtual camera position corresponding to capture position of virtual viewpoint image is simplified 8. (Second Modification of First Embodiment) Example in which virtual camera capture direction set point C is arranged behind object 9. (Third Modification of First Embodiment) Example in which virtual camera is located on circle with radius R centered on virtual camera capture direction set point C 10. (Fourth Modification of First Embodiment) Example of setting in which position of virtual camera capture direction set point C is moved according to viewing user position 11. (Second Embodiment) Embodiment in which virtual camera that captures virtual viewpoint image is linearly moved 12. (First Modification of Second Embodiment) Example in which calculation of virtual camera position corresponding to capture position of virtual viewpoint image is simplified 13. (Third Embodiment) Embodiment in which virtual camera that captures virtual viewpoint image is vertically and circularly moved with radius R 14. (Fourth Embodiment) Embodiment in which virtual camera that captures virtual viewpoint image is linearly and vertically moved 15. (Fifth Embodiment) Embodiment in which position of virtual camera is set to position where lines of sight of object and viewer coincide with each other 16 (Sixth Embodiment) Embodiment in which position of virtual camera is set to position where lines of sight of object and viewer coincide with each other, and movement of virtual camera is linearly set 17. (First Modification of Sixth Embodiment) Embodiment in which position of virtual camera is set to position where lines of sight between object and viewer coincide with each other, and locus of virtual camera is set to keep distance between virtual camera and object constant 18. (Seventh Embodiment) Embodiment in which position of virtual camera is set to position (behind viewer or the like) on straight line connecting object and viewer 19. Hardware configuration example of information processing apparatus 20. Conclusion of configuration of present disclosure 1. Outline of Bidirectional Communication Processing and Stereoscopic Effect Presentation Effect Based on Motion Parallax First, an outline of bidirectional communication processing and a stereoscopic effect presentation effect based on a motion parallax will be described.

FIG. 1 is a diagram illustrating an example of a bidirectional communication system.

FIG. 1 illustrates a configuration example of two locations:

(1) a first location; and
(2) a second location.

These two locations are located at distant remote locations from each other, and users in the respective locations perform bidirectional communication. Systems at respective locations are connected via a network 30.

A user A is at the first location.

Further, an information processing apparatus 10 including a display unit (display) 11, cameras 12a to 12c, and audio input/output units (microphones and speakers) 13a and 13b is at the first location.

Meanwhile, a user B is at the second location.

Further, an information processing apparatus 10 including a display unit (display) 21, cameras 22a to 22c, and audio input/output units (microphones and speakers) 23a and 23b is at the second location.

The cameras 12a to 12c at the first location capture the user A at the first location from different directions.

A data processing unit in the information processing apparatus 10 generates one virtual viewpoint image from these images as a transmission image and transmits the virtual viewpoint image to the information processing apparatus 20 at the second location via the network 30.

The one virtual viewpoint image generated by the information processing apparatus 10 at the first location is displayed on the display unit 21 of the information processing apparatus 20 at the second location.

This virtual viewpoint image is, for example, an observation image from a viewpoint of the user B. Viewpoint information of the user B is analyzed by the information processing apparatus 20 on the basis of captured images by the cameras 22a to 22c at the second location, and viewpoint analysis information is transmitted to the information processing apparatus 10 at the first location.

Note that the audio input/output units (microphones and speakers) 13a and 13b at the first location acquire utterance and the like of the user A at the first location, and acquired audio data is transmitted to the information processing apparatus 20 at the second location via the network 30.

The information processing apparatus 20 at the second location outputs received audio from the first location via the audio input/output units (microphones and speakers) 23a and 23b.

Meanwhile, the cameras 22a to 22c at the second location capture the user B at the second location from different directions.

A data processing unit in the information processing apparatus 20 generates one virtual viewpoint image from these images as a transmission image and transmits the virtual viewpoint image to the information processing apparatus 10 at the first location via the network 30.

The one virtual viewpoint image generated by the information processing apparatus 20 at the second location is displayed on the display unit 11 of the information processing apparatus 10 at the first location.

This virtual viewpoint image is, for example, an observation image from a viewpoint of the user A. Viewpoint information of the user A is analyzed by the information processing apparatus 10 on the basis of the captured images by the cameras 12a to 12c at the first location, and viewpoint analysis information is transmitted to the information processing apparatus 20 at the second location.

Further, the audio input/output units (microphones and speakers) 23a and 23b at the second location acquire utterance and the like of the user B at the second location, and acquired audio data is transmitted to the information processing apparatus 10 at the first location via the network 30.

The information processing apparatus 10 at the first location outputs received audio from the second location via the audio input/output units (microphones and speakers) 13a and 13b.

With such processing, the user A at the first location and the user B at the second location can acquire the image and utterance of the user at the remote location via the display unit and the speaker to perform bidirectional communication.

Such bidirectional communication processing enables communication with realistic feeling as if a communication partner was on the spot by use of the virtual viewpoint images as display images of the users displayed on the display units 11 and 21.

The conversation user displayed on the display unit can be presented as an image that imparts a feeling as if the user faces the conversation user at the same location, that is, an image with a stereoscopic effect, by use of the virtual viewpoint image.

There is a motion parallax as a parallax that imparts a presentation effect of the stereoscopic effect.

The stereoscopic effect presentation effect based on the motion parallax will be described with reference to FIGS. 2A, 2B, and 2C and subsequent drawings.

A human can grasp a stereoscopic structure, that is, a three-dimensional structure, of an object to be observed on the basis of visual observation information.

One of the visual observation information is a parallax of images observed in left and right eyes, that is, a binocular parallax.

Furthermore, another visual observation information is the motion parallax.

The motion parallax is a parallax that occurs according to movement of either an observer or an object to be observed. For example, in the case where you observe the outside through a window of a train, an object nearby moves quickly and scenery of distant mountains moves slowly. The motion parallax is a parallax that occurs according to an observation distance by the movement of the observation object itself or the movement of the observer himself/herself, and discriminates an object nearby and an object faraway, that is, an object distance, to enable grasp of the stereoscopic effect.

Note that this motion parallax is a parallax obtained from an image observed with one eye, which is different from the binocular parallax, and the stereoscopic effect can be grasped by one eye observation.

Grasp of the stereoscopic effect by the motion parallax and presentation examples will be described with reference to FIGS. 2A, 2B, 2C, 3A, 3B, and 3C.

Figure 2:
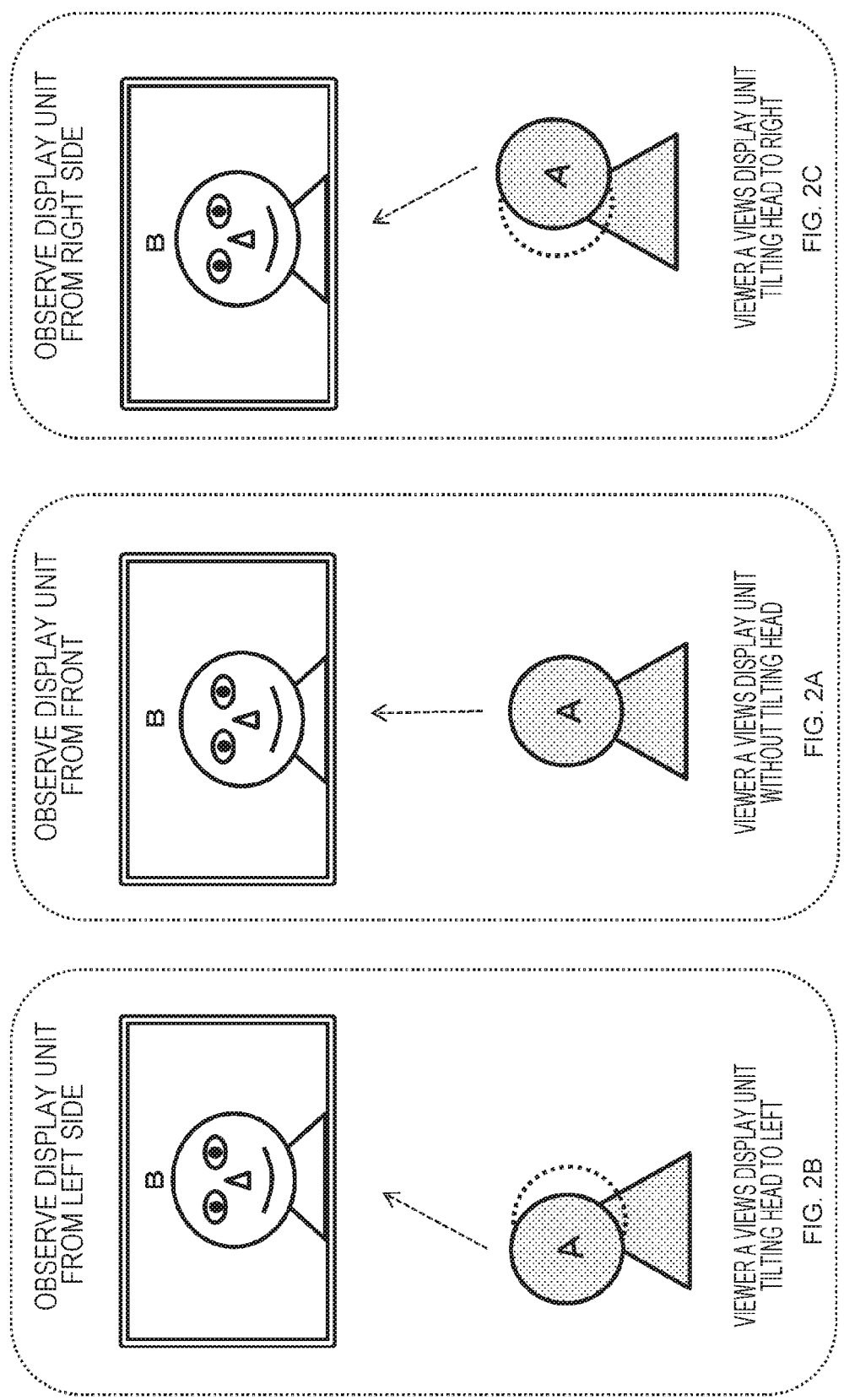
FIGS. 2A, 2B, and 2C are diagrams for describing a motion parallax.

FIGS. 2A, 2B, and 2C illustrate, for example, the users A and B who are performing a television conference or the like using the system described with reference to FIG. 1. The user A is at the first location and user B is at the remote second location. An image and audio of the user B are transmitted to the first location where the user A is present via the network, the face of the user B is displayed on the display unit (display) and conversation is performed between the user A and the user B.

FIGS. 2A, 2B, and 2C illustrate the following figures:

FIG. 2A: a case where the user A observes the display unit from the front;

FIG. 2B: a case where the user A obliquely observes the display unit from the left; and FIG. 2C: a case where the user A obliquely observes the display unit from the right.

In the case of a configuration in which the face of the user B is captured by the camera in front of the user B at the second location where the user B is present, and the captured image is displayed as it is on the display unit at the first location, a display form of the user B is completely unchanged even if the observation position of the user A is changed, and is an image of the face facing the front, that is, the face (front face) of the user B viewed from the front, as illustrated in FIGS. 2A, 2B, and 2C.

When such display processing is performed, the user A can only observe the user B as a planar two-dimensional image and cannot grasp the stereoscopic effect.

That is, the stereoscopic effect by the motion parallax cannot be grasped.DD

Figure 3:
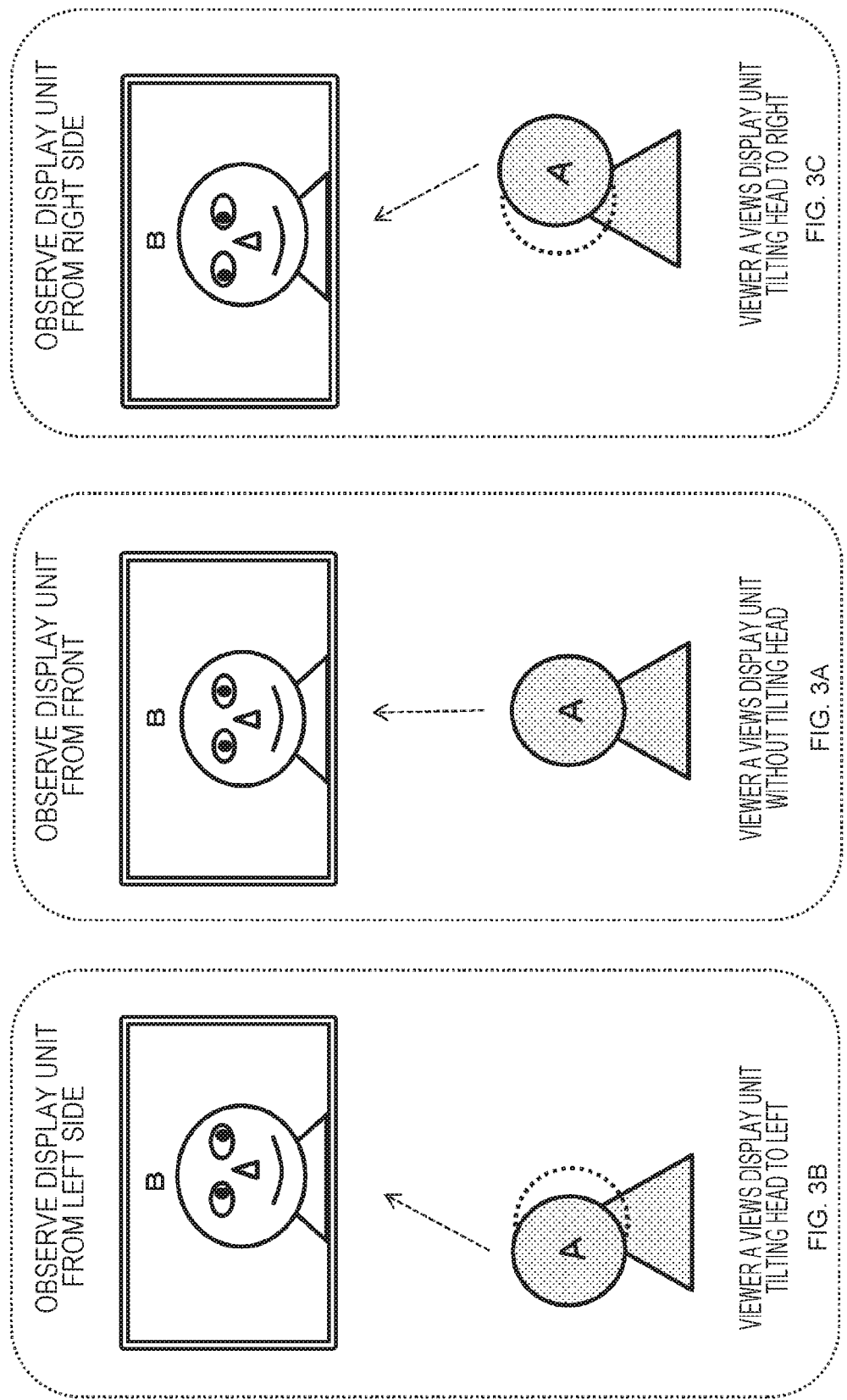
FIGS. 3A, 3B, and 3C are diagrams for describing a motion parallax.

In contrast, FIGS. 3A, 3B, and 3C illustrate an example of a display form that enables grasp of the stereoscopic effect by the motion parallax.

The three diagrams in FIGS. 3A, 3B, and 3C illustrate the following cases, similarly to FIGS. 2A, 2B, and 2C:

FIG. 3A: Case where the user A observes the display unit from the front;

FIG. 3B: Case where the user A obliquely observes the display unit from the left; and FIG. 3C: Case where the user A obliquely observes the display unit from the right.

The display forms of the user B on the display unit illustrated in FIGS. 3A 3B, and 3C are as follows.

FIG. 3A: In the case where the user A observes the display unit from the front, the face of the user B viewed from the front is displayed.

FIG. 3B: In the case where the user A obliquely observes the display unit form the left, the face of the user B obliquely viewed from the left is displayed.

FIG. 3C: In the case where the user A obliquely observes the display unit from the right, the face of the user B obliquely viewed from the right is displayed.

The user A can see the user B from different directions according to the movement the viewpoint of the user A. In this manner, how a certain object looks is different according to the movement of the observer himself/herself who observes the object or the movement of the observation object, that is, a parallax occurs. This parallax is the motion parallax, and the observer (user A) can grasp the observation object (user B) as a stereoscopic object by the motion parallax.

The display form change processing illustrated in FIGS. 3A, 3B, and 3C is executed according to the movement of the user A who is a viewer of the display unit. This display control corresponds to the display control described in Patent Document 1 (Japanese Patent Application Laid-Open No. 2014-86775), which has been described in the above "Background Art".

Specifically, the display control is configured to capture the user B by cameras located at a plurality of different positions, and to generate and display a virtual image from a viewpoint direction of the user A on the basis of the plurality of captured images.

However, the position of the user B is fixed to a display surface position of the display unit by the method. That is, the viewing user A who is viewing the display unit feels that the user B is present at a position sticking to the display surface, and there is a problem that the user B is observed as a three-dimensional image showing unnatural movement.

For example, it is considered that if an observation image in which the user B is located in a depth side of the display surface of the display unit is obtained, grasp of the stereoscopic effect with more natural positional relationship becomes possible.

Hereinafter, processing of the present disclosure that enables display of a display object such as a person to be displayed on the display unit with more natural sense of depth or stereoscopic effect will be described.

2. Configuration to Display Object on Display Unit as Stereoscopic Image with Natural Sense of Depth Next, processing executed by an information processing apparatus of the present disclosure, that is a configuration to display a display object on a display unit as a stereoscopic image with a natural sense of depth will be described.

FIGS. 4A and 4B illustrate setting examples of the following two virtual viewpoint image capture cameras:

FIG. 4A: a setting example of a conventional virtual viewpoint image capture camera; and FIG. 4B: a setting example of a virtual viewpoint image capture camera of the present disclosure.

The user displayed as the virtual viewpoint image is a user O in this example. The viewer who views the user O displayed on the display unit is the user A.

The user A views the user O on the display unit from various positions (p1, p2, and p3) as illustrated in FIGS. 4A and 4B.

The virtual viewpoint image to be displayed on the display unit is a virtual viewpoint image captured by a virtual camera corresponding to the position (=virtual viewpoint) of the user A.

This virtual viewpoint image is generated by processing of combining images captured from a plurality of different positions described with reference to FIG. 1.

FIG. 4A corresponds to the display control described in Patent Document 1 (Japanese Patent Application Laid-Open No. 2014-86775) described above.

In the case where the viewing user A views the display unit from the position p1, the virtual viewpoint image capture camera is set to the position p1, an image of the user O captured from the position is generated as the virtual viewpoint image, and the virtual viewpoint image is displayed on the display unit on the viewing user A side.

Further, in the case where the viewing user A views the display unit from the position p2, the virtual viewpoint image capture camera is set to the position p2, an image of the user O captured from the position is generated as the virtual viewpoint image, and the virtual viewpoint image is displayed on the display unit on the viewing user A side.

Further, in the case where the viewing user A views the display unit from the position p3, the virtual viewpoint image capture camera is set to the position p3, an image of the user O captured from the position is generated as the virtual viewpoint image, and the virtual viewpoint image is displayed on the display unit on the viewing user A side.

The setting example of the virtual viewpoint image capture camera illustrated in FIG. 4A corresponds to the display control described in Patent Document 1 (Japanese Patent Application Laid-Open No. 2014-86775). As a result, the position of the user O is fixed to a display surface position of the display unit. That is, as described with reference to FIGS. 3A, 3B, and 3C, there is a problem that the user O is observed as a three-dimensional image showing unnatural movement such as the position of the user O sticking to the display surface.

On the other hand, FIG. 4B corresponds to an example of display control executed by an information processing apparatus of the present disclosure.

In the case where the viewing user A views the display unit from the position p1, the virtual viewpoint image capture camera is set to the position p1, similarly to FIG. 4A. However, a capture direction of the virtual viewpoint image capture camera is not set to the user O but is set to a virtual camera capture direction set point C set in front of the user O. The same applies to the setting of the virtual viewpoint image capture camera in the case where the viewing user A views the display unit from the position p2 or p3, the capture direction of each virtual viewpoint image capture camera set to each position is not set to the user O but is set to the virtual camera capture direction set point C set in front of the user O.

In this way, by setting the capture direction of the virtual viewpoint image capture camera to the virtual camera capture direction set point C set in front of the user O, not to the user O, the user O can be displayed in a form different from the display in which the display user sticks to the display unit surface as described with reference to FIGS. 3A, 3B, and 3C.

Specifically, the display object such as the user displayed on the display unit can be displayed as a stereoscopic image with a natural sense of depth.

Specific display examples will be described with reference to FIGS. 5A, 5B, and 5C and subsequent drawings.

Figure 4:
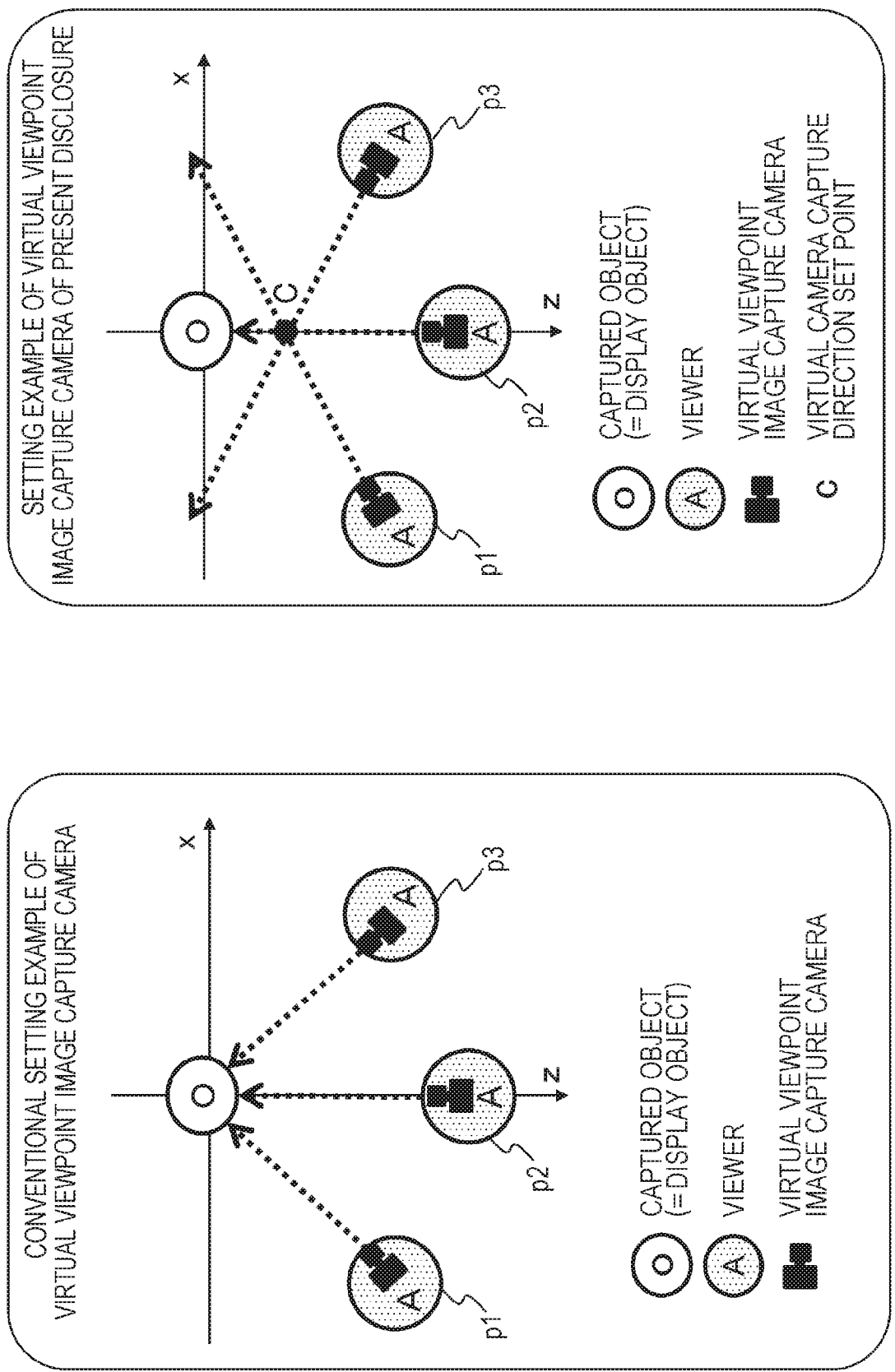
FIGS. 4A and 4B are diagrams for describing setting examples of virtual cameras.
Figure 5:
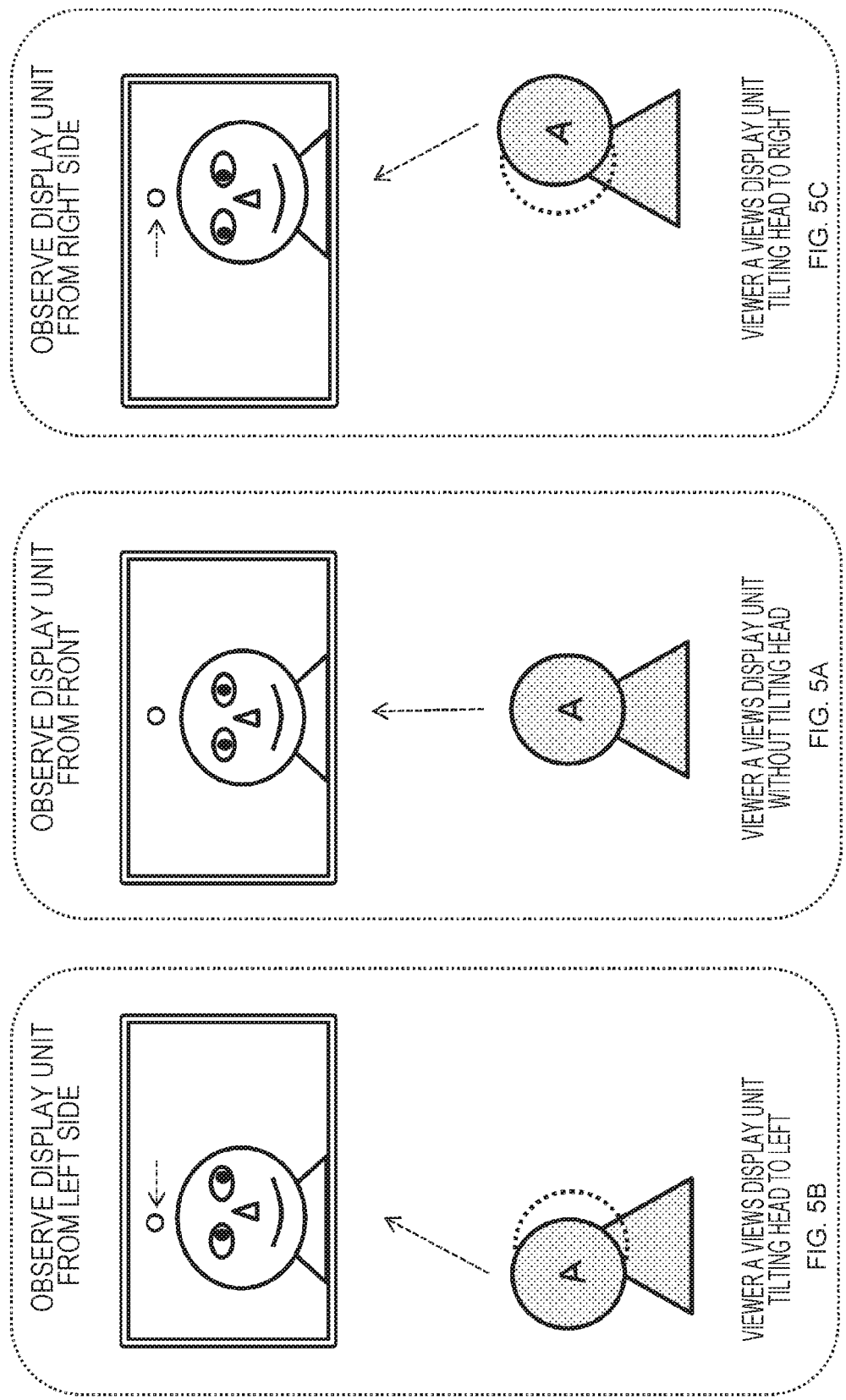
FIGS. 5A, 5B, and 5C are diagrams for describing an example of images displayed on a display unit by processing of the present disclosure.

FIGS. 5A, 5B, and 5C are diagrams illustrating display examples of a virtual viewpoint image generated in virtual viewpoint image capture camera setting illustrated in FIG. 4B.

FIGS. 5A, 5B, and 5C illustrate the following diagrams, similarly to the diagrams described with reference to FIGS. 3A, 3B, and 3C:

FIG. 5A: a case where the user A observes the display unit from the front (=a case where the user A observes the display unit from the position p2 in FIG. 4B);

FIG. 5B: a case where the user A obliquely observes the display unit from the front (=a case where the user A observes the display unit from the position p1 in FIG. 4B); and FIG. 5C: a case where the user A obliquely observes the display unit from the right (=a case where the user A observes the display unit from the position p3 in FIG. 4B).

The display form of the user O on the display unit illustrated in FIGS. 5A 5B, and 5C is as follows.

FIG. 5A: In the case where the user A observes the display unit from the front, the face of the user O viewed from the front is displayed.

The display position of the user O is in the center of the display unit.

FIG. 5B: In the case where the user A obliquely observes the display unit from the left, the face of the user O obliquely viewed from the left is displayed.

Note that the display position of the user O moves to a left side on the display unit. This is because the direction of the virtual image capture camera faces the virtual camera capture direction set point C illustrated in FIG. 4B. The point C is set to a central position on the display unit, and the display position of the user O is a position shifted to a left side from the center of the display unit.

Further, FIG. 5C: in the case where the user A obliquely observes the display unit from the right, the face of the user O obliquely viewed from the right is displayed.

Note that the display position of the user O moves to a right side on the display unit. This is because the direction of the virtual image capture camera faces the virtual camera capture direction set point C illustrated in FIG. 4B. The point C is set to a central position on the display unit, and the display position of the user O is a position shifted to a right side from the center of the display unit.

Which position the user O is displayed on the display unit is grasped by the viewing user A will be described with reference to FIGS. 6A, 6B, 6C, and 7.

Figure 6:
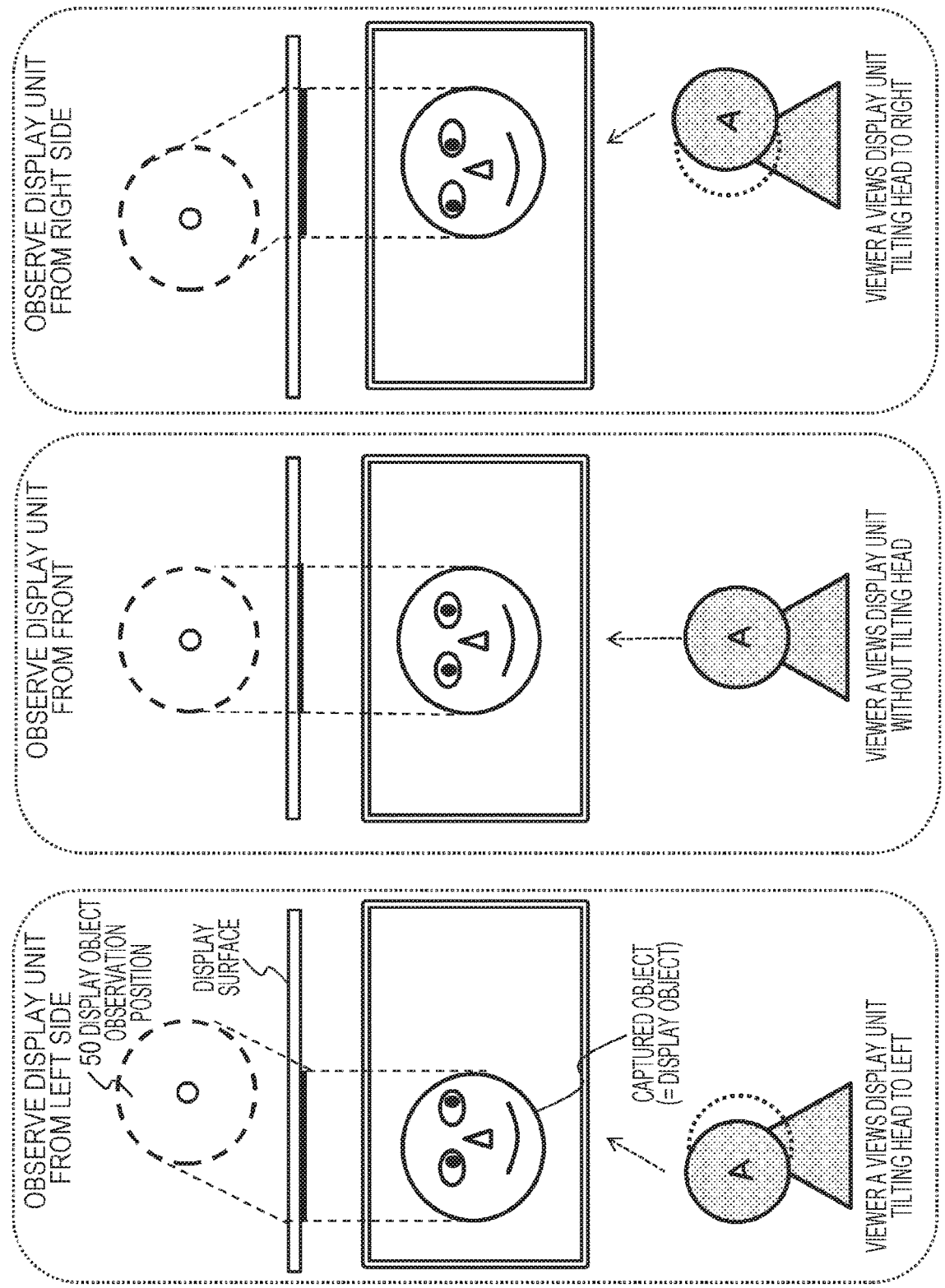
FIGS. 6A, 6B, and 6C are diagrams for describing an example of images displayed on the display unit by the processing of the present disclosure.

In FIGS. 6A, 6B, and 6C, a diagram of the display surface of the display unit as viewed from above on the upper section, and a diagram illustrating which position the display user O is viewed from the viewing user A are added in accordance with diagrams similar to those in FIGS. 5A, 5B, and 5C.

FIGS. 6A, 6B, and 6C are the following diagrams as in FIGS. 5A, 5B, and 5C:

FIG. 6A: a case where the user A observes the display unit from the front (=a case where the user A observes the display unit from the position p2 in FIG. 4B);

FIG. 6B: a case where the user A obliquely observes the display unit from the front (=a case where the user A observes the display unit from the position p1 in FIG. 4)B; and FIG. 6C: on the right: a case where the user A obliquely observes the display unit from the right (=a case where the user A observes the display unit from the position p3 in FIG. 4)B).

The position of the display user O grasped by the viewing user A is a position separated behind the display surface of the display unit, as illustrated in the upper section in FIGS. 6A, 6B, and 6C.

FIG. 6B: in the case where the user A obliquely observes the display unit from the left, the face of the user O obliquely viewed from the left is displayed on the left on the display unit, FIG. 6A: in the case where the user A observes the display unit from the front, the face of the user O viewed from the front is displayed in the center on the display unit, and FIG. 6C: in the case where the user A obliquely observes the display unit from the right, the face of the user O obliquely viewed from the right is displayed on the right side on the display unit.

As a result, the viewing user A grasps that the display user O is located at an object observation position 50 illustrated in the upper section in FIGS. 6A, 6B, and 6C.

That is, the position is a position on a depth side of the display surface on the display unit.

Figure 7:
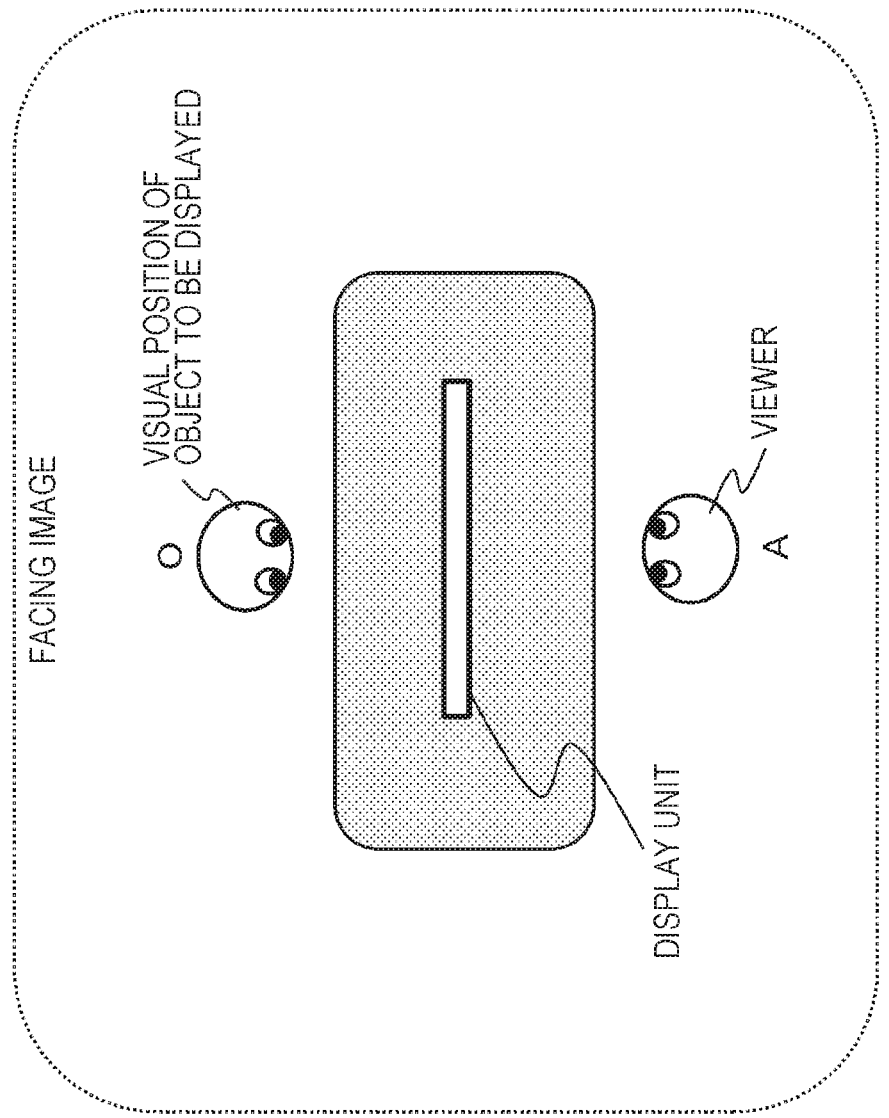
FIG. 7 is a diagram for describing an example of the images displayed on the display unit by the processing of the present disclosure.

FIG. 7 is a diagram for describing a specific existence position recognition example of the display user O grasped by the viewing user A.

The viewing user A can grasp that the display user O is located on the depth side of the display surface of the display unit placed on a table, for example, and a stereoscopic image with a more natural sense of depth is displayed.

In this way, although the display user is grasped as if the user was located at a position sticking to the display surface, as described with reference to FIGS. 3A, 3B, and 3C, in the setting configuration of the conventional virtual viewpoint image capture camera in FIG. 4A, the display user O can be displayed to exist at a position separated from the display surface on the display unit and a stereoscopic image with a natural sense of depth can be displayed by setting the virtual camera capture direction set point C to a position different from the display user O, as illustrated in FIG. 4B.

3. Configuration and Processing of Information Processing Apparatus of Present Disclosure Next, configuration and processing of the information processing apparatus of the present disclosure will be described with reference to FIG. 8 and subsequent drawings.

Note that the information processing apparatus of the present disclosure is an information processing apparatus that executes bidirectional communication similar to the bidirectional communication description with reference to FIG. 1, and is an apparatus including a display unit, a camera, and an audio input/output unit, and capable of transmitting/receiving images, sounds, and other information via a network, similarly to the information processing apparatuses 10 and 20 installed at the respective locations in FIG. 1.

Figure 8:
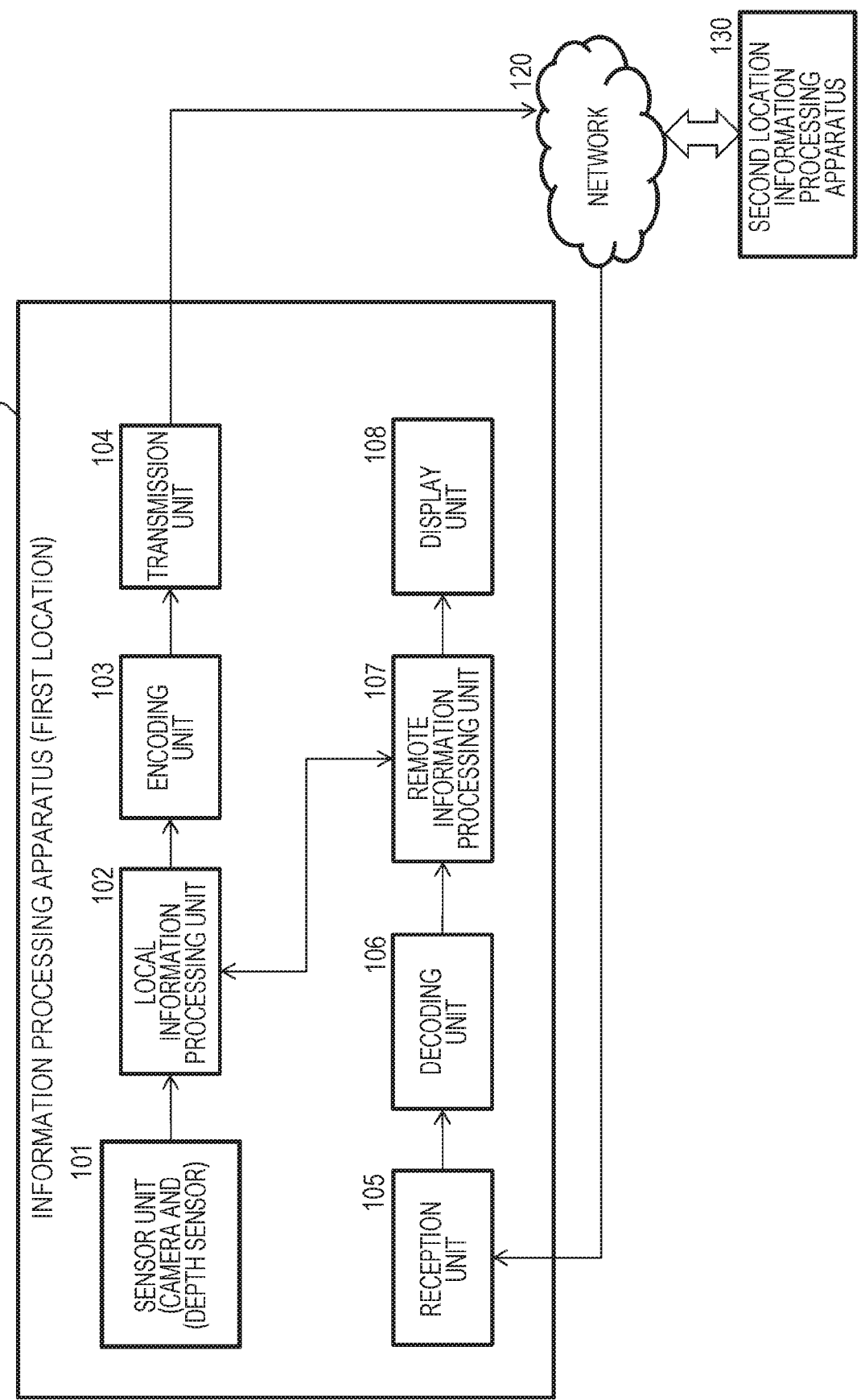
FIG. 8 is a diagram for describing a configuration example of an information processing apparatus according to the present disclosure.

FIG. 8 is a block diagram illustrating a configuration example of an image processing apparatus 100 according to an embodiment of the present disclosure.

Note that FIG. 8 illustrates the information processing apparatus 100 at the first location and a remote second location information processing apparatus 130 connected via the network, these information processing apparatuses executing bidirectional communication, and further illustrates a detailed configuration of the information processing apparatus 100 at the first location.

The detailed configuration of the information processing apparatus 130 at the second location is similar to the detailed configuration of the information processing apparatus 100 at the first location.

The information processing apparatus 100 at the first location includes a sensor unit (a camera and a depth sensor) 101, a local information processing unit 102, an encoding unit 103, a transmission unit 104, a reception unit 1025, a decoding unit 106, a remote information processing unit 107, a display unit 108.

The transmission unit 104 and the reception unit 105 execute communication with the remote second location information processing apparatus 130 that executes bidirectional communication via a network 120.

The configuration illustrated in FIG. 8 is a partial configuration of an information processing apparatus mainly illustrating a processing unit that executes image processing in the information processing apparatus.

The information processing apparatus further has various configurations such as an execution unit for audio processing and a storage unit, in addition to the aforementioned units. Note that the second location information processing apparatus 130 has similar configurations.

The sensor unit (a camera and a depth sensor) 101 is configured by a camera that captures an image of a user who executes the bidirectional communication on the first location side, a distance measuring sensor (depth sensor) that measures the position of the user (local user) to be captured, and the like.

Note that, in the following description, an apparatus side is called local side and a user on the apparatus side is called local user, and a communication partner apparatus side is called remote side and a user on the partner apparatus side is called remote user.

Note that the user position can also be calculated on the basis of captured images of cameras installed at a plurality of different positions, and a configuration of only a plurality of cameras that captures an object from a plurality of different positions may be adopted without using the depth sensor.

Specifically, the sensor unit 101 may have either one of the following configurations:

(a) a plurality of cameras that captures an object from a plurality of different positions; and (b) one (or more) camera and one depth sensor.

The configuration of (a) corresponds to the configuration including three cameras illustrated in FIG. 1, for example.

One camera and one depth sensor may be adopted as in (b).

Sensor information (a camera captured image (+depth information)) detected by the sensor unit 101 is input to the local information processing unit 102.

The local information processing unit 102 generates a virtual viewpoint image that is an image of a case where the user (local user) on the first location side is viewed from the partner apparatus of the bidirectional communication, that is, the viewing position (virtual viewpoint position) of the user (remote user) on the second location information processing apparatus 130 side.

The local information processing unit 102 inputs sensor information of at least either (a) or (b) below:

(a) images obtained by capturing the local user from a plurality of different positions; or (b) one image and distance information of the object (local user), as input data from the sensor unit 101.

Further, the local information processing unit 102 inputs virtual viewpoint position information generated on the basis of position information of the user (remote user) at the second location from the remote information processing unit 107.

The local information processing unit 102 generates the virtual viewpoint image to be transmitted to the second location information processing apparatus 130 on the basis of these pieces of input information.

Note that the local information processing unit 102 also generates viewing position information of the local user necessary for generating the virtual viewpoint image of the remote user to be displayed on the display unit of the first location information processing apparatus 100, on the second location information processing apparatus 130 side.

These pieces of generated information are encoded (compressed) by the encoding unit 103, and then transmitted to the second location information processing apparatus 130 via the transmission unit 104 via the network 120.

The reception unit 105 receives the virtual viewpoint image generated by the second location information processing apparatus 130 and the viewing position information of the user (remote user) on the second location side via the network 120.

The received data of the reception unit 105 is encoded (compressed) data, and is decoded by the decoding unit 106 and then input to the remote information processing unit 107.

The remote information processing unit 107 displays the virtual viewpoint image generated by the second location information processing apparatus 130 on the display unit 108, and further generates virtual viewpoint position information to be applied for generating the virtual viewpoint image to be transmitted to the second location on the basis of the viewing position information of the user (remote user) on the second location side and inputs the virtual viewpoint image to the local information processing unit 1102.

The display unit 108 displays the virtual viewpoint image generated by the second location information processing apparatus 130 on the display unit 108.

Note that the virtual viewpoint image displayed on the display unit 108 is an image observed from the virtual viewpoint position set according to the viewing position of the local user at the first location, and is specifically an image captured by the virtual camera described with reference to FIG. 4B.

That is, the virtual viewpoint image is an image captured, pointing a capture direction (optical axis) of the camera to a virtual camera capture direction C illustrated in FIG. 4B.

When the position of the local user at the first location corresponds to each of the positions (p1 to p3) of the user A illustrated in FIG. 4B, the virtual viewpoint image that is the captured image of the capture camera of the virtual viewpoint image is an image captured from each of the positions p1 to p3, pointing the capture direction (optical axis) to the virtual camera capture direction C, as illustrated in FIG. 4B.

As a result, observation of the display image as described with reference to FIGS. 5A, 5B, 5C, 6A, 6B, 6C, and 7, that is, the stereoscopic image imparting a sensation as if the communication partner (remote user) existed on the depth side of the display surface on the display unit becomes possible.

Detailed configurations and processing of the local information processing unit 102 and the remote information processing unit 107 of the information processing apparatus 100 illustrated in FIG. 8 will be described with reference to FIG. 9.

Figure 9:
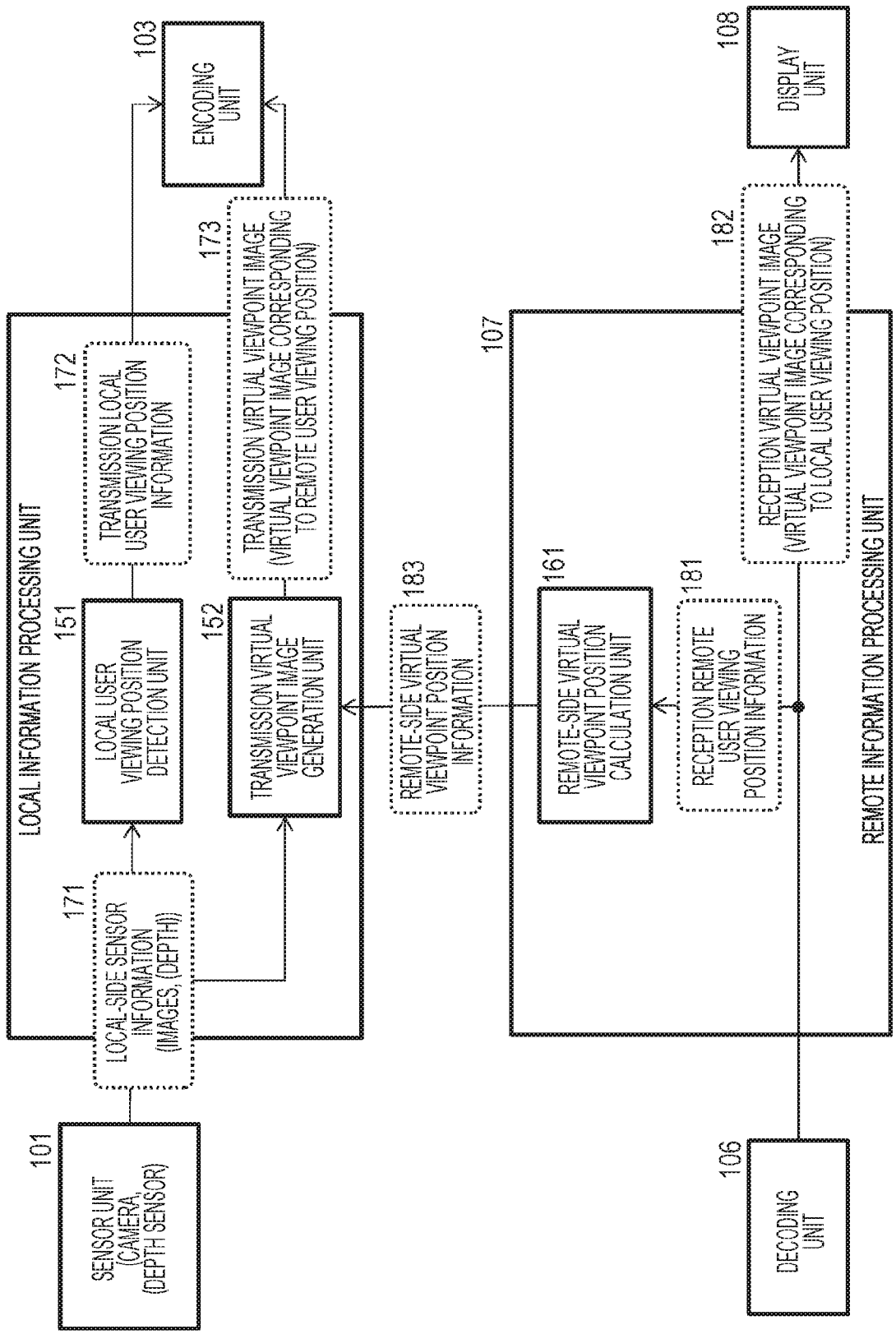
FIG. 9 is a diagram for describing a configuration example of the information processing apparatus according to the present disclosure.

FIG. 9 illustrates detailed configurations of the local information processing unit 102 and the remote information processing unit 107 that are constituent elements of the information processing apparatus 100 illustrated in FIG. 8.

As illustrated in FIG. 9, the local information processing unit 102 includes a local user viewing position detection unit 151 and a transmission virtual viewpoint image generation unit 152.

Further, the remote information processing unit 107 includes a remote-side virtual viewpoint position calculation unit 161.

As illustrated in FIG. 9, the local information processing unit 102 inputs local-side sensor information 171 from the sensor unit 101.

The local-side sensor information 171 includes information of either (a) or (b) below:

(a) images obtained by capturing the local user from a plurality of different positions; or (b) one image and distance information of the object (local user).

The local information processing unit 102 inputs the local-side sensor information 171 including at least either (a) or (b).

Further, the local information processing unit 102 inputs remote-side virtual viewpoint position information 183 generated on the basis of the position information of the user (remote user) at the second location from the remote information processing unit 107.

Note that the remote-side virtual viewpoint position information 183 is information indicating a capture camera position of the virtual viewpoint image to be transmitted to the remote-side information processing apparatus.

Note that the remote-side virtual viewpoint position information 183 may coincide or may not coincide with the viewing position of the remote user, that is, reception remote user viewing position information 181 illustrated in FIG. 9 transmitted from the remote-side information processing apparatus.

In the setting illustrated in FIG. 4B, each of the viewing positions (p1 to p3) and the position of the virtual viewpoint image capture camera that captures the virtual viewpoint image coincide with each other. However, this is an example. In the configuration of the present application, the viewing position of the viewing user who views the display unit and the capture viewpoint of the virtual viewpoint image to be displayed on the display unit (=the position of the virtual image capture camera) are sometimes different. A specific example will be described below.

The remote-side virtual viewpoint position calculation unit 161 of the remote information processing unit 107 calculates the remote-side virtual viewpoint position information 183 according to a predetermined algorithm on the basis of the reception remote user viewing position information 181 received from the remote-side information processing apparatus.

That is, the remote-side virtual viewpoint position calculation unit 161 inputs the viewing position (reception remote user viewing position information 181) of the remote user who is the viewing user viewing the display unit on the remote side, and calculates the virtual viewpoint position (remote-side virtual viewpoint position information 183) that becomes a capture position of the virtual viewpoint image to be displayed on the display unit on the remote side.

The remote-side virtual viewpoint position information 183 is coordinate information of a horizontal plane (xz plane) including a center position on the display surface on the display unit, for example.

Specifically, the remote-side virtual viewpoint position information 183 is, for example, coordinate information (x, y) on the xz plane, where a predefined origin is (x, z)=(0, 0), a direction parallel to the display surface on the display unit is x, and a direction perpendicular to the display surface on the display unit (separating direction) is z.

Generation and usage of the coordinate information will be described below.

The transmission virtual viewpoint image generation unit 152 of the local information processing unit 102 inputs the local-side sensor information 171 input from the sensor unit 101, that is, information of either (a) or (b) below:

(a) images obtained by capturing the local user from a plurality of different positions; or (b) one image and distance information of the object (local user), and further inputs the remote-side virtual viewpoint position information 183 from the remote-side virtual viewpoint position calculation unit 161 of the remote information processing unit 107.

The transmission virtual viewpoint image generation unit 152 of the local information processing unit 102 generates the virtual viewpoint image to be transmitted to the remote-side information processing apparatus, that is, a transmission virtual viewpoint image 173 illustrated in FIG. 9, on the basis of these pieces of input information.

The transmission virtual viewpoint image 173 is an image observed from the virtual viewpoint position corresponding to the remote-side virtual viewpoint position information 183.

Specifically, the transmission virtual viewpoint image 173 is a virtual viewpoint image captured by the virtual viewpoint image capture camera in FIG. 4B, for example.

Further, the local user viewing position detection unit 151 of the local information processing unit 102 inputs the local-side sensor information 171 input from the sensor unit 101, that is, information of either (a) or (b) below:

(a) images obtained by capturing the local user from a plurality of different positions; or (b) one image and distance information of the object (local user), and generates viewing position information of the local user on the basis of the input information. The viewing position information of the local user is transmission local user viewing position information 172 illustrated in FIG. 9.

The user viewing position information is coordinate information, having the horizontal plane including the center position on the display surface on the display unit as the xz plane, for example, similarly to the remote-side virtual viewpoint position information 183.

Specifically, the user viewing position information is generated as the coordinate information (x, y) on the xz plane, where the predefined origin is (x, z)=(0, 0), the direction parallel to the display surface on the display unit is x, and the direction perpendicular to the display surface on the display unit (separating direction) is z.

Generation and usage of the coordinate information will be described below.

The transmission local user viewing position information 172 and the transmission virtual viewpoint image 173 generated by the local information processing unit 102 are encoded (compressed) in the encoding unit 103, and transmitted to the remote-side information processing apparatus, that is, the second location information processing apparatus 130 illustrated in FIG. 8.

4. (First Embodiment) Embodiment In Which Virtual Camera is Moved in Circular Manner with Radius R Next, as a first embodiment, an embodiment in which the virtual camera as a camera that captures the virtual viewpoint image is moved in a circular manner with a radius R will be described.

A specific example of processing of generating the remote-side virtual viewpoint position information 183 executed by the remote-side virtual viewpoint position calculation unit 161 of the remote information processing unit 107 illustrated in FIG. 9 will be described with reference to FIG. 10.

The remote-side virtual viewpoint position calculation unit 161 of the remote information processing unit 107 illustrated in FIG. 9 generates the remote-side virtual viewpoint position information 183 on the basis of the reception remote user viewing position information 181 received from the remote side.

The transmission virtual viewpoint image generation unit 152 of the local information processing unit 102 illustrated in FIG. 9 generates the virtual viewpoint image assumed to be captured from a remote-side virtual viewpoint position on the basis of the remote-side virtual viewpoint position information 183.

Figure 10:
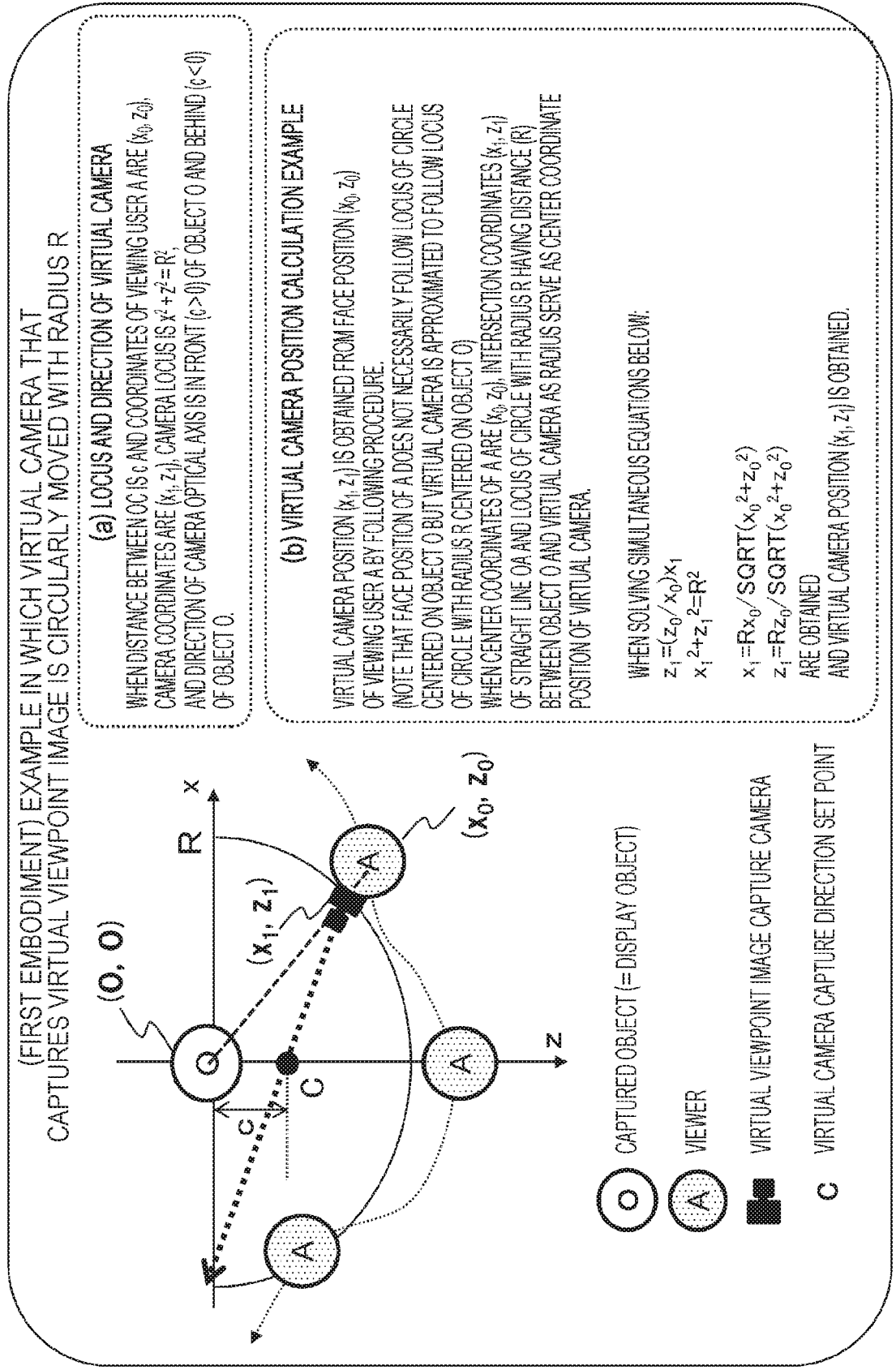
FIG. 10 is a diagram for describing setting and a position calculation example of a virtual camera according to a first embodiment of the present disclosure.

FIG. 10 is a diagram for describing a specific procedure of calculating the position of the virtual viewpoint image capture camera (virtual camera position) in similar setting to the setting described with reference to FIG. 4B.

The diagram on the right upper part in FIG. 10 is a diagram similar to that described with reference to FIG. 4B, and is a diagram including the following constituent elements:

O: the captured object (=a display user included in the virtual viewpoint image);

A: the viewing user (=a user viewing the virtual viewpoint image);

the virtual viewpoint image capture camera (=virtual camera); and

C: the virtual camera capture direction set point.

The diagram on the upper left part in FIG. 10 illustrates an x axis and a z axis that are coordinate axes on xz plane coordinates.

The diagram illustrates coordinate information where a horizontal plane including the position of the captured object O is the xz plane.

FIG. 10 illustrates the xz coordinate axes (the x axis and the z axis), where the position of the captured object O is the origin (x, z)=(0, 0), the direction parallel to the display surface on the display unit is x, and the direction perpendicular to the display surface on the display unit (separating direction) is z.

Note that the xz plane that is the horizontal plane where the position of the captured object O is the origin corresponds to, for example, a horizontal plane perpendicular to the display surface on the display unit in the remote-side display device that displays the captured object O, that is, in the remote-side space where the viewing user A is present.

The position of the viewing user A is $(x_0, z_0)$. This viewing user position information is information measured by the remote-side information processing apparatus and received by the local-side information processing apparatus. The viewing user position information corresponds to the reception remote user viewing position information 181 illustrated in FIG. 9.

Note that setting information of coordinates, setting information of the radius R and the like of an estimated moving circle of the viewing user, position information of the virtual camera capture direction set point C described with reference to FIG. 4B, and the like are determined in advance and shared between the information processing apparatuses that execute the bidirectional communication processing.

These pieces of information are determined and shared in communication preparation processing executed before the start of communication.

Note that a specific processing sequence will be described below with reference to the flowchart.

A locus and a direction of the virtual camera that captures the virtual viewpoint image, and virtual camera setting position calculation processing will be described with reference to FIG. 10.

The right side in FIG. 10 illustrates description of (a) the locus and direction of the virtual camera, and (b) an example of calculating a setting position of the virtual camera. Hereinafter, the locus and the direction of the virtual camera that captures the virtual viewpoint image, and virtual camera setting position calculation processing will be described on the basis of the description.

(a) The Locus and Direction of the Virtual Camera

As illustrated in the left diagram in FIG. 10, a distance between the object O and the virtual camera capture direction set point C is c. Further, coordinates of the viewing user A are $(x_0, z_0)$, and camera coordinates indicating the position of the virtual camera are $(x_1, z_1)$.

Note that the position of the viewing user A corresponds to the reception remote user viewing position information 181 received from the remote side.

At this time, the locus of the virtual camera, that is, the locus of the camera coordinates $(x_1, z_1)$ indicating a moving route of the virtual camera that generates the virtual viewpoint image is coordinates $(x_1, z_1)$ that satisfy the following equation:

$$x^2+z^2=R^2.$$

Note that R is a value of the radius centered on the object O, and is determined in advance and shared between both the apparatuses that execute the bidirectional communication.

Parameter determination and sharing processing will be described in detail with reference to the flowcharts illustrated in FIG. 11 and subsequent drawings.

Further, the direction of the virtual camera (the direction of a camera optical axis) is set to face the virtual camera capture direction set point C.

Note that positive and negative settings of the distance c between the object O and the virtual camera capture direction set point C are set as follows.

In the case where the virtual camera capture direction set point C is set in front of the object O (in the direction approaching the viewing user A), the distance c is set to a positive value, that is, c>0.

On the other hand, in the case where the virtual camera capture direction set point C is set behind the object O (in the direction away from the viewing user A), the distance c is set to a minus value, that is, c<0.

Note that the virtual camera capture direction set point C is determined in advance in the apparatuses that execute bidirectional communication and is shared between both the apparatuses, similarly to the above-described radius R.

(b) An Example of Calculating a Setting Position of the Virtual Camera

Next, processing of calculating the setting position of the virtual camera that captures the virtual viewpoint image will be described.

The position of the viewing user A, that is, the reception remote user viewing position information 181 received from the remote side is $(x_0, z_0)$.

The remote-side virtual viewpoint position calculation unit 161 of the remote information processing unit 107 illustrated in FIG. 9 calculates the setting position $(x_1, z_1)$ of the virtual camera that captures the virtual viewpoint image on the basis of the reception remote user viewing position information $(x_0, z_0)$ by the following procedure.

Note that the viewing user A does not necessarily follow the locus of the circle with the radius R centered on the object O. However, the processing is executed approximating that the virtual camera follows the locus of the circle with the radius R centered on the object O.

Intersection coordinates $(x_1, z_1)$ of a straight line OA and the locus of the circle with the radius R centered on the distance (R) between the object O and the virtual camera become a center coordinate position of the virtual camera, where center coordinates of the viewing user A is $(x_0, z_0)$.

Note that the straight line OA connecting the object O and the viewing user A is a straight line of a case where the object O and the viewing user A are present in the same space, and corresponds to a straight line connecting a virtual position of the object O displayed on the display unit of the viewing user A-side apparatus and an actual position of the viewing user A.

Here, the following relational equations are established among parameters of the virtual camera position $(x_1, z_1)$ and the viewing user position $(x_0, z_0)$.

$$z_1=(z_0/x_0)x_1$$

$$x_1^2+z_1^2=R^2$$

Solving the above simultaneous equations, $$x_1=Rx_0/\mathrm{SQRT}(x_0^2+z_0^2),\text{ and}$$

$$z_1=Rz_0/\mathrm{SQRT}(x_0^2+z_0^2)$$

are obtained, and the virtual camera position $(x_1, z_1)$ is obtained.

The remote-side virtual viewpoint position calculation unit 161 of the remote information processing unit 107 illustrated in FIG. 9 calculates the virtual camera position $(x_1, z_1)$ on the basis of the reception remote user viewing position information 181 $(x_0, z_0)$ received from the remote side according to the above procedure.

The virtual camera position ($x_1$, $z_1$) is the remote-side virtual viewpoint position information 183 that is output information of the remote-side virtual viewpoint position calculation unit 161 of the remote information processing unit 107 illustrated in FIG. 9.

The transmission virtual viewpoint image generation unit 152 of the local information processing unit 102 illustrated in FIG. 9 inputs the remote-side virtual viewpoint position information 183, that is, the virtual camera position ($x_1$, $z_1$), to generate the virtual viewpoint image assumed to be captured from the virtual camera position ($x_1$, $z_1$). In the virtual viewpoint image generation processing, the sensor information input from the sensor unit 101, that is, information of either (a) or (b) below:

(a) images obtained by capturing the local user from a plurality of different positions; or (b) one image and distance information of the object (local user)

is used.

Note that the virtual viewpoint image generated by the transmission virtual viewpoint image generation unit 152 is an image captured, setting the predetermined virtual camera capture direction set point C as the capture direction (optical axis direction) from the virtual camera position (x1, z1).

As a result, observation of the display image as described with reference to FIGS. 5A, 5B, 5C, 6A, 6B, 6C, and 7, that is, the stereoscopic image imparting a sensation as if the communication partner (remote user) existed on the depth side of the display surface on the display unit becomes possible.

5. Processing Sequence Executed by Information Processing Apparatus

Next, a processing sequence executed by the information processing apparatus will be described with reference to the flowcharts of FIG. 11 and subsequent drawings.

Figure 11:
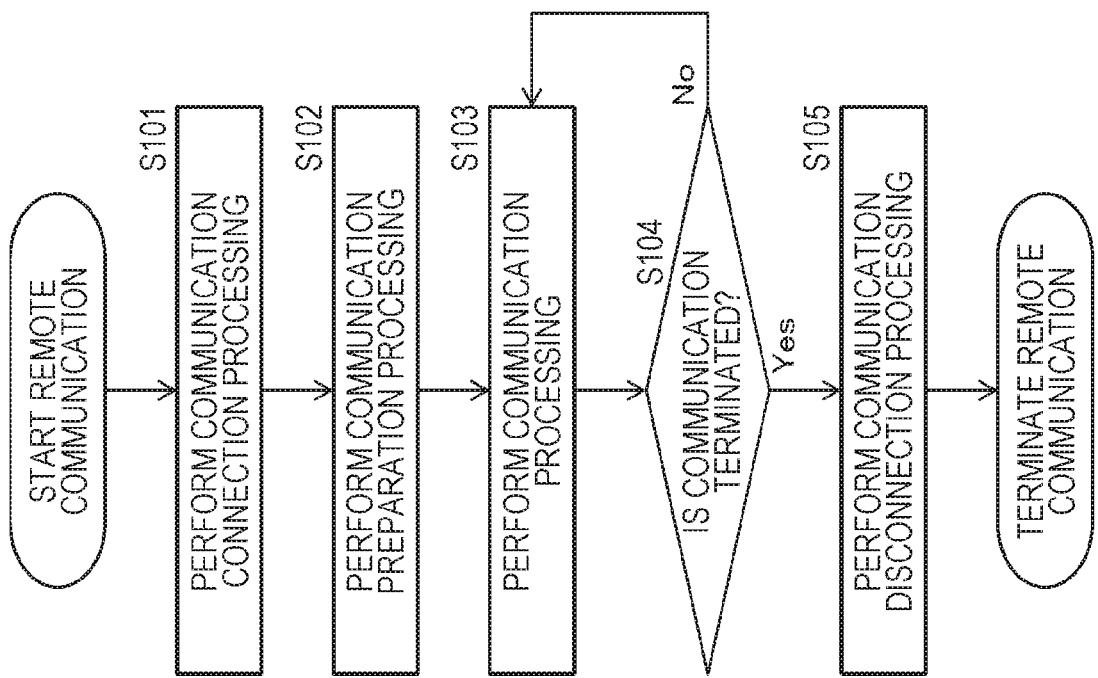
FIG. 11 is a flowchart for describing a processing sequence executed by the information processing apparatus of the present disclosure.

The flowchart illustrated in FIG. 11 is a flowchart for describing an overall sequence of a case where the information processing apparatus executes the bidirectional communication with the remote second information processing apparatus.

Note that the processing according to the flowchart illustrated in FIG. 11 is executed, for example, under control of a data processing unit including a CPU and the like having a program execution function according to a program stored in the storage unit of the information processing apparatus.

The processing of each step of the flowchart illustrated in FIG. 11 will be sequentially described.

(Step S101)

First, in step S101, the information processing apparatus executes communication connection processing with the information processing apparatus at the second location that executes the bidirectional communication.

(Step S102)

In step S101, when the communication connection between the two information processing apparatuses that execute the bidirectional communication is completed, the information processing apparatus next executes the communication preparation processing in step S102.

In the communication preparation processing, for example, determination and sharing processing of parameters and the like to be used between the information processing apparatuses that perform the bidirectional communication, such as the coordinate setting information described with reference to FIG. 10, is performed Details of the communication preparation processing will be described below with reference to FIG. 12.

(Step S103)

In step S102, when the preparation processing such as the parameter determination and sharing processing and the like is completed between the two information processing apparatuses that execute the bidirectional communication, the information processing apparatus executes communication processing in step S103.

In the communication processing, the information processing apparatus executes generation and transmission processing, and the like of the virtual viewpoint image corresponding to the viewing position of the viewing user on the communication partner side.

Details of the communication processing will be described below with reference to FIG. 13.

(Step S104)

Next, in step S104, the information processing apparatus determines termination of the communication, and in a case where the communication is terminated, the processing proceeds to step S105. In the case where the communication is not terminated and is continued, the information processing apparatus returns to step S103 and continues the communication execution processing.

(Step S105)

In the case where the information processing apparatus determines the communication to be terminated in step S104, the information processing apparatus proceeds to step S105 and executes communication disconnection processing of canceling the communication connection with the communication partner apparatus to terminate the processing in step S105.

Next, a detailed sequence of the communication preparation processing in step S102 in the flow of FIG. 11 will be described with reference to the flowchart illustrated in FIG. 12.

As described above, in the communication preparation processing in step S102 in the flow in FIG. 11, for example, determination and sharing processing of the parameter and the like to be used between the information processing apparatuses that perform the bidirectional communication, such as the coordinate setting information described with reference to FIG. 10, is performed The processing of each step of the flow illustrated in FIG. 12 will be described.

(Step S121)

First, the information processing apparatus transmits and receives the captured images between the information processing apparatuses that execute the bidirectional communication processing.

Images that capture both the viewing users (=the display users on the partner sides) are transmitted and received.

(Step S122)

Next, the information processing apparatus executes the determination and sharing processing of parameters necessary for generating a virtual viewpoint image.

Note that the parameter determination processing may be executed in one of the two information processing apparatuses that execute the bidirectional communication processing, and the determined parameters may be transmitted to the partner.

For example, the parameters to be determined and shared are as follows:

(1) coordinate setting information;

(2) viewing user estimated moving locus information; and (3) the position of the virtual camera capture direction set point C.

The two diagrams on the right side in FIG. 12 illustrate two parameter setting examples 1 and 2.

The parameter setting example 1 is an example in which the viewing user A is assumed to be moved on the circle with the radius R centered on the position of the display user, similarly to the example described with reference to FIG. 10.

The coordinates are set such that the direction parallel to the display surface on the display unit is the x axis, and the direction perpendicular to the display surface on the display unit is the z axis where the horizontal plane having the position of the user O as the origin is the xz plane.

The viewing user estimated moving locus is, for example, the circle with the radius R centered on the origin (x, z)=(0, 0).

The position of the virtual camera capture direction set point C is a position ($x_c$, $z_c$) illustrated in FIG. 12.

At least one of the information processing apparatuses that execute the bidirectional communication determines, for example, these parameters, notifies the determined parameters to the partner, and performs processing of sharing the parameters between the two information processing apparatuses.

The parameter setting example 2 is an example in which the viewing user A is assumed to be moved parallel to the display surface at the position of the distance R in the direction perpendicular to the display plane from the position of the display user, which is different from the example described with reference to FIG. 10.

The coordinates are set such that the direction parallel to the display surface on the display unit is the x axis, and the direction perpendicular to the display surface on the display unit is the z axis where the horizontal plane having the position of the user O as the origin is the xz plane.

The viewing user estimated moving locus is a line parallel to the display surface at the position of the distance R in the direction perpendicular to the display surface from the position of the display user (the origin (x, z)=(0, 0)).

The position of the virtual camera capture direction set point C is a position ($x_c$, $z_c$) illustrated in FIG. 12.

At least one of the information processing apparatuses that execute the bidirectional communication determines, for example, these parameters, notifies the determined parameters to the partner, and performs processing of sharing the parameters between the two information processing apparatuses.

In the communication preparation processing in step S102 of the flow illustrated in FIG. 11, the parameter determination and sharing processing is executed.

After these pieces of processing, the communication processing in step S103 is started.

Next, the processing of step S103 in the flow illustrated in FIG. 11, that is, a detailed sequence of the communication processing will be described with reference to the flowchart illustrated in FIG. 13.

In the communication processing, the information processing apparatus executes generation and transmission processing, and the like of the virtual viewpoint image corresponding to the viewing position of the viewing user on the communication partner side.

Hereinafter, the processing of each step of the flow illustrated in FIG. 13 will be sequentially described.

Figure 13:
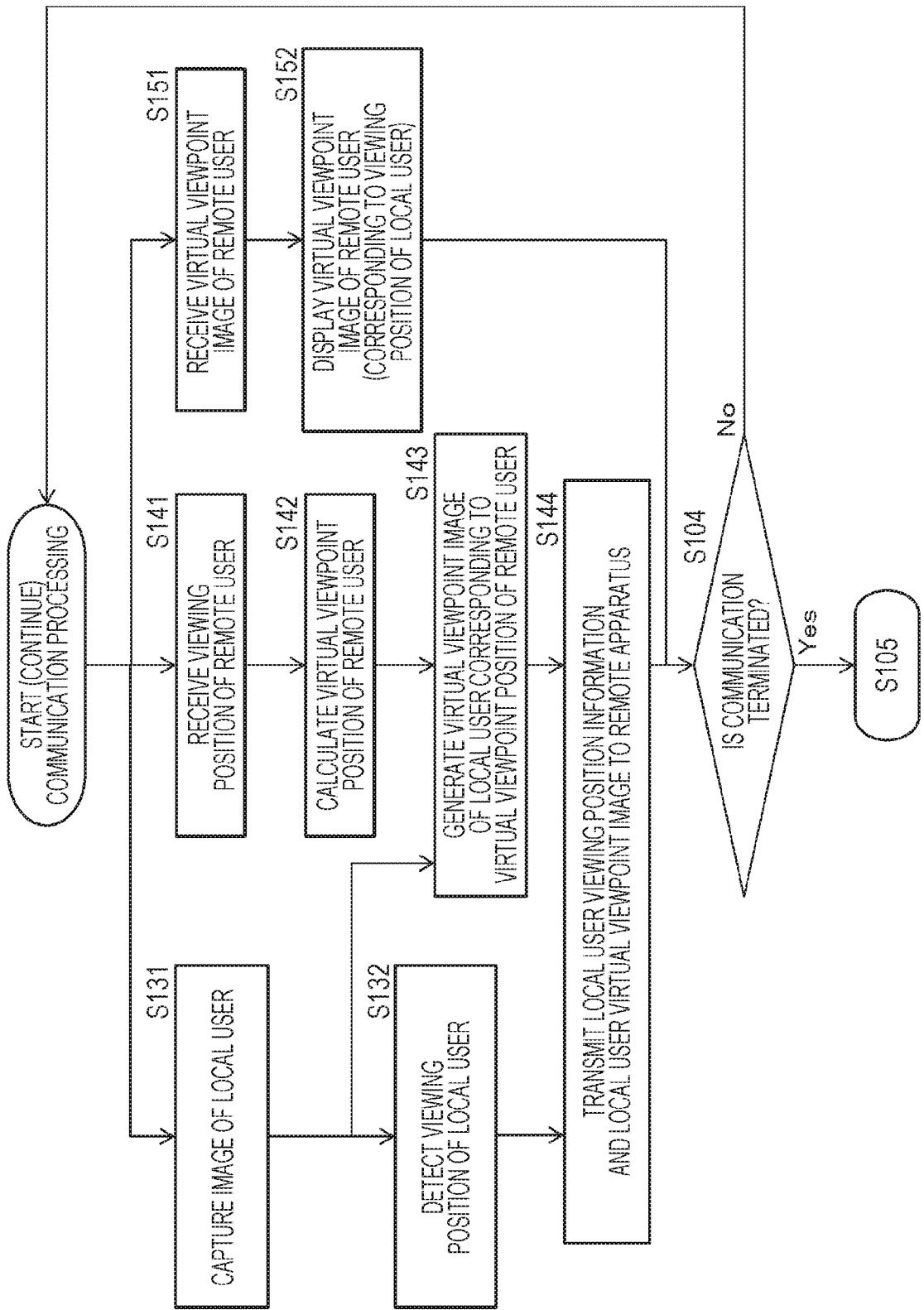
FIG. 13 is a flowchart for describing a processing sequence executed by the information processing apparatus of the present disclosure.

Note that, in the flow illustrated in FIG. 13,
processing of steps S131 and 132,
processing of steps S141 and S142, and
processing of steps S151 and S152,
are executed in parallel.

Further, processing of steps S143 and S144 is executed in parallel with the processing of steps S151 and S152.

(Step S131)

In step S131, the information processing apparatus performs acquisition processing of the sensor information, specifically, acquires the captured image of the local user who is the user on the local apparatus side of the bidirectional communication.

Image capture is executed by a plurality of cameras installed at different positions, for example, as described with reference to FIG. 1.

Note that setting to acquire the captured image of one camera and the depth information (distance information) may be adopted.

(Step S132)

Next, in step S132, the information processing apparatus detects the viewing position of the local user. The information processing apparatus detects the viewing position of the local user on the basis of the sensor information of either
the sensor information acquired in step S131, that is,
the captured images from the plurality of different positions, or
the captured image of one camera and the depth information.

(Step S141)

The information processing apparatus executes the processing of steps S141 and S142 in parallel with the processing of steps S131 and S132.

First, in step S141, the information processing apparatus receives and acquires the viewing position information of the remote user who is the user on the partner apparatus side of the bidirectional communication.

This information is generated and transmitted by the remote-side information processing apparatus.

(Step S142)

Next, the information processing apparatus calculates the virtual viewpoint position of the virtual viewpoint image to be transmitted to the remote device on the basis of the remote user viewing position information received from the remote side device in step S141.

This processing is processing executed by the remote-side virtual viewpoint position calculation unit 161 of the remote information processing unit 107 described with reference to FIG. 9. The remote-side virtual viewpoint position calculation unit 161 of the remote information processing unit 107 calculates the remote-side virtual viewpoint position information 183 according to a predetermined algorithm on the basis of the reception remote user viewing position information 181 received from the remote-side information processing apparatus.

That is, the remote-side virtual viewpoint position calculation unit 161 inputs the viewing position (reception remote user viewing position information 181) of the remote user who is the viewing user viewing the display unit on the remote side, and calculates the virtual viewpoint position (remote-side virtual viewpoint position information 183) that becomes a capture position of the virtual viewpoint image to be displayed on the display unit on the remote side. Specifically, the virtual camera position ($x_1$, $z_1$) described with reference to FIG. 10 is calculated.

(Step S143)

Next, in step S143, the information processing apparatus generates the virtual viewpoint image of the local user corresponding to the virtual viewpoint position of the remote user.

This processing is processing executed by the transmission virtual viewpoint image generation unit 152 of the local information processing unit 102 described with reference to FIG. 9.

The transmission virtual viewpoint image generation unit 152 of the local information processing unit 102 generates the virtual viewpoint image to be transmitted to the remote-side information processing apparatus, that is, the transmission virtual viewpoint image 173 illustrated in FIG. 9, on the basis of the input information of the sensor information (images and the like) acquired in step S131, and the virtual viewpoint position (remote-side virtual viewpoint position information 183) calculated in step S142.

The transmission virtual viewpoint image 173 is an image observed from the virtual viewpoint position corresponding to the remote-side virtual viewpoint position information 183.

Specifically, the transmission virtual viewpoint image 173 is a virtual viewpoint image captured by the virtual viewpoint image capture camera in FIG. 4B, for example, and is a virtual viewpoint image captured setting the capture direction (optical axis direction) to the virtual camera capture direction set point C.

The virtual viewpoint image is three-dimensional image data observed such that the display user is located on the depth side of the display surface on the display unit, in a case where the virtual viewpoint image is displayed on the display unit, as described with reference to FIGS. 5A, 5B, 5C, 6A, 6B, 6C, and 7.

(Step S144)

Next, in step S144, the information processing apparatus transmits the viewing position information of the local user detected in step S132 and the transmission virtual viewpoint image generated in step S143, that is, the virtual viewpoint image corresponding to the virtual viewpoint calculated on the basis of the viewing position of the remote user to the remote-side information processing apparatus.

(Step S151)

The processing of steps S151 and S152 is performed in parallel with the processing of steps S131 and S132 and steps S141 to S144.

In step S151, the information processing apparatus receives the virtual viewpoint image of the remote user transmitted from the remote-side next use processing apparatus.

This virtual viewpoint image is a virtual viewpoint image including the remote user, which is generated by processing similar to the processing of step S131 and S132 and step S141 to S144 of the flow in FIG. 13, in the remote-side apparatus.

The virtual viewpoint position is a virtual viewpoint calculated on the basis of the viewing position of the local user.

(Step S152)

In step S152, the information processing apparatus displays the virtual viewpoint image received from the remote information processing apparatus in step S151 on the display unit.

This virtual viewpoint image is an image corresponding to an image captured from the virtual viewpoint calculated on the basis of the viewing position of the local user.

More specifically, the virtual viewpoint image corresponds to the captured image from the virtual viewpoint image capture camera illustrated in FIG. 4B, for example.

As described with reference to FIG. 4B, the virtual viewpoint image corresponds to an image captured, pointing the camera to the virtual camera capture direction set point C, and is displayed as three-dimensional image data in which the display user (remote user) is located on the depth side of the display surface on the display unit, as described with reference to FIGS. 5A, 5B, 5C, 6A, 6B, 6C, and 7.

6. Embodiment in which Processing of Generating Display Virtual Viewpoint Image to be Displayed on Display Unit of Local Apparatus is Performed on Local Apparatus Side The communication processing according to the flowchart illustrated in FIG. 13 is a sequence in which the processing of generating the display virtual viewpoint image to be displayed on the display unit of the local apparatus is executed in the partner apparatus (remote apparatus), and the virtual viewpoint image generated by the partner apparatus (remote apparatus) is received by the local apparatus and is displayed on the display unit of the local apparatus.

This processing corresponds to the configurations of the local information processing apparatus 102 and the remote information processing apparatus 107 described with reference to FIG. 9.

Next, an embodiment in which processing of generating the display virtual viewpoint image to be displayed on the display unit of the local apparatus is performed on the local apparatus side will be described with reference to FIGS. 14 and 15.

Figure 14:
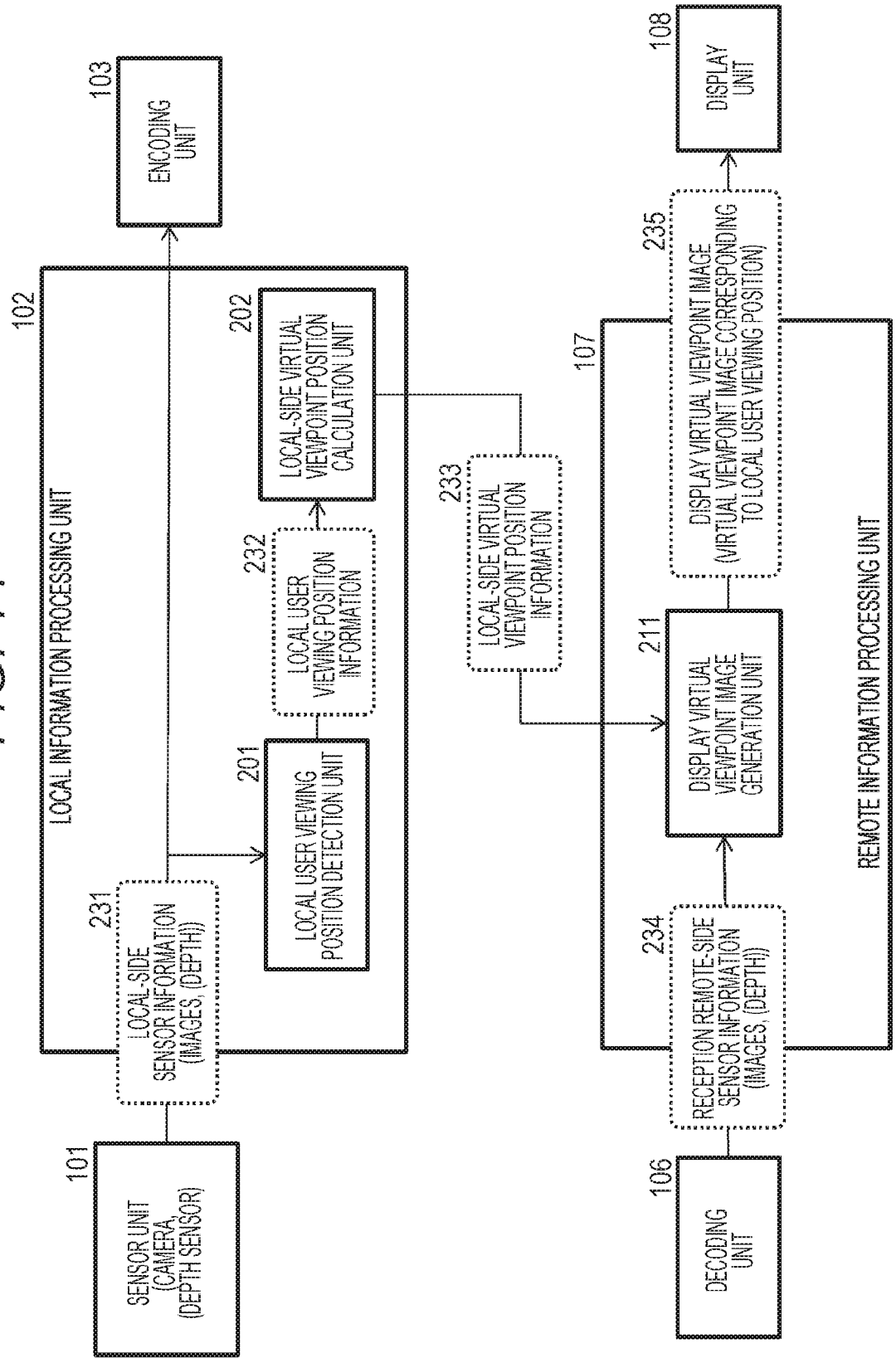
FIG. 14 is a diagram for describing a configuration example of the information processing apparatus according to the present disclosure.
Figure 15:
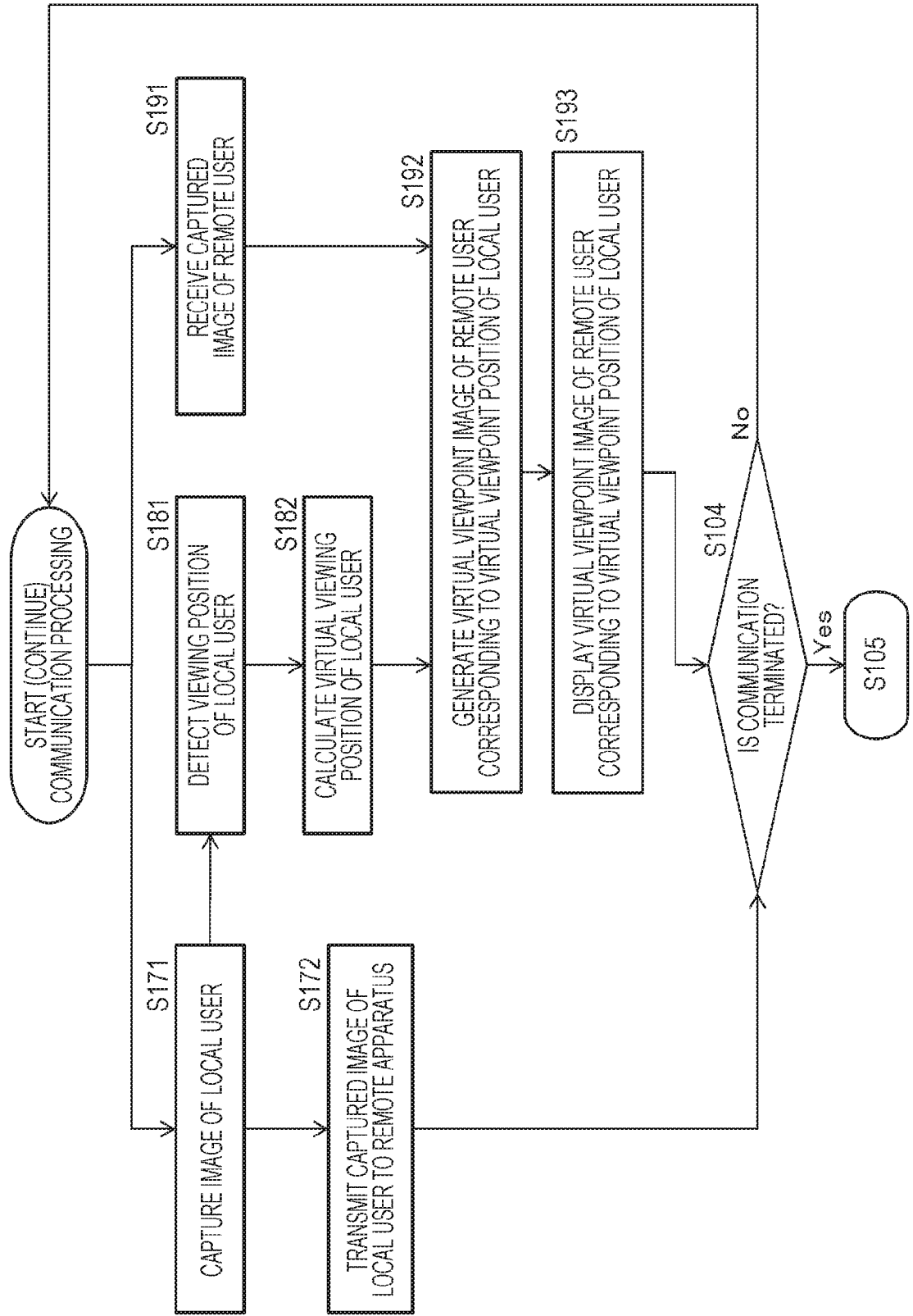
FIG. 15 is a flowchart for describing a processing sequence executed by the information processing apparatus of the present disclosure.

FIG. 14 is a diagram for describing detailed configurations and processing of the local information processing unit 102 and the remote information processing unit 107 in the present embodiment.

Note that the local information processing unit 102 and the remote information processing unit 107 illustrated in FIG. 14 are constituent elements of the information processing apparatus 100 illustrated in FIG. 8.

As illustrated in FIG. 14, the local information processing unit 102 includes a local user viewing position detection unit 201 and a local-side virtual viewpoint position calculation unit 202.

Further, the remote information processing unit 107 includes a display virtual viewpoint image generation unit 211.

As illustrated in FIG. 14, the local information processing unit 102 inputs local-side sensor information 231 from the sensor unit 101.

The local-side sensor information 231 includes information of either (a) or (b) below:

(a) images obtained by capturing the local user from a plurality of different positions; or (b) one image and distance information of the object (local user).

The local information processing unit 102 inputs the local-side sensor information 231 including at least either (a) or (b).

The sensor information 231 is encoded by the encoding unit 103 and is transmitted as it is to the remote-side information processing apparatus.

Further, the sensor information 231 is input to the local user viewing position detection unit 201 of the local information processing unit 102.

The local user viewing position detection unit 201 of the local information processing unit 102 inputs the information of either (a) or (b) input from the sensor unit 101, and generates the viewing position information of the local user on the basis of the input information. The viewing position information is local user viewing position information 232 illustrated in FIG. 14.

The user viewing position information is coordinate information, having the horizontal plane including the center position on the display surface on the display unit as the xz plane, for example, as described with reference to FIG. 10.

Specifically, the user viewing position information is generated as the coordinate information (x, y) on the xz plane, where the predefined origin is (x, z)=(0, 0), the direction parallel to the display surface on the display unit is x, and the direction perpendicular to the display surface on the display unit (separating direction) is z.

The local user viewing position information 232 generated by the local user viewing position detection unit 201 is input to the local-side virtual viewpoint position calculation unit 202 of the local information processing unit 102.

The local-side virtual viewpoint position calculation unit 202 calculates local-side virtual viewpoint position information 233 on the basis of local user viewing position information 232 according to a predetermined algorithm.

That is, the local-side virtual viewpoint position calculation unit 202 inputs the viewing position (local user viewing position information 232) of the local user who is the viewing user viewing the display unit on the local side of the local apparatus, and calculates the virtual viewpoint position (local-side virtual viewpoint position information 233) that becomes the capture position of the virtual viewpoint image to be displayed on the display unit on the local apparatus side.

The local-side virtual viewpoint position information 233 is coordinate information, having the horizontal plane including the center position on the display surface on the display unit as the xz plane, for example.

Specifically, the user viewing position information is generated as the coordinate information (x, y) on the xz plane, where the predefined origin is (x, z)=(0, 0), the direction parallel to the display surface on the display unit is x, and the direction perpendicular to the display surface on the display unit (separating direction) is z.

The local-side virtual viewpoint position information 233 calculated by the local-side virtual viewpoint position calculation unit 202 is input to the display virtual viewpoint image generation unit 211 of the remote information processing unit 107.

The display virtual viewpoint image generation unit 211 of the remote information processing unit 107 inputs sensor information 234 input from the remote-side information processing apparatus, that is, information of either (a) or (b) below:

(a) images obtained by capturing the remote user from a plurality of different positions; or (b) one image and distance information of the object (remote user), and further inputs the local-side virtual viewpoint position information 233 calculated by the local-side virtual viewpoint position calculation unit 202.

The display virtual viewpoint image generation unit 211 of the remote information processing unit 107 generates the virtual viewpoint image to be displayed on the display unit on the local apparatus side, that is, a display virtual viewpoint image 235 illustrated in FIG. 14, on the basis of the input information, and displays the virtual viewpoint image on the display unit 108.

The display virtual viewpoint image 235 is an image observed from the virtual viewpoint position corresponding to the local-side virtual viewpoint position information 233.

Specifically, the display virtual viewpoint image 235 is a virtual viewpoint image captured by the virtual viewpoint image capture camera in FIG. 4B, for example.

The configuration in FIG. 9 described above is a configuration to display the virtual viewpoint image received from the remote side as it is, whereas the configuration in FIG. 14 is a configuration to generate the display virtual viewpoint image on the local apparatus side, using the sensor information (images, or an image and depth information) received from the remote side.

The processing sequence executed by the information processing apparatus in this configuration is the processing according to FIG. 11 described above, and the communication preparation processing in step S102 is the processing according to the flow described with reference to FIG. 12.

Note that the communication processing in step S103 is a sequence different from the flow in FIG. 13 described above.

A detailed sequence of the communication processing in step S103 of a case where the configuration in FIG. 14 is applied will be described with reference to the flowchart illustrated in FIG. 15.

In the case where the configuration in FIG. 14 is applied, in the communication processing, the information processing apparatus executes generation and display processing, and the like of the virtual viewpoint image corresponding to the viewing position of the viewing user on the local apparatus side.

Hereinafter, the processing of each step of the flow illustrated in FIG. 15 will be sequentially described.

(Step S171)

In step S171, the information processing apparatus performs acquisition processing of the sensor information, specifically, acquires the captured image of the local user who is the user on the local apparatus side of the bidirectional communication.

Image capture is executed by a plurality of cameras installed at different positions, for example, as described with reference to FIG. 1.

Note that setting to acquire the captured image of one camera and the depth information may be adopted.

(Step S172)

Next, in step S172, the information processing apparatus transmits the sensor information acquired in step S171 to the remote-side information processing apparatus.

(Step S181)

In step S181, the information processing apparatus detects the viewing position of the local user. The information processing apparatus detects the viewing position of the local user on the basis of the sensor information of either the sensor information acquired in step S171, that is, the captured images from the plurality of different positions, or the captured image of one camera and the depth information.

(Step S182)

Next, in step S182, the information processing apparatus calculates the virtual viewpoint position of the local user on the basis of the local user viewing position information acquired in step S181.

This process is processing executed by the local-side virtual viewpoint position calculation unit 202 of the local information processing unit 102 described above with reference to FIG. 14. The local-side virtual viewpoint position calculation unit 202 of the local information processing unit 102 calculates the local-side virtual viewpoint position information 232 according to a predetermined algorithm on the basis of the local user viewing position information 232 generated by the local user viewing position detection unit 201.

That is, the local-side virtual viewpoint position calculation unit 202 inputs the viewing position (local user viewing position information 232) of the local user who is the viewing user viewing the display unit on the local apparatus side (local side), and calculates the virtual viewpoint position (local-side virtual viewpoint position information 233) that becomes the capture position of the virtual viewpoint image to be displayed on the display unit on the local side. Specifically, the virtual camera position $(x_1, z_1)$ described with reference to FIG. 10 is calculated.

(Step S191)

Step S191 is processing of receiving the sensor information from the remote-side information processing apparatus.

Specifically, information of either (a) or (b) below:

(a) images obtained by capturing the remote user from a plurality of different positions; or (b) one image and distance information of the object (remote user)

is received.

(Step S192)

Next, in step S192, the information processing apparatus generates the virtual viewpoint image of the remote user corresponding to the virtual viewpoint position of the local user.

This processing is processing executed by the display virtual viewpoint image generation unit 211 of the remote information processing unit 107 described with reference to FIG. 14.

The display virtual viewpoint image generation unit 211 of the remote information processing unit 107 generates the virtual viewpoint image to be displayed on the display unit on the local apparatus side, that is, the display virtual viewpoint image 235 illustrated in FIG. 14, on the basis of the input information of the sensor information (images and the like) on the remote side acquired in step S191, and the virtual viewpoint position (local-side virtual viewpoint position information 233) calculated in step S182.

The display virtual viewpoint image 235 is an image observed from the virtual viewpoint position corresponding to the local-side virtual viewpoint position information 233.

Specifically, the display virtual viewpoint image 235 is a virtual viewpoint image captured by the virtual viewpoint image capture camera in FIG. 4B, for example.

(Step S193)

Next, in step S193, the information processing apparatus displays the display virtual viewpoint image generated in step S192, that is, the viewing position image corresponding to the virtual viewpoint calculated on the basis of the viewing position of the local user, on the display unit on the local apparatus side.

The virtual viewpoint image displayed on the display unit is an image corresponding to an image captured from the virtual viewpoint calculated on the basis of the viewing position of the local user.

More specifically, the virtual viewpoint image corresponds to the captured image from the virtual viewpoint image capture camera illustrated in FIG. 4B, for example.

As described with reference to FIG. 4B, the virtual viewpoint image corresponds to an image captured, pointing the camera to the virtual camera capture direction set point C, and is displayed as three-dimensional image data in which the display user (remote user) is located on the depth side of the display surface on the display unit, as described with reference to FIGS. 5A, 5B, 5C, 6A, 6B, 6C, and 7.

7. (First Modification of First Embodiment) Example in which Calculation of Virtual Camera Position Corresponding to Capture Position of Virtual Viewpoint Image is Simplified Next, an example in which calculation of the virtual camera position corresponding to the capture position of the virtual viewpoint image is simplified will be described as a first modification (first variation) of the first embodiment.

A specific example of the processing of calculating the virtual camera position corresponding to the capture position of the virtual viewpoint image has been described with reference to FIG. 10.

Simplified processing of the processing of calculating the virtual camera position illustrated in FIG. 10 will be described with reference to FIG. 16.

Figure 16:
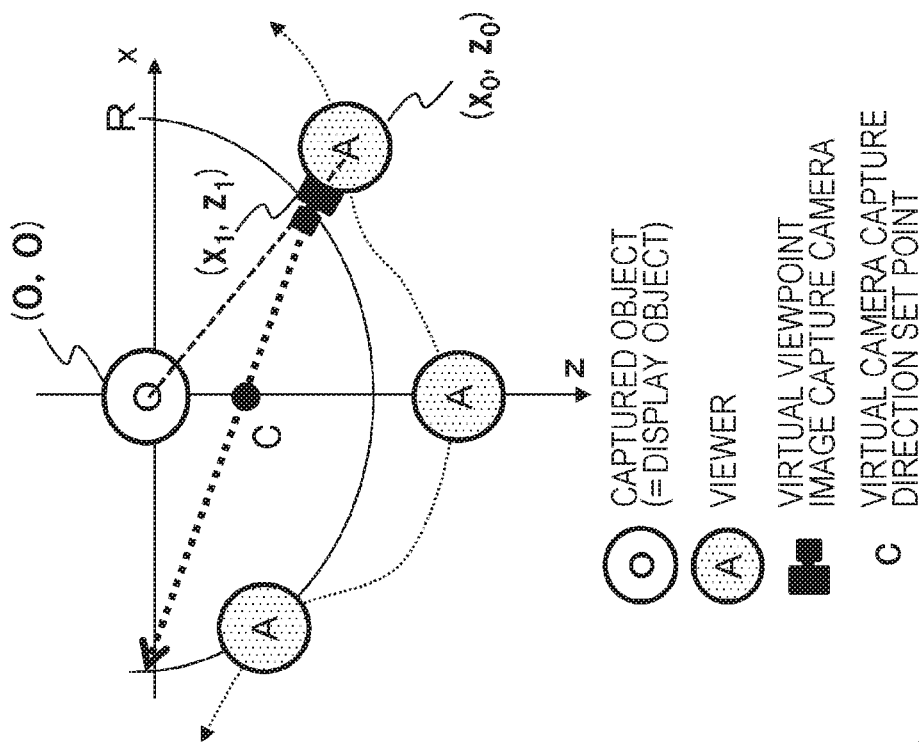
FIG. 16 is a diagram for describing setting and a position calculation example of a virtual camera in a modification of the first embodiment of the present disclosure.

The diagram on the left upper part in FIG. 16 is a diagram similar to that described with reference to FIG. 4B, similarly to FIG. 10, and is a diagram including the following constituent elements:

O: the captured object (=a display user included in the virtual viewpoint image);

A: the viewing user (=a user viewing the virtual viewpoint image);

the virtual viewpoint image capture camera (=virtual camera); and

C: the virtual camera capture direction set point.

The diagram on the upper left part in FIG. 16 illustrates an x axis and a z axis that are coordinate axes on xz plane coordinates.

The diagram illustrates coordinate information where the horizontal plane including the center position on the display surface on the display unit is the xz plane.

FIG. 16 illustrates xz coordinate axes (x axis and x axis), where the position of the captured object O is the origin (x, z)=(0, 0), the direction parallel to the display surface on the display unit is x, and the direction perpendicular to the display surface on the display unit (separating direction) is z.

The position of the viewing user A is (x0, z0). Note that setting information of coordinates, setting information of the radius R and the like of an estimated moving circle of the viewing user, position information of the virtual camera capture direction set point C described with reference to FIG. 4B, and the like are determined in advance and shared between the information processing apparatuses that execute the bidirectional communication processing.

These pieces of information are determined and shared in the communication preparation processing executed before the start of communication, as described with reference to the flows in FIGS. 11 and 12.

The right side in FIG. 16 illustrates a procedure of processing of calculating the setting position of the virtual camera.

The position of the viewing user A is $(x_0, z_0)$.

The setting position $(x_1, z_1)$ of the virtual camera that captures the virtual viewpoint image is calculated on the basis of the remote user viewing position information $(x_0, z_0)$ by the following procedure.

Note that the viewing user A does not necessarily follow the locus of the circle with the radius R centered on the object O. However, the processing is executed approximating that the virtual camera follows the locus of the circle with the radius R centered on the object O.

In the virtual camera position calculation processing example illustrated in FIG. 16, the x coordinate position of the center coordinates $(x_0, z_0)$ of the viewing user A is approximated to coincide with the x coordinate of the virtual camera position coordinates $(x_1, z_1)$. That is, $$x_1 = x_0$$

is satisfied. However,
in the case of $x_0 > R$, approximation processing below $$x_0 = R$$

is performed to obtain $z_1$.

With the approximation processing, the following relational equations are established among the parameters of the virtual camera position $(x_1, z_1)$ and the viewing user position $(x_0, z_0)$.

$$x_1 = x_0$$

$$x_1^2 + z_1^2 = R^2$$

Solving the above simultaneous equations, $$x_1 = x_0, \text{ and}$$

$$z_1 = \text{SQRT}(R^2 - x_0^2), \text{ and}$$

the virtual camera position $(x_1, z_1)$ is obtained.

The virtual camera position $(x_1, z_1)$ is, for example, the remote-side virtual viewpoint position information 183 that is the output information of the remote-side virtual viewpoint position calculation unit 161 of the remote information processing unit 107 illustrated in FIG. 9.

Further, in the example illustrated in FIG. 14, the local-side virtual viewpoint position information 233 that is output information of the local-side virtual viewpoint position calculation unit 202 of the local information processing unit 102 illustrated in FIG. 14 is the virtual camera position $(x_1, z_1)$.

8. (Second Modification of First Embodiment) Example in which Virtual Camera Capture Direction Set Point C is Arranged Behind Object Next, an example in which the virtual camera capture direction set point C is arranged behind an object will be described as a second modification (second variation) of the first embodiment.

Figure 17:
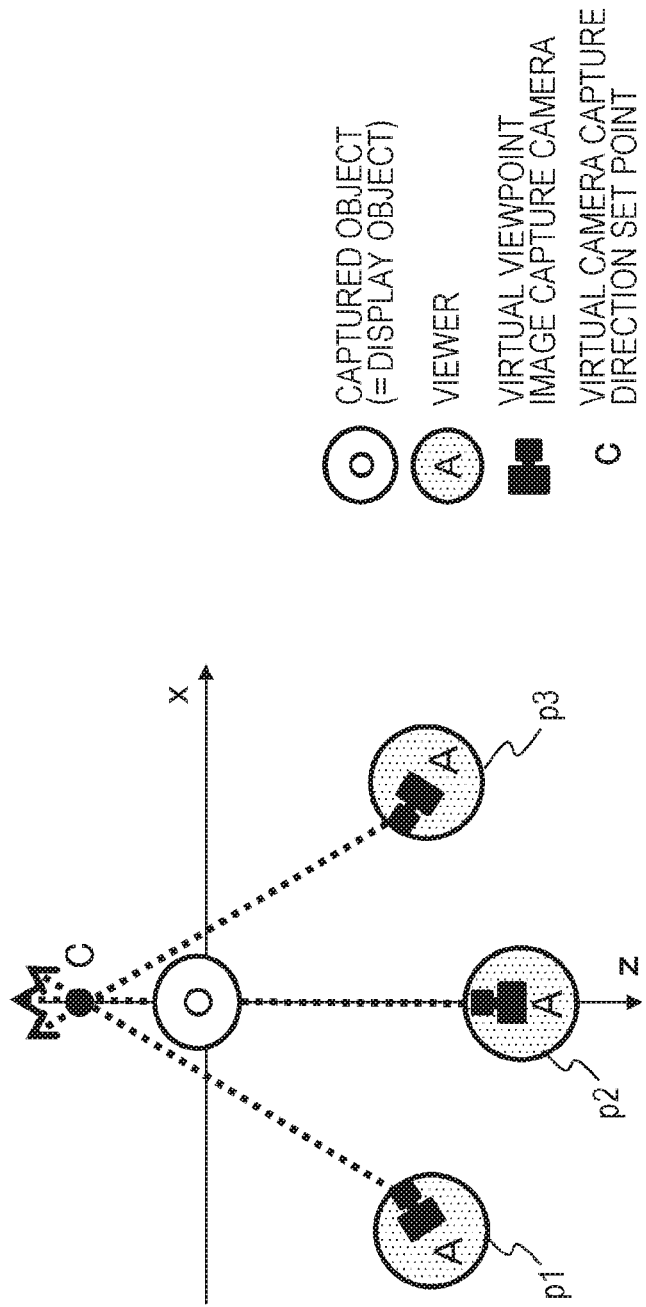
FIG. 17 is a diagram for describing a setting example of the virtual camera in the modification of the first embodiment of the present disclosure.

FIG. 17 is a diagram for describing an example in which the virtual camera capture direction set point C is arranged behind the object O.

As described with reference to FIGS. 4A and 4B, there is a problem that, when the capture direction of the virtual viewpoint image capture camera is made coincident with the object, as illustrated in FIG. 4A, for example, the position of the user O is fixed to the position of the display surface, as described with reference to FIGS. 3A, 3B, and 3C, and is observed as a three-dimensional image showing unnatural movement.

Therefore, as illustrated in FIG. 4B, the capture direction of the virtual viewpoint image capture camera is not set to the user O and is set to the virtual camera capture direction set point C provided in front of the object (user O), whereby the display user O can be displayed to exist at a position separated from the display surface of the display unit, and a stereoscopic image with a natural sense of depth can be displayed, as described with reference to FIGS. 5A, 5B, 5C, 6A, 6B, 6C, and 7.

The (first embodiment) described with reference to FIG. 10 is an example in which the virtual camera capture direction set point C is set in front of the object (user O), similarly to the setting in FIG. 4B.

By setting the virtual camera capture direction set point C at various positions, how the object looks displayed on the display unit can be changed.

The example in FIG. 17 illustrates an example in which the virtual camera capture direction set point C is arranged behind the object.

With such a setting, the display user O can be displayed to exist at a position in front of the display surface on the display unit.

FIGS. 18A, 18B, and 18C are diagrams illustrating display examples of a virtual viewpoint image generated in the setting of the virtual viewpoint image capture camera illustrated in FIG. 17.

FIGS. 18A, 18B, and 18C illustrates the following diagrams:

FIG. 18A: a case where the user A observes the display unit from the front (=a case where the user A observes the display unit from the position p2 in FIG. 17);

FIG. 18B: a case where the user A obliquely observes the display unit from the front (=a case where the user A observes the display unit from the position p1 in FIG. 17); and FIG. 18C: a case where the user A obliquely observes the display unit from the right (=a case where the user A observes the display unit from the position p3 in FIG. 17).

The display form of the user O on the display unit illustrated in FIGS. 18A 18B, and 18C is as follows.

FIG. 18A: In the case where the user A observes the display unit from the front, the face of the user O viewed from the front is displayed.

The display position of the user O is in the center of the display unit.

FIG. 18B: In the case where the user A obliquely observes the display unit from the left, the face of the user O obliquely viewed from the left is displayed.

Note that the display position of the user O moves to a right side on the display unit. This is because the direction of the virtual image capture camera faces the virtual camera capture direction set point C illustrated in FIG. 17. The point C is set to a central position on the display unit, and the display position of the user O is a position shifted to a right side from the center of the display unit.

Further, FIG. 18C: in the case where the user A obliquely observes the display unit from the right, the face of the user O obliquely viewed from the right is displayed.

Note that the display position of the user O moves to a left side on the display unit. This is because the direction of the virtual image capture camera faces the virtual camera capture direction set point C illustrated in FIG. 17. The point C is set to a central position on the display unit, and the display position of the user O is a position shifted to a left side from the center of the display unit.

With the image display, the viewing user A grasps the position of the display user O at a position jumping out from the display surface on the display unit, as illustrated on the upper section in FIGS. 18A, 18B, and 18C due to the motion parallax.

In this way, the virtual camera capture direction set point C is set to a position different from the object (the display object such as the display user), whereby the display object such as the display user can be displayed to exist at various positions separated from the display surface on the display unit.

9. (Third Modification of First Embodiment) Example in which Virtual Camera is Located on Circle with Radius R Centered on Virtual Camera Capture Direction Set Point C Next, an example in which a virtual camera is located on a circle with a radius R centered on a virtual camera capture direction set point C will be described as a third modification (third variation) of the first embodiment.

A locus and a direction of the virtual camera that captures the virtual viewpoint image, and virtual camera setting position calculation processing of the present example will be described with reference to FIG. 19.

The diagram on the left in FIG. 19 illustrates an example in which the virtual camera (virtual viewpoint image capture camera) is located on the circle with the radius R centered on the virtual camera capture direction set point C.

The right side in FIG. 19 illustrates
description of
(a) the locus and direction of the virtual camera, and
(b) an example of calculating a setting position of the virtual camera. Hereinafter, the locus and the direction of the virtual camera that captures the virtual viewpoint image, and virtual camera setting position calculation processing will be described on the basis of the description.

(a) The Locus and Direction of the Virtual Camera

As illustrated in the left diagram in FIG. 19, a distance between the object O and the virtual camera capture direction set point C is c. Further,
coordinates of the viewing user A are $(x_0, z_0)$, and
camera coordinates indicating the position of the virtual camera are $(x_1, z_1)$.

At this time, the locus of the virtual camera, that is, the locus of the camera coordinates $(x_1, z_1)$ satisfies the following equation:

$$x^2+(z-c)^2=R^2$$

Note that R is a value of the radius centered on the virtual camera capture direction set point C, and is determined in advance and shared between both the apparatuses that execute the bidirectional communication.

Further, the direction of the virtual camera (the direction of the camera optical axis) is set to face the virtual camera capture direction set point C.

Note that positive and negative settings of the distance c between the object O and the virtual camera capture direction set point C are set as follows.

In the case where the virtual camera capture direction set point C is set in front of the object O (in the direction approaching the viewing user A), the distance c is set to a positive value, that is, c>0.

On the other hand, in the case where the virtual camera capture direction set point C is set behind the object O (in the direction away from the viewing user A), the distance c is set to a minus value, that is, c<0.

Note that the virtual camera capture direction set point C is determined in advance in the apparatuses that execute bidirectional communication and is shared between both the apparatuses, similarly to the above-described radius R.

(b) An Example of Calculating a Setting Position of the Virtual Camera

Next, processing of calculating the setting position of the virtual camera that captures the virtual viewpoint image will be described.

The position of the viewing user A is $(x_0, z_0)$.

The viewing user position is acquired in advance, and the setting position $(x_1, z_1)$ of the virtual camera that captures the virtual viewpoint image is calculated on the basis of the acquired viewing user position information $(x_0, z_0)$ by the following procedure.

Note that the processing is executed, approximating that the virtual camera follows the locus of the circle with the radius R centered on the virtual camera capture direction set point C.

Intersection coordinates $(x_1, z_1)$ of a straight line OA and the locus of the circle with the radius R centered on the distance (R) between the virtual camera capture direction set point C and the virtual camera become a center coordinate position of the virtual camera, where center coordinates of the viewing user A is $(x_0, z_0)$.

Here, the following relational equations are established among parameters of the virtual camera position $(x_1, z_1)$ and the viewing user position $(x_0, z_0)$.

$$z_1=(z_0/x_0)x_1$$

$$x_1^2+(z_1-c)^2=R^2$$

Solving the above simultaneous equations,
the virtual camera position $(x_1, z_1)$ is obtained.

For example, the remote-side virtual viewpoint position calculation unit 161 of the remote information processing unit 107 illustrated in FIG. 9 calculates the virtual camera position $(x_1, z_1)$ on the basis of the reception remote user viewing position information 181 $(x_0, z_0)$ received from the remote side according to the above procedure.

The virtual camera position $(x_1, z_1)$ is the remote-side virtual viewpoint position information 183 that is output information of the remote-side virtual viewpoint position calculation unit 161 of the remote information processing unit 107 illustrated in FIG. 9.

Further, in the example illustrated in FIG. 14, the local-side virtual viewpoint position information 233 that is output information of the local-side virtual viewpoint position calculation unit 202 of the local information processing unit 102 illustrated in FIG. 14 is the virtual camera position $(x_1, z_1)$.

10. (Fourth Modification of First Embodiment) Example of Setting in which Position of Virtual Camera Capture Direction Set Point C is Moved According to Viewing User Position Next, an example of setting in which the position of the virtual camera capture direction set point C is moved according to the viewing user position will be described as a fourth embodiment (fourth variation) of the first embodiment.

A locus and a direction of the virtual camera that captures the virtual viewpoint image, and virtual camera setting position calculation processing of the present example will be described with reference to FIG. 20.

The left diagram in FIG. 20 illustrates the example of setting in which the position of the virtual camera capture direction set point C is moved according to the viewing user position.

For example, a virtual camera capture direction set point in the case where the viewing user A is located at the position p1 illustrated in FIG. 20 is C1 in FIG. 20.

Further, the virtual camera capture direction set point in the case where the viewing user A is located at the position p2 illustrated in FIG. 20 is C2 in FIG. 20.

The virtual camera capture direction set point C is moved on z-axis information illustrated in FIG. 20 according to the viewing user position.

$$c = c_0 \times \theta$$

is established where
the distance between the object O and the virtual camera capture direction set point C is c, and
an angle made by the OA connecting the object O and the viewing user A and the z axis is θ.

Note that $c_0$ is a predetermined coefficient.

The position of the virtual camera capture direction set point C is moved according to the viewing user position under such setting.

The right side in FIG. 20 illustrates description of (a) the locus and direction of the virtual camera, and (b) a setting example of the virtual camera capture direction set point C. Hereinafter, the locus and the direction of the virtual camera that captures the virtual viewpoint image, and virtual camera setting position calculation processing will be described on the basis of the description.

(a) The Locus and Direction of the Virtual Camera

As illustrated in the left diagram in FIG. 20, the distance between the object O and the virtual camera capture direction set point C is c. Further, coordinates of the viewing user A are $(x_0, z_0)$, and camera coordinates indicating the position of the virtual camera are $(x_1, z_1)$.

At this time, the locus of the virtual camera, that is, the locus of the camera coordinates $(x_1, z_1)$ satisfies the following equation:

$$x^2 + z^2 = R^2$$

The coordinates $(x_1, z_1)$ satisfy the above equation.

Note that R is a value of the radius centered on the virtual camera capture direction set point C, and is determined in advance and shared between both the apparatuses that execute the bidirectional communication.

Further, the direction of the virtual camera (the direction of the camera optical axis) is set to face the virtual camera capture direction set point C.

(b) A Setting Example of the Virtual Camera Capture Direction Set Point C

Next, a setting example of the virtual camera capture direction set point C of the virtual camera that that captures the virtual viewpoint image will be described.

As illustrated in the left diagram in FIG. 20, the distance between the object O and the virtual camera capture direction set point C is c. Further, coordinates of the viewing user A are $(x_0, z_0)$, and camera coordinates indicating the position of the virtual camera are $(x_1, z_1)$.

At this time, the locus of the virtual camera, that is, the locus of the camera coordinates $(x_1, z_1)$ satisfies the following equation:

$$x^2 + z^2 = R^2$$

The coordinates $(x_1, z_1)$ satisfy the above equation.

The virtual camera capture direction set point C that determines the direction of the optical axis of the virtual camera can be set to a point in front of or behind the object.

As described above, $$c = c_0 \times \theta$$

is established where
the distance between the object O and the virtual camera capture direction set point C is c, and
an angle made by the OA connecting the object O and the viewing user A and the z axis is θ.

Note that $c_0$ is a predetermined coefficient.

The position of the virtual camera capture direction set point C is moved according to the viewing user position under such setting.

11. (Second Embodiment) Embodiment in which Virtual Camera that Captures Virtual Viewpoint Image is Linearly Moved Next, as a second embodiment, an embodiment in which a virtual camera that captures a virtual viewpoint image is linearly moved will be described.

For example, in the first embodiment described with reference to FIG. 10, the virtual camera that captures the virtual viewpoint image has been set to be moved on the arc with the radius R centered on the object O.

In the second embodiment to be described below, a virtual camera that captures a virtual viewpoint image is linearly moved, as illustrated in FIG. 21.

FIG. 21 illustrates an example in which a viewing user A and the virtual camera are moved in parallel with a display surface at a position of a distance R in a z-axis direction (in a direction perpendicular to the display surface) from an object O.

Coordinates are set where a horizontal plane having the position of the user O as an origin is an xz plane, a direction parallel to the display surface on the display unit is an x axis, and a direction perpendicular to the display surface on the display unit is a z axis.

A locus of the virtual camera is a line pq parallel to the display surface at the position of the distance R in the direction perpendicular to the display surface from the position of a display user (the origin $(x, z) = (0, 0)$).

The right side in FIG. 21 illustrates
description of (a) the locus and direction of the virtual camera, and (b) a virtual camera position calculation example. Hereinafter, the locus and the direction of the virtual camera that captures the virtual viewpoint image, and virtual camera setting position calculation processing will be described on the basis of the description.

(a) The Locus and Direction of the Virtual Camera

As illustrated in the left diagram in FIG. 21, a distance between the object O and the virtual camera capture direction set point C is c. Further, coordinates of the viewing user A are $(x_0, z_0)$, and camera coordinates indicating the position of the virtual camera are $(x_1, z_1)$.

At this time, the locus of the virtual camera, that is, the locus of the camera coordinates $(x_1, z_1)$ satisfy the following equation:

$$z = R.$$

Note that R is a z-direction distance from the object O, and is determined in advance and shared between the apparatuses that execute the bidirectional communication.

Further, the direction of the virtual camera (the direction of a camera optical axis) is set to face the virtual camera capture direction set point C.

Note that positive and negative settings of the distance c between the object O and the virtual camera capture direction set point C are set as follows.

In the case where the virtual camera capture direction set point C is set in front of the object O (in the direction approaching the viewing user A), the distance c is set to a positive value, that is, c>0.

On the other hand, in the case where the virtual camera capture direction set point C is set behind the object O (in the direction away from the viewing user A), the distance c is set to a minus value, that is, c<0.

Note that a virtual camera capture direction set point C is determined in advance in apparatuses that execute bidirectional communication and is shared between the apparatuses, similarly to the above-described R.

(b) A virtual camera setting position calculation example

Next, processing of calculating a setting position of the virtual camera that captures the virtual viewpoint image will be described.

The position of the viewing user A is ($x_0$, $z_0$).

The viewing user position is acquired in advance, and the setting position ($x_1$, $z_1$) of the virtual camera that captures the virtual viewpoint image is calculated on the basis of the acquired viewing user position information ($x_0$, $z_0$) by the following procedure.

Note that the processing is executed, approximating that the virtual camera follows the locus of the straight line pq at the z-direction distance R from the object O.

Intersection coordinates ($x_1$, $z_1$) of the straight line OA and the straight line pq at the z-direction distance R from the object O become a center coordinate position of the virtual camera, where center coordinates of the viewing user A is ($x_0$, $z_0$).

Here, the following relational equations are established among parameters of the virtual camera position ($x_1$, $z_1$) and the viewing user position ($x_0$, $z_0$).

$$z_1 = (z_0/x_0)x_1$$

$$z_1 = R$$

Solving the above simultaneous equations, $$x_1 = Rx_0/z_0$$

$$z_1 = R$$

are obtained, and the virtual camera position ($x_1$, $z_1$) is obtained.

For example, a remote-side virtual viewpoint position calculation unit 161 of a remote information processing unit 107 illustrated in FIG. 9 calculates the virtual camera position ($x_1$, $z_1$) on the basis of reception remote user viewing position information 181 ($x_0$, $z_0$) received from a remote side according to the above procedure.

The virtual camera position ($x_1$, $z_1$) becomes remote-side virtual viewpoint position information 183 that is output information of the remote-side virtual viewpoint position calculation unit 161 of the remote information processing unit 107 illustrated in FIG. 9.

Further, in the example illustrated in FIG. 14, local-side virtual viewpoint position information 233 that is output information of a local-side virtual viewpoint position calculation unit 202 of a local information processing unit 102 illustrated in FIG. 14 is the virtual camera position ($x_1$, $z_1$).

12. (First Modification of Second Embodiment) Example in which Calculation of Virtual Camera Position Corresponding to Capture Position of Virtual Viewpoint Image is Simplified Next, an example in which calculation of the virtual camera position corresponding to a capture position of the virtual viewpoint image is simplified will be described as a first modification (first variation) of the second embodiment. Description will be given with reference to FIG. 22.

The upper left diagram in FIG. 22 is a diagram for describing an embodiment in which the virtual camera that captures the virtual viewpoint image is linearly moved, similarly to FIG. 21 described above.

FIG. 22 illustrates an example in which the viewing user A and the virtual camera are moved in parallel with the display surface at the position of the distance R in the z-axis direction (in the direction perpendicular to the display surface) from the object O.

The coordinates are set where the horizontal plane having the position of the user O as the origin is the xz plane, the direction parallel to the display surface on the display unit is the x axis, and the direction perpendicular to the display surface on the display unit is the z axis.

The locus of the virtual camera is a line pq parallel to the display surface at the position of the distance R in the direction perpendicular to the display surface from the position of the display user (the origin (x, z)=(0, 0)).

The right side in FIG. 22 illustrates a procedure of processing of calculating the setting position of the virtual camera.

The position of the viewing user A is ($x_0$, $z_0$).

The setting position ($x_1$, $z_1$) of the virtual camera that captures the virtual viewpoint image is calculated on the basis of the remote user viewing position information ($x_0$, $z_0$) by the following procedure.

Note that the processing is executed, approximating that the virtual camera follows the locus of the straight line pq at the z-direction distance R from the object O.

Intersection coordinates ($x_1$, $z_1$) of the straight line OA and the straight line pq at the z-direction distance R from the object O become a center coordinate position of the virtual camera, where center coordinates of the viewing user A is ($x_0$, $z_0$).

Further, an x coordinate of the viewing user A is approximated to accord with an x coordinate of the virtual camera.

Here, the following relational equations are established among parameters of the virtual camera position ($x_1$, $z_1$) and the viewing user position ($x_0$, $z_0$).

$$x_1 = x_0$$

$$z_1 = R$$

The above is obtained, the virtual camera position ($x_1$, $z_1$) is obtained.

For example, the remote-side virtual viewpoint position calculation unit 161 of the remote information processing unit 107 illustrated in FIG. 9 calculates the virtual camera position ($x_1$, $z_1$) on the basis of the reception remote user viewing position information 181 ($x_0$, $z_0$) received from the remote side according to the above procedure.

The virtual camera position ($x_1$, $z_1$) is the remote-side virtual viewpoint position information 183 that is output information of the remote-side virtual viewpoint position calculation unit 161 of the remote information processing unit 107 illustrated in FIG. 9.

Further, in the example illustrated in FIG. 14, the local-side virtual viewpoint position information 233 that is output information of the local-side virtual viewpoint position calculation unit 202 of the local information processing unit 102 illustrated in FIG. 14 is the virtual camera position ($x_1$, $z_1$).

13. (Third Embodiment) Embodiment in which Virtual Camera that Captures Virtual Viewpoint Image is Vertically and Circularly Moved with Radius R Next, as a third embodiment, an embodiment in which a virtual camera that captures a virtual viewpoint image is vertically and circularly moved with a radius R will be described.

Figure 23:
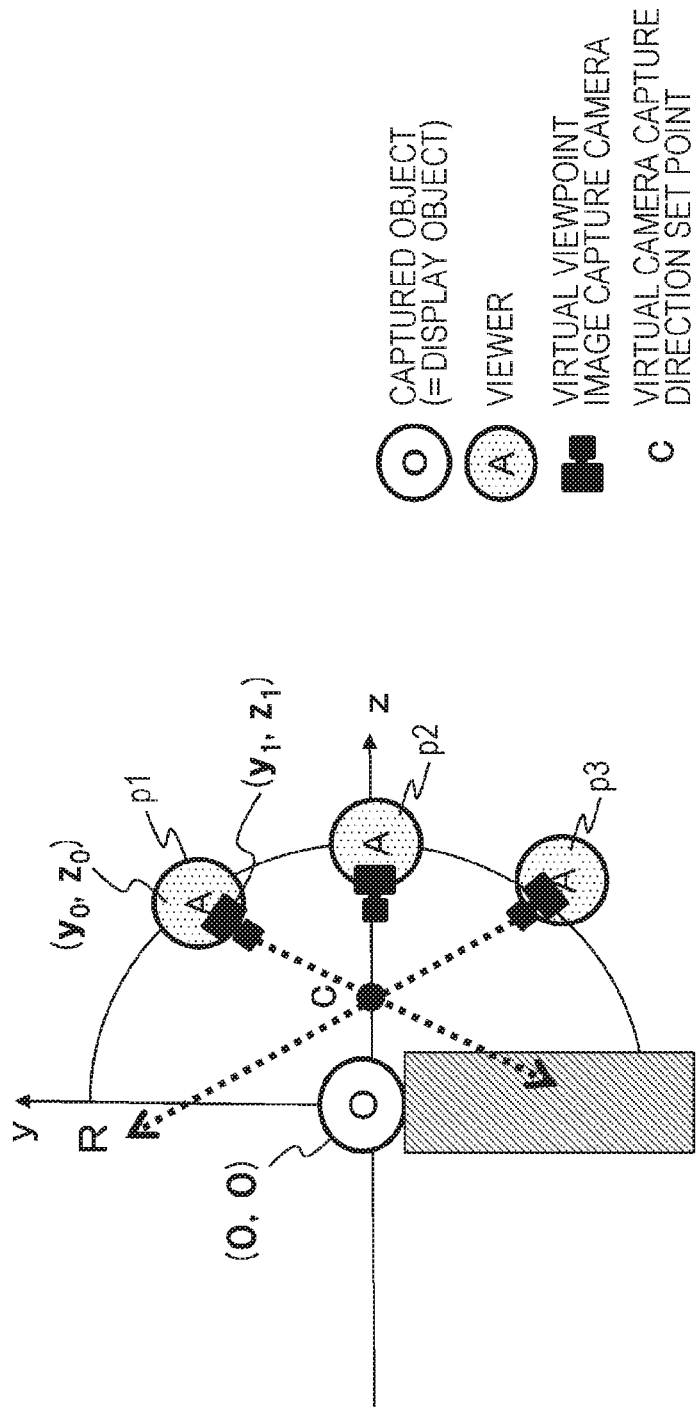
FIG. 23 is a diagram for describing a setting example of a virtual camera in a third embodiment of the present disclosure.

FIG. 23 is a diagram for describing a configuration of the third embodiment, and is a diagram including the following constituent elements:

O: a captured object (=a display user included in the virtual viewpoint image);

A: a viewing user (=a user viewing the virtual viewpoint image);

a virtual viewpoint image capture camera (=virtual camera); and

C: a virtual camera capture direction set point.

FIG. 23 illustrates a y axis and a z axis that are coordinate axes of yz plane coordinates, where the object O is an origin, a vertically upper direction is a y direction, and a right direction is a z direction.

The virtual camera is moved on a semicircle with a radius R in the up and down (vertical) direction centered on the object O.

The position of the viewing user A is $(y_0, z_0)$.

The position of the virtual camera is $(y_1, z_1)$.

Note that setting information of coordinates, setting information of the radius R and the like of an estimated moving circle of the viewing user, position information of the virtual camera capture direction set point C, and the like are determined in advance and shared between information processing apparatuses that execute bidirectional communication processing.

These pieces of information are determined and shared in communication preparation processing executed before the start of communication.

FIGS. 24A, 24B, and 24C are diagrams illustrating display examples of a virtual viewpoint image generated in the setting of the virtual viewpoint image capture camera illustrated in FIG. 23.

FIGS. 24A, 24B, and 24C illustrate the following diagrams:

FIG. 24A: a case where the user A obliquely observes a display unit from above (=a case where the user A observes the display unit from a position p1 in FIG. 23);

FIG. 24B: a case where the user A observes the display unit from the front (=a case where the user A observes the display unit from the position p2 in FIG. 23); and FIG. 24C: a case where the user A obliquely observes a display unit from below (=a case where the user A observes the display unit from a position p3 in FIG. 23).

The display form of the user O on a display unit illustrated in FIGS. 24A 24B, and 24C is as follows.

FIG. 24B: In the case where the user A observes the display unit from the front, the face of the user O viewed from the front is displayed.

The display position of the user O is in the center of the display unit.

FIG. 24A: In the case where the user A obliquely observes the display unit from above, the face of the user O obliquely viewed from above is displayed.

Note that the display position of the user O is moved to an upper side on the display unit. This is because the direction of the virtual image capture camera faces the virtual camera capture direction set point C illustrated in FIG. 23. The point C is set to a central position on the display unit, and the display position of the user O is a position shifted to an upper side from the center of the display unit.

Further, FIG. 24C: in the case where the user A obliquely observes the display unit from below, the face of the user O obliquely viewed from below is displayed.

Note that the display position of the user O is moved to a lower side on the display unit. This is because the direction of the virtual image capture camera faces the virtual camera capture direction set point C illustrated in FIG. 23. The point C is set to a central position on the display unit, and the display position of the user O is a position shifted to a lower side from the center of the display unit.

With the image display, the viewing user A grasps the position of the display user O at a position on a depth side of the display surface on the display unit, as illustrated on the right in FIGS. 24A, 24B, and 24C, due to the motion parallax.

Next, a locus and a direction of the virtual camera of the third embodiment, and virtual camera setting position calculation processing will be described with reference to FIG. 25.

The diagram on the left in FIG. 25 illustrates an example in which the virtual camera (virtual viewpoint image capture camera) is moved on the semicircle with the radius R in the up and down (vertical) direction centered on the object O.

The right side in FIG. 25 illustrates description of (a) the locus and direction of the virtual camera, and (b) an example of calculating a setting position of the virtual camera. Hereinafter, the locus and the direction of the virtual camera that captures the virtual viewpoint image, and virtual camera setting position calculation processing will be described on the basis of the description.

(a) The Locus and Direction of the Virtual Camera

As illustrated in the left diagram in FIG. 25, a distance between the object O and the virtual camera capture direction set point C is c. Further, coordinates of the viewing user A are $(y_0, z_0)$, and camera coordinates indicating the position of the virtual camera are $(y_1, z_1)$.

At this time, the locus of the virtual camera, that is, the locus of the camera coordinates $(y_1, z_1)$ satisfies the following equation:

$$y^2+z^2=R^2$$

Note that R is a value of the radius centered on the object O, and is determined in advance and shared between both the apparatuses that execute the bidirectional communication.

Further, the direction of the virtual camera (the direction of a camera optical axis) is set to face the virtual camera capture direction set point C.

Note that positive and negative settings of the distance c between the object O and the virtual camera capture direction set point C are set as follows.

In the case where the virtual camera capture direction set point C is set in front of the object O (in the direction approaching the viewing user A), the distance c is set to a positive value, that is, c>0.

On the other hand, in the case where the virtual camera capture direction set point C is set behind the object O (in the direction away from the viewing user A), the distance c is set to a minus value, that is, c<0.

Note that the virtual camera capture direction set point C is determined in advance in the apparatuses that execute bidirectional communication and is shared between both the apparatuses, similarly to the above-described radius R.

(b) An Example of Calculating a Setting Position of the Virtual Camera

Next, processing of calculating a setting position of the virtual camera that captures the virtual viewpoint image will be described.

The position of the viewing user A is $(y_0, z_0)$.

The viewing user position is acquired in advance, and the setting position $(y_1, z_1)$ of the virtual camera that captures the virtual viewpoint image is calculated on the basis of the acquired viewing user position information $(y_0, z_0)$ by the following procedure.

Note that the processing is executed, approximating that the virtual camera follows the locus of the circle with the radius R centered on the object O.

Intersection coordinates $(y_1, z_1)$ of a straight line OA and the locus of the circle with the radius R centered on the distance (R) between the object O and the virtual camera become a center coordinate position of the virtual camera, where center coordinates of the viewing user A is $(y_0, z_0)$.

Here, the following relational equations are established among the parameters of the virtual camera position $(y_1, z_1)$ and the viewing user position $(y_0, z_0)$.

$$z_1 = (z_0/y_0)y_1$$

$$y_1^2 + z_1^2 = R^2$$

Solving the above simultaneous equations, $$y_1 = Ry_0/\text{SQRT}(y_0^2 + z_0^2)$$

$$z_1 = Rz_0/\text{SQRT}(y_0^2 + z_0^2)$$

are obtained, and
the virtual camera position $(y_1, z_1)$ is obtained.

For example, a remote-side virtual viewpoint position calculation unit 161 of a remote information processing unit 107 illustrated in FIG. 9 calculates the virtual camera position $(y_1, z_1)$ on the basis of reception remote user viewing position information 181 $(y_0, z_0)$ received from the remote side according to the above procedure.

The virtual camera position $(y_1, z_1)$ becomes remote-side virtual viewpoint position information 183 that is output information of the remote-side virtual viewpoint position calculation unit 161 of the remote information processing unit 107 illustrated in FIG. 9.

Further, in the example illustrated in FIG. 14, local-side virtual viewpoint position information 233 that is output information of a local-side virtual viewpoint position calculation unit 202 of a local information processing unit 102 illustrated in FIG. 14 is the virtual camera position $(y_1, z_1)$.

14. (Fourth Embodiment) Embodiment in which Virtual Camera that Captures Virtual Viewpoint Image is Linearly and Vertically Moved Next, as a second embodiment, an embodiment in which a virtual camera that captures a virtual viewpoint image is linearly moved in a vertical (up and down) direction will be described.

In the third embodiment described with reference to FIGS. 23, 24A, 24B, 24C, and 25, the virtual camera that captures the virtual viewpoint image has been moved on the arc with the radius R set in the vertical (up and down) direction centered on the object O.

In a fourth embodiment to be described below, a virtual camera that captures a virtual viewpoint image is linearly moved in a vertical (up and down) direction, as illustrated in FIG. 26.

FIG. 26 illustrates an example in which a viewing user A and the virtual camera are linearly and vertically moved at a position of a distance R in a z-axis direction (in a direction perpendicular to a display surface) from an object O.

Coordinates are set where a vertical plane having the position of the user O as an origin is an yz plane, the up and down direction is an y axis, and a horizontal direction is a z axis.

A locus of the virtual camera is a line pq parallel to the display surface at the position of the display surface distance R from the position of a display user (the origin $(y, z)=(0, 0)$).

The right side in FIG. 26 illustrates description of
(a) the locus and direction of the virtual camera, and
(b) a virtual camera position calculation example. Hereinafter, the locus and the direction of the virtual camera that captures the virtual viewpoint image, and virtual camera setting position calculation processing will be described on the basis of the description.

(a) The Locus and Direction of the Virtual Camera

As illustrated in the left diagram in FIG. 26, a distance between the object O and a virtual camera capture direction set point C is c. Further,
coordinates of the viewing user A are $(y_0, z_0)$, and
camera coordinates indicating the position of the virtual camera are $(y_1, z_1)$.

At this time, the locus of the virtual camera, that is, the locus of the camera coordinates $(y_1, z_1)$ satisfies:

$$z = R.$$

Note that R is a z-direction distance from the object O, and is determined in advance and shared between the apparatuses that execute the bidirectional communication.

Further, the direction of the virtual camera (the direction of a camera optical axis) is set to face the virtual camera capture direction set point C.

Note that positive and negative settings of the distance c between the object O and the virtual camera capture direction set point C are set as follows.

In the case where the virtual camera capture direction set point C is set in front of the object O (in the direction approaching the viewing user A), the distance c is set to a positive value, that is, c>0.

On the other hand, in the case where the virtual camera capture direction set point C is set behind the object O (in the direction away from the viewing user A), the distance c is set to a minus value, that is, c<0.

Note that a virtual camera capture direction set point C is determined in advance in apparatuses that execute the bidirectional communication and is shared between the apparatuses, similarly to the above-described R.

(b) A Virtual Camera Setting Position Calculation Example

Next, processing of calculating a setting position of the virtual camera that captures the virtual viewpoint image will be described.

The position of the viewing user A is $(y_0, z_0)$.

The viewing user position is acquired in advance, and the setting position $((y_1, z_1)$ of the virtual camera that captures the virtual viewpoint image is calculated on the basis of the acquired viewing user position information $(y_0, z_0)$ by the following procedure.

Note that the processing is executed, approximating that the virtual camera follows the locus of the straight line pq at the z-direction distance R from the object O.

Intersection coordinates $(y_1, z_1)$ of the straight line OA and the straight line pq at the z-direction distance R from the object O become a center coordinate position of the virtual camera, where center coordinates of the viewing user A is $(y_0, z_0)$.

Here, the following relational equations are established among the parameters of the virtual camera position ($(y_1, z_1)$) and the viewing user position ($y_0, z_0$).

$$z_1 = (z_0/y_0)y_1$$

$$z_1 = R$$

Solving the above simultaneous equations, $$y_1 = Ry_0/z_0$$

$$z_1 = R$$

are obtained, and
the virtual camera position ($y_1, z_1$) is obtained.

For example, a remote-side virtual viewpoint position calculation unit 161 of a remote information processing unit 107 illustrated in FIG. 9 calculates the virtual camera position ($y_1, z_1$) on the basis of reception remote user viewing position information 181 ($y_0, z_0$) received from the remote side according to the above procedure.

The virtual camera position ($y_1, z_1$) becomes remote-side virtual viewpoint position information 183 that is output information of the remote-side virtual viewpoint position calculation unit 161 of the remote information processing unit 107 illustrated in FIG. 9.

Further, in the example illustrated in FIG. 14, local-side virtual viewpoint position information 233 that is output information of a local-side virtual viewpoint position calculation unit 202 of a local information processing unit 102 illustrated in FIG. 14 is the virtual camera position ($y_1, z_1$).

15. (Fifth Embodiment) Embodiment in which Position of Virtual Camera is Set to Position where Lines of Sight of Object and Viewer Coincide with Each Other Next, as a fifth embodiment, an embodiment in which the position of a virtual camera is set to a position where lines of sight of an object and a viewer coincide with each other will be described.

In a case of performing bidirectional communication, a display user displayed on a display unit and a viewing user viewing the display unit have a conversation. In the case of such a conversation, coincidence of lines of sight of both the users is important for smooth communication.

The fifth embodiment to be described below is, similarly to the fifth embodiment, an embodiment of setting the position of the virtual camera to a position where the coincidence of the lines of sight is realized.

A locus and a direction of the virtual camera in the fifth embodiment, and a virtual camera setting position according to a viewer angle will be described with reference to FIG. 27.

As illustrated in the left diagram in FIG. 27, a distance between an object O and a virtual camera capture direction set point C is c. Further, coordinates of a viewing user A are ($x_0, z_0$), and camera coordinates indicating the position of the virtual camera are ($x_2, z_2$).

At this time, the virtual camera coordinates ($x_2, z_2$) satisfy:

$$x_2 = R \sin \theta,$$

$$z_2 = R \cos \theta.$$

Note that R is a value of the radius centered on the object O, and is determined in advance and shared between both apparatuses that execute the bidirectional communication.

θ is an angle made by the virtual camera and a z axis.

The locus of the camera satisfies $x^2 + z^2 = R^2$.

Further, the direction of the virtual camera (the direction of a camera optical axis) is set to face the virtual camera capture direction set point C.

Note that positive and negative settings of the distance c between the object O and the virtual camera capture direction set point C are set as follows.

In the case where the virtual camera capture direction set point C is set in front of the object O (in the direction approaching the viewing user A), the distance c is set to a positive value, that is, c>0.

On the other hand, in the case where the virtual camera capture direction set point C is set behind the object O (in the direction away from the viewing user A), the distance c is set to a minus value, that is, c<0.

Note that the virtual camera capture direction set point C is determined in advance in the apparatuses that execute bidirectional communication and is shared between both the apparatuses, similarly to the above-described radius R.

In the present embodiment, the virtual camera angle θ with respect to the object O is changed in accordance with a viewer angle Φ.

Note that, as illustrated in the drawing, θ and Φ are the following angles, respectively:

θ: an angle made by the z axis and a straight line connecting the object O and the virtual camera; and Φ: an angle made by the z axis and a straight line connecting the object O and the viewing user A.

Note that the straight line connecting the object O and the viewing user A is a straight line of a case where the object O and the viewing user A are present in the same space, and corresponds to a straight line connecting the position of the object O displayed on a display unit, and the viewing user A.

In the present embodiment, the virtual camera angle θ with respect to the object O is changed according to the viewer angle Φ, and specifically a virtual camera position is set to a position where the lines of sight of the object O and the viewing user A coincide with each other.

For example, when the viewing user A is at a position shifted from the front by an angle φ, the position of the virtual camera is set to a position shifted from the front by the angle θ.

θ is calculated by the following calculation function f, using the angle Φ as a parameter.

$$\theta = f(\varphi)$$

An information processing apparatus holds the above-described function f or relational data of θ and φ in a storage unit as a database in advance.

FIG. 27(b) illustrates an example of the above function: θ=f(φ) that is data to be stored in the database.

The information processing apparatus determines a setting position of the virtual camera on the basis of an input viewing user position, using the stored database data.

An example of processing of generating the above-described database will be described with reference to FIG. 28.

Generation of the database is performed by repeating the following two steps (S01) and (S02).

(Step S01) The object O is captured from the position at the angle θ from the front.

(Step S02) In the case where the viewer A is located at the position at the angle φ from the front of a display, the captured object O in (S01) is displayed on the display and the angle φ at which the lines of sight coincide with each other.

The above (S01) and (S02) are repeated to obtain the capture angle θ of the object with a line of sight coincident as viewed from the position at the angle φ, the function of θ=f(φ) is obtained, and the function f, or the correspondence data of θ and Φ is stored in the storage unit as a database.

Next, a virtual camera position calculation processing example in the setting of the fifth embodiment will be described with reference to FIG. 29.

Figure 29:
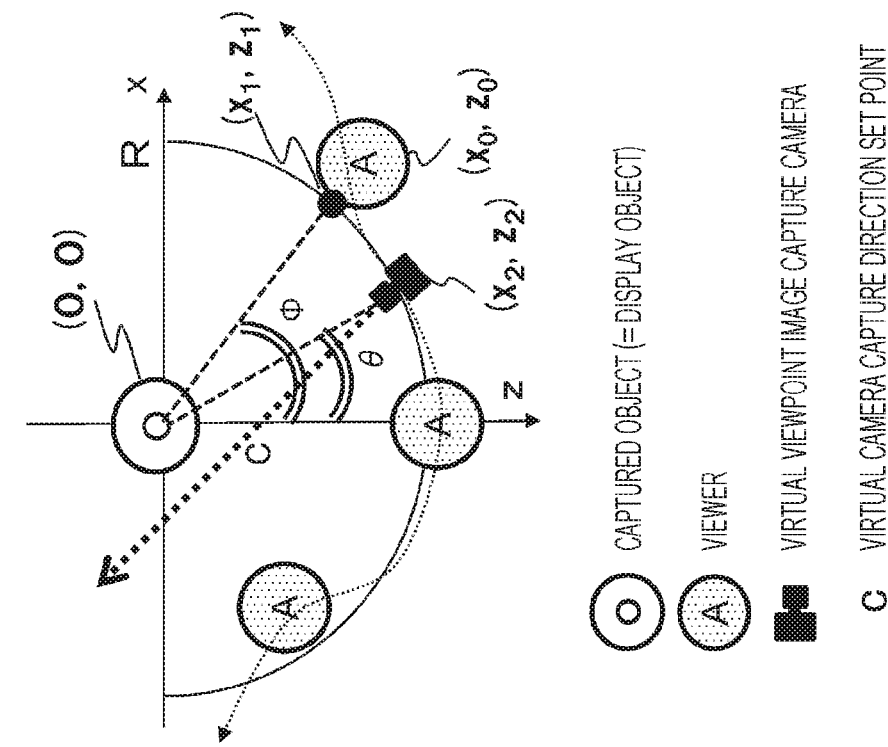
FIG. 29 is a diagram for describing setting and a position calculation example of the virtual camera according to the fifth embodiment of the present disclosure.

The diagram illustrated on the left in FIG. 29 is a diagram similar to the description with reference to FIG. 27, and is a diagram including the following constituent elements:

O: the captured object (=a display user included in the virtual viewpoint image);

A: the viewing user (=a user viewing the virtual viewpoint image);

the virtual viewpoint image capture camera (=virtual camera); and

C: the virtual camera capture direction set point.

The right side in FIG. 29 illustrates the virtual camera position calculation processing example in the setting of the fifth embodiment.

The position of the viewing user A is $(x_0, z_0)$.

The setting position $(x_2, z_2)$ of the virtual camera that captures the virtual viewpoint image is calculated on the basis of the user viewing position information $(x_0, z_0)$ by the following procedure.

Note that the viewing user A does not necessarily follow the locus of the circle with the radius R centered on the object O. However, the processing is executed approximating that the virtual camera follows the locus of the circle with the radius R centered on the object O.

Intersection coordinates $(x_1, z_1)$ of a straight line OA and a locus of a circle with a radius R centered on a distance (R) between the object O and the virtual camera serves as a reference for obtaining the position $(x_2, z_2)$ of the virtual camera, where center coordinates of the viewing user A is $(x_0, z_0)$.

The following equations are established between the center coordinates $(x_0, z_0)$ of the viewing user A and the intersection coordinates $(x_1, z_1)$ of the straight line OA and the locus of the circle with the radius R centered on the distance (R) between the object O and the virtual camera.

$$z_1=(z_0/x_0)x_1$$

$$x_1^2+z_1^2=R^2$$

Solving the above simultaneous equations, $$x_1=Rx_0/SQRT(x_0^2+z_0^2),\text{ and}$$

$$z_1=Rz_0/SQRT(x_0^2+z_0^2)$$

are obtained.

The angle Φ is calculated from the $(x_1, z_1)$, the angle θ is calculated according to θ=f(Φ), and the virtual camera position $(x_2, z_2)$ is obtained from the angle θ.

The virtual camera position $(x_2, z_2)$ is, for example, remote-side virtual viewpoint position information 183 that is output information of a remote-side virtual viewpoint position calculation unit 161 of a remote information processing unit 107 illustrated in FIG. 9.

Further, in the example illustrated in FIG. 14, local-side virtual viewpoint position information 233 that is output information of a local-side virtual viewpoint position calculation unit 202 of a local information processing unit 102 illustrated in FIG. 14 is the virtual camera position $(x_2, z_2)$.

16 (Sixth Embodiment) Embodiment in which Position of Virtual Camera is Set to Position where Lines of Sight of Object and Viewer Coincide with Each Other, and Movement of Virtual Camera is Linearly Set Next, as a sixth embodiment, an embodiment in which the position of a virtual camera is set to a position where lines of sight of an object and a viewer coincide with each other, and movement of the virtual camera is linearly set.

The sixth embodiment to be described below is an embodiment of setting the position of the virtual camera to a position where the coincidence of the lines of sight is realized. Note that a movement locus of the virtual camera is a straight line.

A locus and a direction of the virtual camera in the sixth embodiment, and a virtual camera setting position according to a viewer angle will be described with reference to FIG. 30.

As illustrated in the left diagram in FIG. 30, a distance between an object O and a virtual camera capture direction set point C is c. Further, coordinates of a viewing user A are $(x_0, z_0)$, and camera coordinates indicating the position of the virtual camera are $(x_2, z_2)$.

The viewing user A and the virtual camera are assumed to be moved in parallel to a display surface at a position of a distance R in a z-axis direction (in a direction perpendicular to the display surface) from the object O.

At this time, virtual camera coordinates $(x_2, z_2)$ satisfy:

$$x_2=R\tan\theta,$$

$$z_2=R.$$

Here, R is a parameter that defines a moving straight line pq of the virtual camera and corresponds to the distance from the object O. R is determined in advance and shared between both apparatuses that execute bidirectional communication.

θ is an angle made by the virtual camera and a z axis.

The locus of the camera satisfies z=R.

Further, the direction of the virtual camera (the direction of a camera optical axis) is set to face the virtual camera capture direction set point C.

Note that positive and negative settings of the distance c between the object O and the virtual camera capture direction set point C are set as follows.

In the case where the virtual camera capture direction set point C is set in front of the object O (in the direction approaching the viewing user A), the distance c is set to a positive value, that is, c>0.

On the other hand, in the case where the virtual camera capture direction set point C is set behind the object O (in the direction away from the viewing user A), the distance c is set to a minus value, that is, c<0.

Note that a virtual camera capture direction set point C is determined in advance in apparatuses that execute the bidirectional communication and is shared between the apparatuses, similarly to the above-described R.

In the present embodiment, the virtual camera angle θ with respect to the object O is changed in accordance with a viewer angle Φ.

Note that, as illustrated in the drawing, θ and Φ are the following angles, respectively:

θ: an angle made by the z axis and a straight line connecting the object O and the virtual camera; and Φ: an angle made by the z axis and a straight line connecting the object O and the viewing user A.

In the present embodiment, the virtual camera angle θ with respect to the object O is changed according to the viewer angle Φ, and specifically a virtual camera position is set to a position where the lines of sight of the object O and the viewing user A coincide with each other.

For example, when the viewing user A is at a position shifted from the front by an angle φ, the position of the virtual camera is set to a position shifted from the front by the angle θ.

θ is calculated by the following calculation function f, using the angle Φ as a parameter.

$$\theta = f(\varphi)$$

An information processing apparatus holds the above-described function f or relational data of θ and φ in a storage unit as a database in advance.

FIG. 30(b) illustrates an example of the above function: θ=f(φ) that is data to be stored in the database.

The information processing apparatus determines a setting position of the virtual camera on the basis of an input viewing user position, using the stored database data.

Next, a virtual camera position calculation processing example in the setting of the sixth embodiment will be described with reference to FIG. 31.

The diagram illustrated on the left in FIG. 31 is a diagram similar to the description with reference to FIG. 30, and is a diagram including the following constituent elements:

O: the captured object (=a display user included in the virtual viewpoint image);
A: the viewing user (=a user viewing the virtual viewpoint image);
the virtual viewpoint image capture camera (=virtual camera); and
C: the virtual camera capture direction set point.

The right side in FIG. 31 illustrates the virtual camera position calculation processing example in the setting of the sixth embodiment.

The position of the viewing user A is $(x_0, z_0)$.

The setting position $(x_2, z_2)$ of the virtual camera that captures the virtual viewpoint image is calculated on the basis of the user viewing position information $(x_0, z_0)$ by the following procedure.

Note that the viewing user A does not necessarily follow the locus of the straight line at the distance R from the object O. However, the processing is executed approximating that the virtual camera follows the locus of the straight line at the distance R from the object O.

Intersection coordinates $(x_1, z_1)$ of a straight line OA and the straight line pq at the position of the distance R from the object O serves as a reference for obtaining the position $(x_2, z_2)$ of the virtual camera, where center coordinates of the viewing user A is $(x_0, z_0)$.

The following equations are established between the center coordinates $(x_0, z_0)$ of the viewing user A and the intersection coordinates $(x_1, z_1)$ of the straight line OA and the straight line pq at the position of the distance R from the object O.

$$z_1 = (z_0/x_0)x_1$$

$$z_1 = R$$

Solving the above simultaneous equations, $$x_1 = Rx_0/z_0$$

$$z_1 = R$$

are obtained.

The angle Φ is calculated from the $(x_1, z_1)$, the angle θ is calculated according to θ=f(Φ), and the virtual camera position $(x_2, z_2)$ is obtained from the angle θ.

The virtual camera position $(x_2, z_2)$ is, for example, remote-side virtual viewpoint position information 183 that is output information of a remote-side virtual viewpoint position calculation unit 161 of a remote information processing unit 107 illustrated in FIG. 9.

Further, in the example illustrated in FIG. 14, local-side virtual viewpoint position information 233 that is output information of a local-side virtual viewpoint position calculation unit 202 of a local information processing unit 102 illustrated in FIG. 14 is the virtual camera position $(x_2, z_2)$.

17. (First Modification of Sixth Embodiment) Embodiment in which Position of Virtual Camera is Set to Position where Lines of Sight Between Object and Viewer Coincide with Each Other, and Locus of Virtual Camera is Set to Keep Distance Between Virtual Camera and Object Constant Next, as a first modification of the sixth embodiment, the position of the virtual camera is set to a position where lines of sight between the object and the viewer coincide with each other, and the locus of the virtual camera is set to keep the distance between the virtual camera and the object constant will be described.

The locus and direction of the virtual camera in the first modification of the sixth embodiment, and the virtual camera setting position according to the viewer angle will be described with reference to FIG. 32.

As illustrated in the left diagram in FIG. 32, the distance between the object O and the virtual camera capture direction set point C is c. Further, coordinates of the viewing user A are $(x_0, z_0)$, and
camera coordinates indicating the position of the virtual camera are $(x_2, z_2)$.

The viewing user A and the virtual camera are assumed to be moved in parallel to the display surface at a position of a distance R in a z-axis direction (in a direction perpendicular to the display surface) from the object O.

Furthermore, in the first modification, the distance between the object O and the viewing user A and the distance between the object O and the virtual camera are set to be constant.

The distances are D.

At this time, the virtual camera coordinates $(x_2, z_2)$ satisfy:

$$x_2 = D \sin \theta,$$

$$z_2 = D \cos \theta.$$

Note that D corresponds to the distance between the object O and the viewing user A, and satisfies the following equation:

$$D = \mathrm{SQRT}(x_1^2 + z_1^2)$$

As described above, D is the distance between the object O and the viewing user A. Further, θ is the angle made by the virtual camera and the z axis.

Further, the direction of the virtual camera (the direction of a camera optical axis) is set to face the virtual camera capture direction set point C.

Note that positive and negative settings of the distance c between the object O and the virtual camera capture direction set point C are set as follows.

In the case where the virtual camera capture direction set point C is set in front of the object O (in the direction approaching the viewing user A), the distance c is set to a positive value, that is, c>0.

On the other hand, in the case where the virtual camera capture direction set point C is set behind the object O (in the direction away from the viewing user A), the distance c is set to a minus value, that is, c<0.

Note that the virtual camera capture direction set point C is determined in advance in the apparatuses that execute the bidirectional communication and is shared between the apparatuses, similarly to the above-described D.

In the present embodiment, the virtual camera angle θ with respect to the object O is changed in accordance with a viewer angle Φ.

Note that, as illustrated in the drawing, θ and Φ are the following angles, respectively:

θ: an angle made by the z axis and a straight line connecting the object O and the virtual camera; and Φ: an angle made by the z axis and a straight line connecting the object O and the viewing user A.

In the present embodiment, the virtual camera angle θ with respect to the object O is changed according to the viewer angle Φ, and specifically a virtual camera position is set to a position where the lines of sight of the object O and the viewing user A coincide with each other.

For example, when the viewing user A is at a position shifted from the front by an angle φ, the position of the virtual camera is set to a position shifted from the front by the angle θ.

θ is calculated by the following calculation function f, using the angle Φ as a parameter.

$\theta = f(\varphi)$

An information processing apparatus holds the above-described function f or relational data of θ and φ in a storage unit as a database in advance.

FIG. 32(b) illustrates an example of the above function: θ=f(φ) that is data to be stored in the database.

The information processing apparatus determines a setting position of the virtual camera on the basis of an input viewing user position, using the stored database data.

Next, a virtual camera position calculation processing example in the first modification of the sixth embodiment will be described with reference to FIG. 33.

The diagram illustrated on the left in FIG. 33 is a diagram similar to the description with reference to FIG. 32, and is a diagram including the following constituent elements:

O: the captured object (=a display user included in the virtual viewpoint image);

A: the viewing user (=a user viewing the virtual viewpoint image);

the virtual viewpoint image capture camera (=virtual camera); and

C: the virtual camera capture direction set point.

The right side in FIG. 33 illustrates the virtual camera position calculation processing example in the setting of the sixth embodiment.

The position of the viewing user A is $(x_0, z_0)$.

The setting position $(x_2, z_2)$ of the virtual camera that captures the virtual viewpoint image is calculated on the basis of the user viewing position information $(x_0, z_0)$ by the following procedure.

Note that the viewing user A does not necessarily follow the locus of the straight line at the distance R from the object O. However, the processing is executed approximating that the virtual camera follows the locus of the straight line at the distance R from the object O.

Intersection coordinates $(x_1, z_1)$ of a straight line OA and the straight line pq at the position of the distance R from the object O serves as a reference for obtaining the position $(x_2, z_2)$ of the virtual camera, where center coordinates of the viewing user A is $(x_0, z_0)$.

The following equations are established between the center coordinates $(x_0, z_0)$ of the viewing user A and the intersection coordinates $(x_1, z_1)$ of the straight line OA and the straight line pq at the position of the distance R from the object O.

$z_1 = (z_0/x_0)x_1$ $z_1 = R$

Solving the above simultaneous equations, $x_1 = Rx_0/z_0$ $z_1 = R$ are obtained.

The angle Φ is calculated from the $(x_1, z_1)$, the angle θ is further calculated according to $\theta = f(\Phi)$, and the virtual camera position $(x_2, z_2)$ is obtained according to the relational equations described with reference to FIG. 32, that is, $x_2 = D \sin \theta$, and $z_2 = D \cos \theta$.

The virtual camera position $(x_2, z_2)$ is, for example, remote-side virtual viewpoint position information 183 that is output information of a remote-side virtual viewpoint position calculation unit 161 of a remote information processing unit 107 illustrated in FIG. 9.

Further, in the example illustrated in FIG. 14, local-side virtual viewpoint position information 233 that is output information of a local-side virtual viewpoint position calculation unit 202 of a local information processing unit 102 illustrated in FIG. 14 is the virtual camera position $(x_2, z_2)$.

18. (Seventh Embodiment) Embodiment in which Position of Virtual Camera is Set to Position (Behind Viewer or the Like) on Straight Line Connecting Object and Viewer Next, as a seventh embodiment, an embodiment in which the position of a virtual camera is set to a position (behind a viewer or the like) on a straight line connecting an object and a viewer will be described.

The seventh embodiment will be described with reference to FIG. 34.

The diagram illustrated on the left in FIG. 34 is a diagram for describing a configuration of the seventh embodiment, and is a diagram including the following constituent elements:

O: a captured object (=a display user included in a virtual viewpoint image);

A: a viewing user (=a user viewing the virtual viewpoint image);

a virtual viewpoint image capture camera (=a virtual camera); and

C: a virtual camera capture direction set point.

Note that an angle Φ is an angle made by a z axis and a straight line connecting the object O and the viewing user A.

In the seventh embodiment, the viewing user A is assumed to be moved on an arc with a radius R centered on the object O, and the virtual camera is set to be moved on an arc with a radius (R+r) centered on the object O.

The right in FIG. 33 illustrates description (a) of a locus and a direction of the virtual camera.

Hereinafter, the locus and direction of the virtual camera in the seventh embodiment will be described.

Camera coordinates $(x_2, z_2)$ are expressed by the following equations, where the distance between the object O and the virtual camera capture direction set point C is c, and coordinates of the viewing user A are $(x_0, z_0)$:

$$x_2 = (R+r)\sin \Phi; \text{ and}$$

$$z_2 = (R+r)\cos \Phi.$$

Further, the locus of the virtual camera $(x_2, z_2)$ satisfies the following equation:

$$x^2 + z^2 = (R+r)^2.$$

Note that R+r is a value of the radius centered on the object O, and is determined in advance and shared between both the apparatuses that execute the bidirectional communication.

Further, the direction of the virtual camera (the direction of a camera optical axis) is set to face the virtual camera capture direction set point C.

Note that positive and negative settings of the distance c between the object O and the virtual camera capture direction set point C are set as follows.

In the case where the virtual camera capture direction set point C is set in front of the object O (in the direction approaching the viewing user A), the distance c is set to a positive value, that is, c>0.

On the other hand, in the case where the virtual camera capture direction set point C is set behind the object O (in the direction away from the viewing user A), the distance c is set to a minus value, that is, c<0.

Next, a virtual camera position calculation processing example in the setting of the seventh embodiment will be described with reference to FIG. 35.

The diagram illustrated on the left in FIG. 35 is a diagram similar to the description with reference to FIG. 34, and is a diagram including the following constituent elements:

O: the captured object (=a display user included in the virtual viewpoint image);

A: the viewing user (=a user viewing the virtual viewpoint image);

the virtual viewpoint image capture camera (=virtual camera); and

C: the virtual camera capture direction set point.

The right side in FIG. 35 illustrates the virtual camera position calculation processing example in the setting of the seventh embodiment.

The position of the viewing user A is $(x_0, z_0)$.

The setting position $(x_2, z_2)$ of the virtual camera that captures the virtual viewpoint image is calculated on the basis of the user viewing position information $(x_0, z_0)$ by the following procedure.

Note that the viewing user A does not necessarily follow the locus of the circle with the radius R centered on the object O. However, the processing is executed approximating that the virtual camera follows the locus of the circle with the radius (R+r) centered on the object O.

Intersection coordinates $(x_1, z_1)$ of a straight line OA and a locus of a circle with a radius R centered on a distance (R) between the object O and the virtual camera serves as a reference for obtaining the position $(x_2, z_2)$ of the virtual camera, where center coordinates of the viewing user A is $(x_0, z_0)$.

The following equations are established between the center coordinates $(x_0, z_0)$ of the viewing user A and the intersection coordinates $(x_1, z_1)$ of the straight line OA and the locus of the circle with the radius R centered on the distance (R) between the object O and the virtual camera.

$$z_1 = (z_0/x_0)x_1$$

$$x_1^2 + z_1^2 = R^2$$

Solving the above simultaneous equations, $$x_1 = Rx_0/\text{SQRT}(x_0^2 + z_0^2), \text{ and}$$

$$z_1 = Rz_0/\text{SQRT}(x_0^2 + z_0^2)$$

are obtained.

The angle $\Phi$ is calculated from the $(x_1, z_1)$ and the virtual camera position $(x_2, z_2)$ is obtained according to the correspondence relationship between R and r.

The virtual camera position $(x_2, z_2)$ is, for example, remote-side virtual viewpoint position information 183 that is output information of a remote-side virtual viewpoint position calculation unit 161 of a remote information processing unit 107 illustrated in FIG. 9.

Further, in the example illustrated in FIG. 14, local-side virtual viewpoint position information 233 that is output information of a local-side virtual viewpoint position calculation unit 202 of a local information processing unit 102 illustrated in FIG. 14 is the virtual camera position $(x_2, z_2)$.

The seventh embodiment is characterized in maintaining the distance between the virtual camera and the object O constant. The effect of this processing will be described with reference to FIGS. 36A, 36B, and 36C.

FIGS. 36A, 36B, and 36C are diagrams for describing the distance c from the object O to the virtual camera capture direction set point C in the following two cases:

a case of c>0 (setting the virtual camera capture direction set point C in front of the object O); and a case of c>0 (setting the virtual camera capture direction set point C behind the object O).

FIG. 36A illustrates a display example of the case of c>0 (setting the virtual camera capture direction set point C in front of the object O).

In this case, the face of the object O is displayed to be localized at a depth side of a display surface on a display unit (display). Therefore, this means that the distance between the viewing user A and the object O is increased.

To further emphasize the effect to increase the distance, the virtual camera is separated from the object to be captured (r>0). Then, the face of the object to be captured is displayed small.

FIG. 36B illustrates a display example of the case of c>0 (setting the virtual camera capture direction set point C behind the object O).

In this case, the face of the object O is displayed to be localized in front of the display surface on the display unit (display). Therefore, this means that the distance between the viewing user A and the object O is decreased.

To further emphasize the effect to decrease the distance, the virtual camera is brought close to the object to be captured (r<0). Then, the face of the object to be captured is displayed large In this way, the size of the object is changed according to the position setting of the virtual camera capture direction set point C. In the seventh embodiment, the position of the virtual camera is set to further emphasize the effect by controlling the parameter r as a separation distance from the viewing user.

19. Hardware Configuration Example of Information Processing Apparatus

Next, a hardware configuration example of an information processing apparatus will be described with reference to FIG. 37.

FIG. 37 is a diagram illustrating a hardware configuration example of an information processing apparatus that executes processing according to the present disclosure.

A central processing unit (CPU) 501 functions as a control unit and a data processing unit that execute various types of processing according to a program stored in a read only memory (ROM) 502 or a storage unit 508. For example, the CPU 501 executes processing according to the sequence described in the above embodiment. A random access memory (RAM) 503 stores the program executed by the CPU 501, data, and the like. These CPU 501, ROM 502, and RAM 503 are mutually connected by a bus 504.

The CPU 501 is connected to an input/output interface 505 via the bus 504, and an input unit 506, an output unit 507, and the like are connected to the input/output interface 505.

The input unit 506 inputs sensor information (captured images and depth information) from, for example, a sensor 521 and inputs various data, commands, setting information, and the like from various switches, keyboards, a mouse, a microphone, and the like, imputable by the user.

The output unit 507 executes data output to a display unit 522, a speaker, and the like, for example.

The CPU 501 executes various types of processing corresponding to data and commands input from the input unit 506, and outputs a processing result to the output unit 507, for example.

The storage unit 508 connected to the input/output interface 505 includes, for example, a hard disk and the like, and stores the program executed by the CPU 501 and various data. A communication unit 509 functions as a transmission/reception unit for Wi-Fi communication, Bluetooth (registered trademark) communication, or another data communication via a network such as the Internet or a local area network, and communicates with an external device.

A drive 510 connected to the input/output interface 505 drives a removable medium 511 such as a magnetic disk, an optical disk, a magneto-optical disk, or a semiconductor memory such as a memory card, and executes data recording or reading.

20. Conclusion of Configuration of Present Disclosure

The embodiments of the present disclosure have been described in detail with reference to the specific embodiments. However, it is obvious that those skilled in the art can make modifications and substitutions of the embodiments without departing from the gist of the present disclosure. That is, the present invention has been disclosed in the form of exemplification, and should not be restrictively interpreted. To judge the gist of the present disclosure, the scope of claims should be taken into consideration.

Note that the technology disclosed in the present specification can have the following configurations.

(1) An information processing apparatus including:

a virtual viewpoint position calculation unit configured to calculate a virtual viewpoint position corresponding to a position of a virtual camera that captures a virtual viewpoint image on the basis of viewing position information of a viewing user of the virtual viewpoint image; and a virtual viewpoint image generation unit configured to generate the virtual viewpoint image corresponding to a captured image from the virtual viewpoint position, in which the virtual viewpoint image generation unit is configured to generate the virtual viewpoint image on the basis of a captured image of a real camera that captures an object user, and generates the virtual viewpoint image, setting a capture direction to a virtual camera capture direction set point C set to a different position from the object user.

(2) The information processing apparatus according to (1), in which the virtual viewpoint image generation unit generates the virtual viewpoint image assumed to be captured, pointing the capture direction to the virtual camera capture direction set point C set to a front position of the object user.

(3) The information processing apparatus according to (1) or (2), in which the virtual viewpoint position calculation unit sets a circumference of a circle set on a horizontal plane centered on the object user as a virtual camera locus, and sets a proximity position to a viewing user position on the virtual camera locus as the virtual viewpoint position, and the virtual viewpoint image generation unit generates the virtual viewpoint image, setting the capture direction to the virtual camera capture direction set point C from the virtual camera locus along the circumference of a circle set on a horizontal plane centered on the object user.

(4) The information processing apparatus according to (1) or (2), in which the virtual viewpoint position calculation unit sets a circumference of a circle set on a horizontal plane centered on the virtual camera capture direction set point C as a virtual camera locus, and sets a proximity position to a viewing user position on the virtual camera locus as the virtual viewpoint position, and the virtual viewpoint image generation unit generates the virtual viewpoint image, setting the capture direction to the virtual camera capture direction set point C from the virtual camera locus along the circumference of a circle set on a horizontal plane centered on the virtual camera capture direction set point C.

(5) The information processing apparatus according to any one of (1) to (4), in which the virtual viewpoint image generation unit generates the virtual viewpoint image, changing a position of the virtual camera capture direction set point C according to a position of the viewing user and setting the capture direction to the virtual camera capture direction set point C.

(6) The information processing apparatus according to (1) or (2), in which the virtual viewpoint position calculation unit sets a straight line passing through a point separated by a predetermined distance from the object user and set on a horizontal plane as a virtual camera locus, and sets a proximity position to a viewing user position on the virtual camera locus as the virtual viewpoint position, and the virtual viewpoint image generation unit generates the virtual viewpoint image, setting the capture direction to the virtual camera capture direction set point C from the virtual camera locus along the straight line passing through a point separated by a predetermined distance from the object user and set on a horizontal plane.

(7) The information processing apparatus according to (1) or (2), in which the virtual viewpoint position calculation unit sets a circumference of a circle set on a vertical plane centered on the object user as a virtual camera locus, and sets a proximity position to a viewing user position on the virtual camera locus as the virtual viewpoint position, and the virtual viewpoint image generation unit generates the virtual viewpoint image, setting the capture direction to the virtual camera capture direction set point C from the virtual camera locus along the circumference of a circle set on a vertical plane centered on the object user.

(8) The information processing apparatus according to (1) or (2), in which the virtual viewpoint position calculation unit sets a straight line passing through a point separated by a predetermined distance from the object user and set on a vertical plane as a virtual camera locus, and sets a proximity position to a viewing user position on the virtual camera locus as the virtual viewpoint position, and the virtual viewpoint image generation unit generates the virtual viewpoint image, setting the capture direction to the virtual camera capture direction set point C from the virtual camera locus along the straight line passing through a point separated by a predetermined distance from the object user and set on a vertical plane.

(9) The information processing apparatus according to (1) or (2), in which the virtual viewpoint position calculation unit calculates a line of sight coincident position where lines of sight between a display user in the virtual viewpoint image and the viewing user coincide with each other as the virtual viewpoint position, and the virtual viewpoint image generation unit generates the virtual viewpoint image, setting the capture direction to the virtual camera capture direction set point C, using the line of sight coincident position as the virtual camera position.

(10) The information processing apparatus according to (9), in which the virtual viewpoint position calculation unit sets a circumference of a circle set on a horizontal plane centered on the object user as a virtual camera locus, and sets a proximity position to a viewing user position on the virtual camera locus as the virtual viewpoint position, and the virtual viewpoint image generation unit generates the virtual viewpoint image, setting the capture direction to the virtual camera capture direction set point C from the virtual camera locus along the circumference of a circle set on a horizontal plane centered on the object user.

(11) The information processing apparatus according to (9), in which the virtual viewpoint position calculation unit sets a straight line passing through a point separated by a predetermined distance from the object user and set on a horizontal plane as a virtual camera locus, and sets a proximity position to a viewing user position on the virtual camera locus as the virtual viewpoint position, and the virtual viewpoint image generation unit generates the virtual viewpoint image, setting the capture direction to the virtual camera capture direction set point C from the virtual camera locus along the straight line passing through a point separated by a predetermined distance from the object user and set on a horizontal plane.

(12) An information processing apparatus including:

a reception unit configured to receive viewing position information of a viewing user of a virtual viewpoint image;

a virtual viewpoint position calculation unit configured to calculate a virtual viewpoint position corresponding to a position of a virtual camera that captures the virtual viewpoint image on the basis of the viewing position information;

a virtual viewpoint image generation unit configured to generate the virtual viewpoint image corresponding to a captured image from the virtual viewpoint position; and a transmission unit configured to transmit the virtual viewpoint image generated by the virtual viewpoint image generation unit to an apparatus on a side of the viewing user, in which the virtual viewpoint image generation unit is configured to generate the virtual viewpoint image on the basis of a captured image of a real camera that captures an object user, and generates the virtual viewpoint image, setting a capture direction to a virtual camera capture direction set point C set to a different position from the object user.

(13) An information processing apparatus including:

a viewing position detection unit configured to detect viewing position information of a viewing user of a virtual viewpoint image;

a virtual viewpoint position calculation unit configured to calculate a virtual viewpoint position corresponding to a position of a virtual camera that captures the virtual viewpoint image on the basis of the viewing position information; and a virtual viewpoint image generation unit configured to generate the virtual viewpoint image corresponding to a captured image from the virtual viewpoint position, in which the virtual viewpoint image generation unit is configured to generate the virtual viewpoint image on the basis of a captured image of a real camera that captures an object user, and generates the virtual viewpoint image, setting a capture direction to a virtual camera capture direction set point C set to a different position from the object user.

(14) The information processing apparatus according to (13), including:

a reception unit configured to receive an image to be applied to generation of the virtual viewpoint image, in which the virtual viewpoint image generation unit generates the virtual viewpoint image on the basis of the image received by the reception unit.

(15) An information processing system including a first information processing apparatus and a second information processing apparatus that execute bidirectional communication, each of the first information processing apparatus and the second information processing apparatus including:

a reception unit configured to receive viewing position information of a viewing user of a virtual viewpoint image from a communication partner apparatus;

a virtual viewpoint position calculation unit configured to calculate a virtual viewpoint position corresponding to a position of a virtual camera that captures the virtual viewpoint image to be displayed on a display unit of the communication partner apparatus on the basis of the viewing position information;

a virtual viewpoint image generation unit configured to generate the virtual viewpoint image corresponding to a captured image from the virtual viewpoint position; and a transmission unit configured to transmit the virtual viewpoint image to the communication partner apparatus, in which the virtual viewpoint image generation unit is configured to generate the virtual viewpoint image on the basis of a captured image of a real camera that captures an object user, and generates the virtual viewpoint image, setting a capture direction to a virtual camera capture direction set point C set to a different position from the object user.

(16) An information processing method executed in an information processing apparatus, the information processing method including:

calculating, by a virtual viewpoint position calculation unit, a virtual viewpoint position corresponding to a position of a virtual camera that captures a virtual viewpoint image on the basis of viewing position information of a viewing user of the virtual viewpoint image; and executing, by a virtual viewpoint image generation unit, virtual viewpoint image generation processing of generating the virtual viewpoint image corresponding to a captured image from the virtual viewpoint position, in which the virtual viewpoint image generation unit generates the virtual viewpoint image on the basis of a captured image of a real camera that captures an object user, and generates the virtual viewpoint image, setting a capture direction to a virtual camera capture direction set point C set to a different position from the object user.

(17) A program for causing an information processing apparatus to execute information processing, the program for causing:

a virtual viewpoint position calculation unit to calculate a virtual viewpoint position corresponding to a position of a virtual camera that captures a virtual viewpoint image on the basis of viewing position information of a viewing user of the virtual viewpoint image; and a virtual viewpoint image generation unit to execute virtual viewpoint image generation processing of generating the virtual viewpoint image corresponding to a captured image from the virtual viewpoint position, in which, in the virtual viewpoint image generation processing, the program causes the virtual viewpoint image to be generated on the basis of a captured image of a real camera that captures an object user, and causes the virtual viewpoint image to be generated, setting a capture direction to a virtual camera capture direction set point C set to a different position from the object user.

Further, the series of processing described in the specification can be executed by hardware, software, or a combined configuration of the hardware and software. In the case of executing the processing by software, a program, which records the processing sequence, can be installed and executed in a memory in a computer incorporated in dedicated hardware, or the program can be installed and executed in a general-purpose computer capable of executing various types of processing. For example, the program can be recorded in the recording medium in advance. Other than the installation from the recording medium to the computer, the program can be received via a network such as a local area network (LAN) or the Internet and can be installed to a recording medium such as a built-in hard disk.

Note that the various types of processing described in the specification may be executed not only in chronological order as described but also in parallel or individually depending on the processing capability of the device executing the process or as required. Further, the system in the present specification is a logical aggregate configuration of a plurality of devices, and is not limited to devices having respective configurations within the same housing.

INDUSTRIAL APPLICABILITY

As described above, according to the configuration of an embodiment of the present disclosure, the configuration to make a virtual viewpoint image be a more natural stereoscopic image is realized, the virtual viewpoint image being transmitted/received between information processing apparatuses that execute bidirectional communication.

Specifically, a virtual viewpoint position calculation unit configured to calculate a virtual viewpoint position corresponding to a position of a virtual camera that captures a virtual viewpoint image on the basis of viewing position information of a viewing user of the virtual viewpoint image, and a virtual viewpoint image generation unit configured to generate the virtual viewpoint image corresponding to a captured image from the virtual viewpoint position are included. The virtual viewpoint image generation unit is configured to generate the virtual viewpoint image on the basis of a captured image of a real camera that captures an object user, and generates the virtual viewpoint image, setting a capture direction to a virtual camera capture direction set point C set to a position different from the object user. For example, the virtual viewpoint image generation unit generates the virtual viewpoint image assumed to be captured, pointing the capture direction to the virtual camera capture direction set point C set to a front position of the object user.

With the present configuration, the configuration to make the virtual viewpoint image be a more natural stereoscopic image is realized, the virtual viewpoint image being transmitted/received between information processing apparatuses that execute bidirectional communication.

REFERENCE SIGNS LIST

10, 20 Information processing apparatus
11, 21 Display unit (display)
12, 22 Camera
13, 23 Speaker
30 Network
100 Information processing apparatus
101 Sensor unit
102 Local information processing unit
103 Encoding unit
104 Transmission unit
105 Reception unit
106 Decoding unit
107 Remote information processing unit
108 Display unit
120 Network
130 Second location information processing unit
151 Local user viewing position detection unit
152 Transmission virtual viewpoint image generation unit
161 Remote-side virtual viewpoint position calculation unit
201 Local user viewing position detection unit
202 Local-side virtual viewpoint position calculation unit
211 Display virtual viewpoint image generation unit
501 CPU
502 ROM
503 RAM
504 Bus
505 Input/output interface
506 Input unit
507 Output unit 508 Storage unit
509 Communication unit
510 Drive
511 Removable medium
521 Sensor
522 Display unit

The invention claimed is:

1. An information processing apparatus, comprising:
a processor configured to:
calculate a virtual viewpoint position corresponding to a position of a virtual camera that captures a virtual viewpoint image, wherein the calculation of the virtual viewpoint position is based on viewing position information of a viewing user of the virtual viewpoint image;
set a circumference of a circle on one of a horizontal plane or a vertical plane centered on an object user as a virtual camera locus;
set a proximity position to a viewing user position on the virtual camera locus as the virtual viewpoint position;
set a capture direction of the virtual camera to a specific point from the virtual viewpoint position along the circumference of the circle on the one of the horizontal plane or the vertical plane, wherein the specific point is different from a position from the object user; and
generate, based on the set capture direction, the virtual viewpoint image corresponding to a captured image from the virtual viewpoint position, wherein
the generation of the virtual viewpoint image is based on the captured image of a real camera that captures the object user.

2. The information processing apparatus according to claim 1, wherein the specific point is at a front position of the object user.

3. The information processing apparatus according to claim 1, wherein the processor is further configured to:
set the circumference of the circle on the horizontal plane centered the specific point as the virtual camera locus;
set the proximity position to the viewing user position on the virtual camera locus as the virtual viewpoint position; and
set the capture direction to the specific point from the virtual camera locus along the circumference of the circle set on the horizontal plane.

4. The information processing apparatus according to claim 1, wherein the processor is further configured to change a position of the specific point based on a position of the viewing user.

5. The information processing apparatus according to claim 1, wherein the processor is further configured to:
set a straight line as the virtual camera locus, wherein the straight line passes through a point separated by a determined distance from the object user on the horizontal plane;
set the proximity position to the viewing user position on the virtual camera locus as the virtual viewpoint position; and
set the capture direction of the virtual camera to the specific point from the virtual camera locus along the straight line.

6. The information processing apparatus according to claim 1, wherein the processor is further configured to:

set a straight line as the virtual camera locus, wherein the straight line passes through a point separated by a determined distance from the object user on the vertical plane;
set the proximity position to the viewing user position on the virtual camera locus as the virtual viewpoint position; and
set the capture direction to the specific point from the virtual camera locus along the straight line.

7. The information processing apparatus according to claim 1, wherein the processor is further configured to:
calculate a line of sight coincident position where a line of sight between a display user in the virtual viewpoint image coincides with a line of sight of the viewing user; and
set the capture direction of the virtual camera to the specific point based on the line of sight coincident position as the virtual viewpoint position.

8. The information processing apparatus according to claim 7, wherein the processor is further configured to:
set a straight line as the virtual camera locus, wherein the straight line passes through a point of separated by a determined distance from the object user on the horizontal plane;
set the proximity position to a first user position on the virtual camera locus as the virtual viewpoint position; and
set the capture direction of the virtual camera to the specific point from the virtual camera locus along the straight line.

9. An information processing apparatus, comprising:
a processor configured to:
receive viewing position information of a viewing user of a virtual viewpoint image;
calculate a virtual viewpoint position corresponding to a position of a virtual camera that captures the virtual viewpoint image, wherein the calculation of the virtual viewpoint position is based on the viewing position information;
set a circumference of a circle on one of a horizontal plane or a vertical plane centered on an object user as a virtual camera locus;
set a proximity position to a viewing user position on the virtual camera locus as the virtual viewpoint position;
set a capture direction of the virtual camera to a specific point from the virtual viewpoint position along the circumference of the circle on the one of the horizontal plane or the vertical plane, wherein the specific point is different from a position from the object user;
generate, based on the set capture direction, the virtual viewpoint image corresponding to a captured image from the virtual viewpoint position; and
transmit the virtual viewpoint image to an apparatus on a side of the viewing user, wherein
the generation of the virtual viewpoint image is based on the captured image of a real camera that captures the object user.

10. An information processing apparatus, comprising:
a processor configured to:
detect viewing position information of a viewing user of a virtual viewpoint image;
calculate a virtual viewpoint position corresponding to a position of a virtual camera that captures the virtual viewpoint image, wherein the calculation of the virtual viewpoint position is based on the viewing position information;
set a circumference of a circle on one of a horizontal plane or a vertical plane centered on an object user as a virtual camera locus;
set a proximity position to a viewing user position on the virtual camera locus as the virtual viewpoint position;
set a capture direction of the virtual camera to a specific point from the virtual viewpoint position along the circumference of the circle on the one of the horizontal plane or the vertical plane, wherein the specific point is different from a position from the object user; and
generate, based on the set capture direction, the virtual viewpoint image corresponding to a captured image from the virtual viewpoint position, wherein
the generation of the virtual viewpoint image is based on the captured image of a real camera that captures the object user.

11. The information processing apparatus according to claim 10, wherein
the processor is further configured to receive an image to be applied to the generation of the virtual viewpoint image, and
the generation of the virtual viewpoint image is based on the received image.

12. An information processing system, comprising:
a first information processing apparatus; and
a second information processing apparatus that executes bidirectional communication with the first information processing apparatus, wherein each of the first information processing apparatus and the second information processing apparatus comprising a processor configured to:
receive viewing position information of a viewing user of a virtual viewpoint image from a communication partner apparatus;
calculate a virtual viewpoint position corresponding to a position of a virtual camera that captures the virtual viewpoint image to be displayed on a display unit of the communication partner apparatus, wherein the calculation of the virtual viewpoint position is based on the viewing position information;
set a circumference of a circle on one of a horizontal plane or a vertical plane centered on an object user as a virtual camera locus;
set a capture direction of the virtual camera to a specific point from the virtual viewpoint position along the circumference of the circle on the one of the horizontal plane or the vertical plane, wherein the specific point is different from a position from the object user;
generate, based on the set capture direction, the virtual viewpoint image corresponding to a captured image from the virtual viewpoint position; and
transmit the virtual viewpoint image to the communication partner apparatus, wherein
the generation of the virtual viewpoint image is based on the captured image of a real camera that captures the object user.

13. An information processing method, comprising:
calculating, by a processor, a virtual viewpoint position corresponding to a position of a virtual camera that captures a virtual viewpoint image, wherein the calculation of the virtual viewpoint position is based on viewing position information of a viewing user of the virtual viewpoint image;
setting, by the processor, a circumference of a circle on one of a horizontal plane or a vertical plane centered on an object user as a virtual camera locus;
setting, by the processor, a proximity position to a viewing user position on the virtual camera locus as the virtual viewpoint position;
setting, by the processor, a capture direction of the virtual camera to a specific point from the virtual viewpoint position along the circumference of the circle on the one of the horizontal plane or the vertical plane, wherein the specific point is different from a position from the object user; and
generating, by the processor based on the set capture direction, the virtual viewpoint image corresponding to a captured image from the virtual viewpoint position, wherein
the generation of the virtual viewpoint image is based on the captured image of a real camera that captures the object user.

14. A non-transitory computer-readable medium having stored thereon, computer-executable instructions which, when executed by a computer, cause the computer to execute operations, the operations comprising:
calculating a virtual viewpoint position corresponding to a position of a virtual camera that captures a virtual viewpoint image, wherein the calculation of the virtual viewpoint position is based on viewing position information of a viewing user of the virtual viewpoint image;
setting a circumference of a circle on one of a horizontal plane or a vertical plane centered on an object user as a virtual camera locus;
setting a proximity position to a viewing user position on the virtual camera locus as the virtual viewpoint position;
setting a capture direction of the virtual camera to a specific point from the virtual viewpoint position along the circumference of the circle on the one of the horizontal plane or the vertical plane, wherein the specific point is different from a position from the object user; and
generating, based on the set capture direction, the virtual viewpoint image corresponding to a captured image from the virtual viewpoint position, wherein
the generation of the virtual viewpoint image is based on the captured image of a real camera that captures the object user.

15. An information processing apparatus, comprising:
a processor configured to:
calculate a virtual viewpoint position corresponding to a position of a virtual camera that captures a virtual viewpoint image, wherein the calculation of the virtual viewpoint position is based on viewing position information of a viewing user of the virtual viewpoint image;
calculate a line of sight coincident position where a line of sight between a display user in the virtual viewpoint image coincides with a line of sight of the viewing user;
set a capture direction of the virtual camera to a specific point based on the line of sight coincident position as the virtual viewpoint position, wherein the specific point is different from a position from an object user; and generate, based on the set capture direction, the virtual viewpoint image corresponding to a captured image from the virtual viewpoint position, wherein
the generation of the virtual viewpoint image is based on the captured image of a real camera that captures the object user.

* * * * *